(12) United States Patent     (10) Patent No.:     US 12,619,390 B2

Hayata                          (45) Date of Patent:          May 5, 2026

(54) INFORMATION PROCESSING SYSTEM, INFORMATION PROCESSING METHOD, AND COMPUTER PROGRAM

(71) Applicant: GREE, INC., Tokyo (JP)

(72) Inventor: Daiki Hayata, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 175 days.

(21) Appl. No.: 18/387,676

(22) Filed: Nov. 7, 2023

(65) Prior Publication Data

US 2024/0152311 A1     May 9, 2024

(30) Foreign Application Priority Data

Nov. 9, 2022     (JP) ................................. 2022-179861

(51) Int. Cl.
*G06F 3/14*       (2006.01)
(52) U.S. Cl.
CPC .................................. *G06F 3/1454* (2013.01)
(58) Field of Classification Search
None
See application file for complete search history.

(56) References Cited

U.S. PATENT DOCUMENTS

| | | | | |
|---|---|---|---|---|
| 9,532,111 | B1 * | 12/2016 | Christie | ........... H04N 21/21815 |
| 9,817,912 | B2 * | 11/2017 | Willis | .................. G06Q 10/107 |
| 9,848,228 | B1 * | 12/2017 | Morris | ...................... H04N 5/76 |
| 10,726,603 | B1 * | 7/2020 | Al Majid | ............ G06F 3/04845 |
| 11,842,036 | B2 * | 12/2023 | Barton | .................... G06F 9/452 |
| 11,849,255 | B2 * | 12/2023 | Van Os | .................. H04N 21/47 |
| 12,302,035 | B2 * | 5/2025 | Cranfill | .............. G06F 3/04817 |
| 12,418,430 | B1 * | 9/2025 | Eagan | ...................... H04N 7/15 |
| 2004/0221309 | A1 * | 11/2004 | Zaner | .................. H04L 12/1822 |
| | | | | 725/35 |
| 2019/0068773 | A1 * | 2/2019 | Whitehorn | ........ H04M 1/72403 |

(Continued)

FOREIGN PATENT DOCUMENTS

| | | |
|---|---|---|
| JP | 2015-184689 A | 10/2015 |
| JP | 2021-145364 A | 9/2021 |
| JP | 2023-178594 A | 12/2023 |

OTHER PUBLICATIONS

17Live (Ichinana) gifts and a list of all types explained! <https://web.archive.org/web/20221013031619/https://liver-best.com/17live-gift-all/> (Oct. 2022).

(Continued)

*Primary Examiner* — Toan H Vu
(74) *Attorney, Agent, or Firm* — Oliff PLC

(57)          ABSTRACT

An information processing system includes one or more computer processors that receive information transmitted from a first user terminal and/or a second user terminal; cause a video including a character object of the first user to be displayed on the second user terminal by transmitting information regarding the video to the second user terminal; generate object display data for display in an object display frame displayed on the second user terminal together with the video, based on history information stored in association with the first user and/or the second user; and transmit the object display data to the second user terminal in response to a request to display the object display frame received from the second user terminal.

26 Claims, 52 Drawing Sheets

(56) References Cited

U.S. PATENT DOCUMENTS

| 2020/0285800 A1* | 9/2020 | Monroe ................. | G06F 3/0482 |
| 2020/0387663 A1* | 12/2020 | Viswanathan ........ | G06F 40/166 |
| 2021/0204014 A1* | 7/2021 | Kawakami ....... | H04N 21/44012 |
| 2021/0318786 A1* | 10/2021 | Barton .................... | G06F 3/048 |
| 2022/0286314 A1* | 9/2022 | Meyer ................. | H04L 12/1827 |
| 2022/0321951 A1* | 10/2022 | Chandrashekar ........................... H04N 21/44016 |
| 2023/0237192 A1* | 7/2023 | Kahan ................... | G01C 21/00 726/1 |

OTHER PUBLICATIONS

Jun. 27, 2023 Office Action issued in Japanese Patent Application No. 2022-179861.

Mar. 10, 2026 Office Action issued in Japanese Patent Application No. 2023-220575.

* cited by examiner

| GIFT ID | GIFT NAME | SPECIFIC OBJECT F |
|---------|-----------|-------------------|
| 00001 | SHOOTING HEART | 0 |
| 00002 | FIREWORK (LARGE) | 0 |
| 00003 | HEART WAVE | 1 |
| • • • | • • • | • • • |

FIG. 28

INFORMATION PROCESSING SYSTEM, INFORMATION PROCESSING METHOD, AND COMPUTER PROGRAM

This application claims the benefit of priority from Japanese Patent Application No. 2022-179861 filed Nov. 9, 2022, the entire contents of the prior application being incorporated herein by reference.

TECHNICAL FIELD

This disclosure relates to an information processing system, an information processing method, and a computer program.

BACKGROUND TECHNOLOGY

An information processing system is known that generates an animation of a character object based on movement of an actor and distributes a video including the animation of the character object.

SUMMARY

Problems to be Solved

In this technical field, how to improve the desire of a distributing user to distribute, the desire of a viewing user to view, and/or the desire of users to interact with each other are important issues.

Accordingly, it is an object of this disclosure to provide technical improvements that solve or alleviate at least part of the problem of the conventional technology described above.

One of the more specific objects of this disclosure is to provide an information processing system, an information processing method, and a computer program that improve the desire of a distributing user to distribute, the desire of a viewing user to view, and/or the desire of users to interact with each other.

Means for Solving the Problems

The disclosed information processing system is an information processing system comprising one or more computer processors, wherein the one or more computer processors comprise: a receiver that receives information transmitted from a first user terminal of a first user and/or a second user terminal of a second user; a distributor that, by transmitting information regarding a video including a character object of the first user to the second user terminal, makes the video viewable at the second user terminal; a generator that generates object display data that is data to be displayed in an object display frame displayed on the second user terminal along with the video, based on history information stored in association with the first user and/or the second user; and a transmitter that transmits the object display data generated by the generator to the second user terminal, in response to a request to display the object display frame from the second user terminal received by the receiver.

The history information stored in association with the first user can include information regarding a history in which the first user and a predetermined event are associated.

The history information stored in association with the first user can include information regarding a request, transmitted from the second user terminal, to display a predetermined object in a video associated with the first user.

The history information stored in association with the second user can include information regarding a request, transmitted from the second user terminal, to display a predetermined object in a video associated with the first user.

The history information stored in association with the second user can include information regarding a request, transmitted from the second user terminal, to display a predetermined object in an arbitrary video including a video associated with the first user.

The generator can, based on the history information, generate object display data that specifies a target object to be subjected to specific display control from among objects displayed in the object display frame, and display the target object in a first position inside the object display frame, or display the target object in a manner different from other objects in the object display frame.

The generator can specify as the target object a predetermined object for which a display request was transmitted from the second user terminal and which has a different recent predetermined number, based on the history information.

The generator can generate object display data in which the number of times display requests for the predetermined object have been transmitted at one time is associated with the target object, based on the history information.

The receiver can further receive designation information for an object and/or an attribute of an object, transmitted from the first user terminal and/or the second user terminal, and the generator can specify a designated object based on the designation information and generate object display data that displays the designated object in a second position inside the object display frame, or displays the designated object in a manner different from other objects in the object display frame.

The one or more computer processors further comprise a determination portion that determines whether a predetermined event is associated with the first user; wherein when the determination portion determines that the predetermined event is associated with the first user, the generator can generate display information regarding a necessary value needed for a parameter value associated with the first user in connection with the predetermined event to attain a predetermined value, and the transmitter can transmit the display information to the second user terminal.

The predetermined value can be a value determined in advance in the predetermined event.

The predetermined value can be a value that varies in response to a parameter value associated with another user associated with the predetermined event.

The generator can update the display information in real time in response to changes in the necessary value.

The parameter value can be a value that increases based on the number and/or value of requests to display an object in the video, transmitted from the second user terminal.

The generator can make the necessary value the display information.

The generator can determine a type of necessary object needed to make the necessary value 0, calculate the number of the necessary objects needed to make the necessary value 0, and make the type and number of the necessary object the display information.

The generator can determine the type of necessary object needed to make the necessary value 0 based on the history information.

The generator can determine the type of necessary object needed to make the necessary value 0 based on a number of the second user terminal.

The generator can further generate information for displaying, on the second user terminal, a batch object that can transmit display requests for the number of the necessary objects as a batch.

The receiver can receive temporary display requests for the necessary object from the second user terminal and, when the number of temporary display requests reaches the number, treats the number of the display requests for the necessary object as having been received as a batch.

The first position can be an upper position in the object display frame or a position within a specific tab in the object display frame.

The generator can calculate the necessary number of points needed for the necessary value to become 0, and make the necessary number the display information.

The one or more computer processors further comprise a determination portion that determines whether a number of points associated with the second user is sufficient for the necessary number, and when the determination portion determines that the number of points is insufficient for the necessary number, the transmitter can transmit to the second user terminal information for causing display of an object that is a lead to a screen that performs a process to increase the points.

The disclosed information processing method is an information processing method that causes one or more computer processors to execute: a receiving step that receives information transmitted from a first user terminal of a first user and/or a second user terminal of a second user; a distributing step that, by transmitting information regarding a video including a character object of the first user to the second user terminal, makes the video viewable at the second user terminal; a generating step that generates object display data that is data to be displayed in an object display frame displayed on the second user terminal along with the video, based on history information stored in association with the first user and/or the second user; a determining step that determines whether or not there is a request from the second user terminal to display the object display frame; and a transmitting step that transmits the object display data generated in the generating step to the second user terminal, in response to a request to display the object display frame from the second user terminal.

The disclosed information processing method is an information processing method in an information processing device comprising one or more computer processors, wherein the information processing method causes the one or more computer processors to execute: a receiving step that receives information regarding a video including a character object of a first user from a server device; a generating step that generates object display data that is data to display an object display frame to be displayed together with the video, based on history information stored in association with a first user terminal of the first user and/or the information processing device; a determining step that determines whether or not there is a request to display the object display frame; and a display step that displays the object display frame generated based on the object display data generated in the generating step, together with the video, in response to the request to display the object display frame.

The disclosed computer program is a computer program executed by an information processing device comprising one or more computer processors, wherein the computer program causes the one or more computer processors to realize: a receiving function that receives information regarding a video including a character object of a first user from a server device; a generating function that generates object display data that is data to display an object display frame to be displayed together with the video, based on history information stored in association with a first user terminal of the first user and/or the information processing device; and a display function that displays the object display frame generated based on the object display data generated by the generating function, together with the video, in response to a request to display the object display frame.

This disclosure provides a technical improvement that solves or alleviates at least part of the problem of the conventional technology described above. Specifically, with the configuration of this disclosure, it is possible to improve the desire of a distributing user to distribute, the desire of a viewing user to view, and/or the desire of users to interact with each other.

BRIEF DESCRIPTION OF DRAWINGS

FIG. 28 is a data configuration diagram showing an example of a data table stored in a memory device in this disclosure.

DETAILED DESCRIPTION OF EMBODIMENTS

Figure 1:
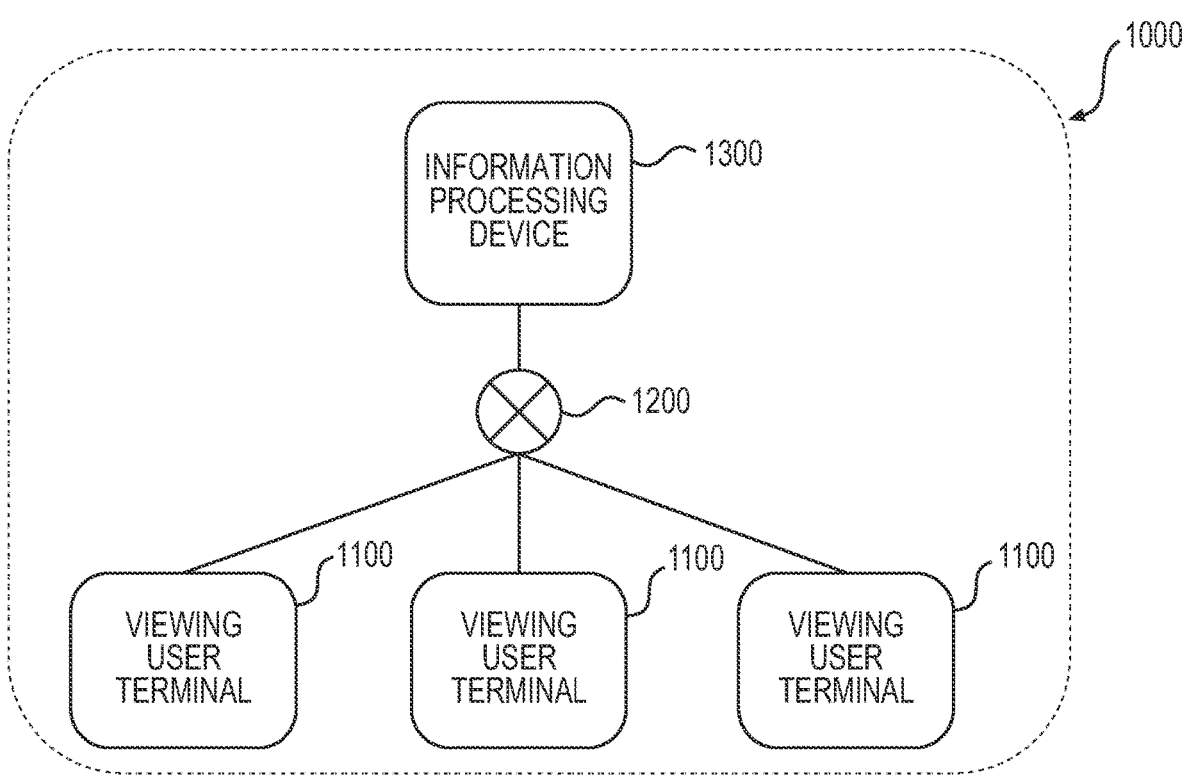
FIG. 1 is a system configuration diagram showing an example of an information processing system in this disclosure.

First, an overview of an information processing system according to an embodiment of this disclosure will be described with reference to the drawings.

The information processing system in this disclosure is an information processing system including one or more client devices and a server device, and includes one or more computer processors.

A video displayed on each client device is described as including an animation of a 3D or 2D character object generated based on movement of a distributing user, but the description is not limited to this, and the video may include an animation of a character object generated in response to an operation by the distributing user, or may include an image of the distributing user himself/herself. Further, the video may also include only the voice of the distributing user, without displaying a character object or the distributing user.

Here, a distributing user means a user who sends information related to video and/or sound. For example, a distributing user can be a user who organizes or hosts a single video distribution, a collaborative distribution in which multiple people can participate, a video or voice chat that multiple people can participate in and/or view, or an event (for example, a party) in a virtual space that multiple people can participate in and/or view, that is, a user who mainly performs these functions. Therefore, the distributing user in this disclosure can also be called a host user, a sponsor user, a hosting user, or the like.

Meanwhile, a viewing user means a user who receives information related to video and/or sound. However, the viewing user can be a user who not only receives the above information, but can also react to it. For example, a viewing user can be a user who views a video distribution, a collaborative distribution, or a user who participates in and/or views a video or voice chat, or an event. Therefore, the viewing user in this disclosure can also be referred to as a guest user, a participating user, a listener, a spectator user, a cheering user, or the like.

The information processing system in an embodiment of this disclosure can be used to provide the next Internet space (metaverse), which is a digital world in which many people can participate simultaneously and freely engage in activities such as interaction, work, and play via character objects (avatars) at a level close to that of the real world. Social activities can be carried out transcending the gap between reality and virtuality. It can be used to provide the next Internet space (metaverse).

In such a space, user avatars can freely walk around the world and communicate with each other.

Additionally, one avatar (character object) among the plurality of avatars in the virtual space may be configured to be able to distribute a video as a character object of a distributing user. That is, one-to-many video distribution can be performed in a many-to-many metaverse virtual space.

In such a space, there may be no particular distinction between a distributing user and a viewing user.

The space displayed in the video may be a virtual space, a real space, or an augmented reality space that is a combination thereof. The video may be a karaoke video or a live game video that plays at least a predetermined image and the voice of the distributing user, or it may be a superimposed display of a character object, or a real image of the distributing user, on these images.

Further, when the distributing user is included in a real space, a character object generated based on movement of the distributing user may be superimposed and displayed on the actual image of the distributing user. Further, an animation such as a gift object may be superimposed and displayed on a captured image of the real space.

<System Configuration>

As shown as an example in FIG. 1, an information processing system 1000 according to this disclosure includes (i) one or more viewing user terminals 1100, and (ii) an information processing device (support computer) 1300 arranged in a video distribution studio or the like, which is connected to these viewing user terminals 1100 via a network 1200.

Further, the information processing device 1300 may be connected to a predetermined server device via the Internet, and part or all of the processing to be performed by the information processing device 1300 may be performed by the server device. The server device may be an information processing device 2400 shown in FIG. 2.

In this specification, distribution by the information processing system 1000 is referred to as studio distribution.

In studio distribution, movement of an entire body of a distributing user (actor) will be reflected in a character in real time by shooting markers attached to the distributing user with a camera(s) installed in the studio and using known motion capture technology.

Figure 2:
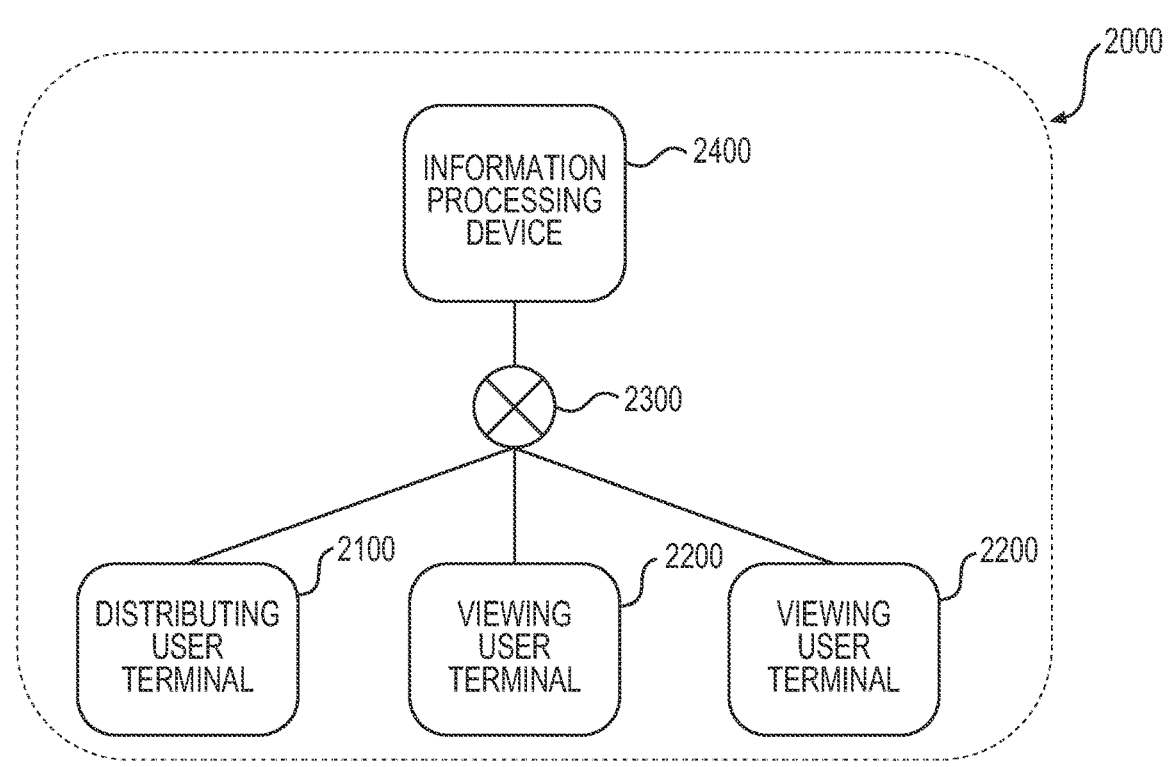
FIG. 2 is a system configuration diagram showing an example of an information processing system in this disclosure.

Additionally, the information processing system 1000 can also work in cooperation with another information processing system 2000, shown in FIG. 2 as an example. The information processing system 2000 shown in FIG. 2 can include (i) a distributing user terminal 2100, (ii) one or more viewing user terminals 2200, and (iii) and an information processing device (server device) 2400 that is connected to the distributing user terminal 2100 and the viewing user terminals 2200 via a network 2300.

In the above example, the distributing user terminal 2100 can be an information processing terminal such as a smartphone. In this specification, distribution by such information processing system 2000 is referred to as mobile distribution.

In mobile distribution, the movement of the distributing user's face is captured by a camera provided in the distributing user terminal 2100 and reflected on the character's face in real time using known face tracking technology.

There is no particular distinction between a distributing user and a viewing user in mobile distribution. A viewing user can perform mobile distribution at any time, and a distributing user can be a viewing user when viewing a video of another distributing user.

The video generated by the information processing system 1000 and the information processing system 2000 can be distributed to a viewing user from one video distribution platform, as an example.

Furthermore, in any distribution, the process of generating animation by reflecting motion on a character, the process of displaying a gift described below, and the like may be shared by a distributing user terminal, a viewing user terminal, an information processing device and other devices.

That is, "distribution" here refers to sending information to make the video available for viewing at the viewing user terminal. Video rendering is performed at the information processing devices 1300, 2400 side or at the distributing user terminal 2100 and viewing user terminal 1100 and 2200 side.

Specifically, face motion data and sound data of the distributing user is sent from the distributing user terminal or information processing device to a terminal or device that generates (renders) an animation of a character object. Further, body motion may be sent in addition to the face motion.

In this disclosure, the process of generating an animation will be described as being performed by each of the distributing user terminal and the viewing user terminal, but this disclosure is not limited to this.

Figure 3:
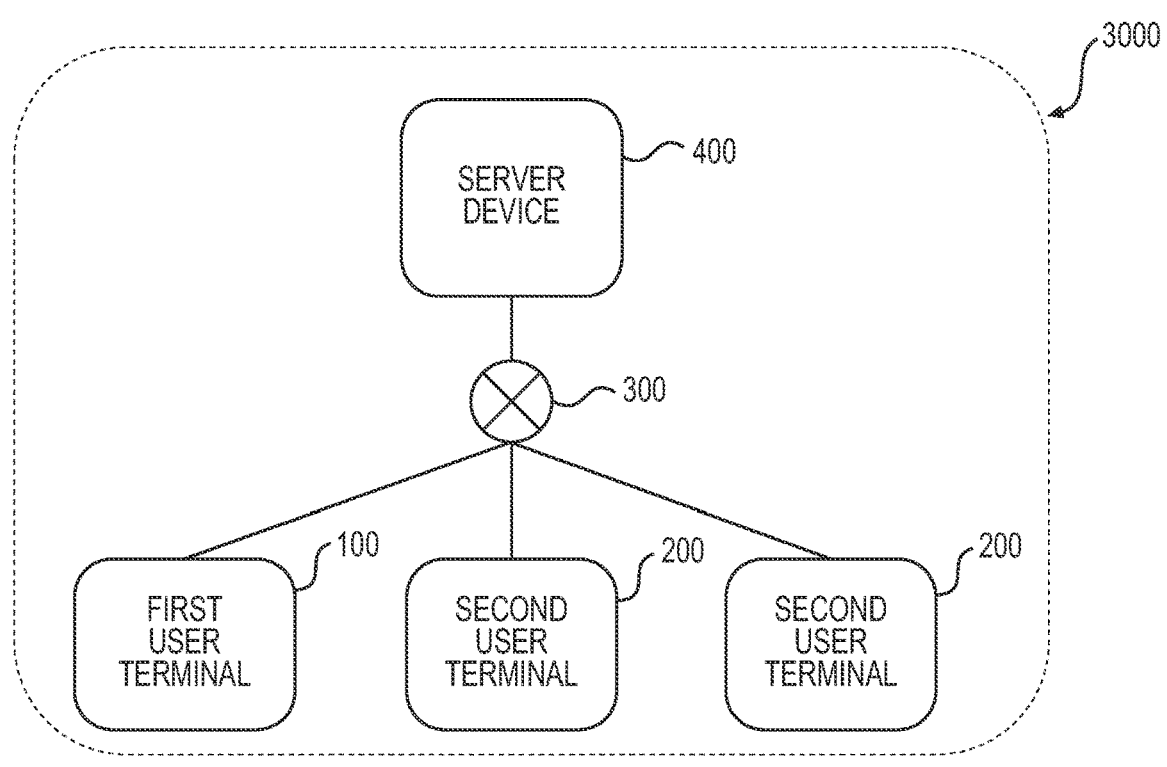
FIG. 3 is a system configuration diagram showing an example of an information processing system in this disclosure.

The information processing system in this disclosure can be applied to any of the examples shown in FIGS. 1 and 2. Further, an information processing system 3000 in an embodiment of this disclosure is described as being provided with a first user terminal 100, second user terminals 200, and a server device 400 that can be connected to these distributing first terminal 100 and second user terminals 200 via a network 300, as shown in FIG. 3.

The first user terminal 100 and the second user terminals 200 are interconnected with the server device 400 via, for example, a base station, a mobile communication network, a gateway, and the Internet. Communication is performed between the first user terminal 100 and the second user terminals 200 and the server device 400 based on a communication protocol such as the Hypertext Transfer Protocol (HTTP). Additionally, between the first user terminal 100 and the second user terminals 200 and the server device 400, communication may be performed based on WebSocket, which initially establishes a connection via HTTP communication and then performs bidirectional communication at a lower cost (less communication load and processing load) than HTTP communication. The communication method between the first user terminal 100 and the second user terminals 200 and the server device 400 is not limited to the method described above, and any communication method technology may be used as long as it can realize this embodiment.

The first user terminal 100 functions as at least the information processing device 1300, the viewing user terminal 1100, the distributing user terminal 2100, or the viewing user terminal 2200 described above. The second user terminals 200 function as at least the information processing device 1300, the viewing user terminal 1100, the distributing user terminal 2100, or the viewing user terminal 2200 described above. The server device 400 functions as at least the server device or information processing device 2400 described above.

In this disclosure, the first user terminal 100 and the second user terminals 200 may each be a smartphone (multi-functional phone terminal), a tablet terminal, a personal computer, a console game machine, a head-mounted display (HMD), a wearable computer such as a spectacle-type wearable terminal (AR glasses or the like), or an information processing device other than these devices that can reproduce a video. Further, these terminals may be stand-alone devices that operate independently, or may be constituted by a plurality of devices that are connected to each other so as to be able to send and receive various data.

<Hardware Configuration>

Here, a hardware configuration of the first user terminal 100 will be described using FIG. 4. The first user terminal 100 will be described using FIG. 4. The first user terminal

100 includes a processor 101, a memory 102, a storage 103, an input/output interface (input/output I/F) 104, and a communication interface (communication I/F) 105. Each component is connected to each other via a bus B.

The first user terminal 100 can realize the functions and methods described in this embodiment by the processor 101, the memory 102, the storage 103, the input/output I/F 104, and the communication I/F 105 working together.

The processor 101 executes a function and/or a method realized by a code or a command included in a program stored in the storage 103. The processor 101 may realize each process disclosed in each embodiment by a logic circuit (hardware) or a dedicated circuit formed in an integrated circuit (IC (Integrated Circuit) chip, an LSI (Large Scale Integration)) or the like, including, for example, a CPU (Central Processing Unit), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array), or the like. These circuits may be realized by one or more integrated circuits. A plurality of processes shown in each embodiment may be realized by a single integrated circuit. Furthermore, LSI may also be referred to as VLSI, Super LSI, Ultra LSI, or the like, depending on difference in the degree of integration.

The memory 102 temporarily stores a program loaded from the storage 103 and provides a work area to the processor 101. Various data generated while the processor 101 is executing the program are also temporarily stored in the memory 102. The memory 102 includes, for example, a RAM (Random Access Memory), a ROM (Read Only Memory), and the like.

The storage 103 stores the program. The storage 103 includes, for example, an HDD (Hard Disk Drive), an SSD (Solid State Drive), a flash memory, or the like.

The communication I/F 105 is implemented as hardware such as a network adapter, software for communication, or a combination thereof, and is used to send and receive various types of data via the network 300. This communication may be executed by either by wire or wirelessly, and any communication protocol may be used as long as mutual communication can be executed. The communication I/F 105 executes communication with another information processing device via the network 300. The communication I/F 105 sends various data to other information processing devices according to instructions from the processor 101. The communication I/F 105 also receives various data sent from other information processing devices and transmits them to the processor 101.

The input/output I/F 104 includes an input device for inputting various operations to the first user terminal 100 and an output device for outputting processing results processed by the first user terminal 100. The input/output I/F 104 may be such that the input device and the output device are integrated, or may be separated into the input device and the output device.

The input device is realized by any one of all types of devices that can receive an input from a user and transmit information related to the input to the processor 101, or a combination thereof. The input device includes, for example, (i) a hardware key, such as a touch panel, a touch display, or a keyboard, (ii) a pointing device, such as a mouse, (iii) a camera (operation input via an image), and (iv) a microphone (operation input by sound).

The input device may include a sensor portion. The sensor portion is one or more sensors that detect (i) face motion, which indicates changes in the user's facial expression, and (ii) body motion, which indicates changes in the relative position of the user's body with respect to the sensor portion. Face motion includes movements such as blinking of the eyes, opening and closing of the mouth, and the like. A known device may be used as the sensor portion. An example of a sensor portion includes (i) a ToF sensor that measures and detects the time of flight (Time of Flight) until light irradiated toward the user is reflected by the user's face and returns, or the like, (ii) a camera that captures the user's face, and (iii) an image processor that image-processes the data captured by the camera. The sensor portion may also include an RGB camera for capturing visible light and a near-infrared camera for capturing near-infrared light. The RGB camera and near-infrared camera may use, for example, "True Depth" of the "iPhone X (registered trademark)," "LiDAR" of the "iPad Pro (registered trademark)," or other ToF sensors in smartphones. This camera specifically projects tens of thousands of invisible dots onto the user's face and the like. Then, accurate face data is captured by detecting and analyzing the reflected light of the dot pattern to form a depth map of the face, and capturing infrared images of the face and the like. An arithmetic processor of the sensor portion generates various types of information based on the depth map and infrared images, and compares this information with registered reference data to calculate the depth (distance between each point and the near-infrared camera) and non-depth positional deviations for each point on the face.

Further, the sensor portion may have a function of tracking not only the user's face, but also the hand(s) (hand tracking). The sensor portion may further include a sensor other than the above-mentioned sensors such as an acceleration sensor and a gyro sensor. The sensor portion may have a spatial mapping function of (i) recognizing an object in the real space in which the user exists based on the detection results of the above ToF sensor or other known sensor, and (ii) mapping the recognized object to a spatial map. Hereinafter, when the face motion detection data and the body motion detection data are described with no particular distinction, they are simply referred to as "tracking data." The image processor of the sensor portion may be provided with a controller that can be provided in the information processing system.

As an operation portion as an input device, a device corresponding to the type of the user terminal can be used. An example of the operation portion is a touch panel integrated with a display, an operation button provided on a housing of a user terminal, a keyboard, a mouse, a controller operated by a user, and the like. The controller may incorporate various known sensors such as an inertial measurement sensor (IMU: Inertial Measurement Unit) such as an acceleration sensor and a gyro. Furthermore, another example of the operation portion may be a tracking device that specifies the movement of the user's hand, the movement of the eyes, the movement of the head, the direction of the line of sight, and the like. In this embodiment, for example, based on the user's hand movements, the user's instructions are determined and various operations are performed such as starting or ending the video distribution, rating messages and videos, and requesting the display of predetermined objects (for example, the gift described below), and the like. If the sensor portion also has an input interface function such as a hand tracking function, the operation portion can be omitted.

The output device outputs the processing result processed by the processor 101. The output device includes, for example, a touch panel, a speaker, and the like.

The functions realized by the components described in this specification may be implemented in circuitry or processing circuitry programmed to realize the functions described, including general-purpose processors, special-purpose processors, integrated circuits, ASICs (Application Specific Integrated Circuits), a CPU (a Central Processing Unit), conventional circuits, and/or combinations thereof. Processors include transistors and other circuits, and are referred to as circuitry or processing circuitry. The processors may be programmed processors that execute programs stored in memory.

In this specification, circuitry, units, and means are hardware that is programmed, or hardware that performs, so as to realize the functions described. Such hardware may be any hardware disclosed in this specification or any hardware known to be programmed or to perform so as to realize the functions described herein.

When the hardware is a processor considered to be of the circuitry type, the circuitry, means or units are a combination of (i) hardware and (ii) software used to constitute a processor and/or the hardware.

Figure 4:
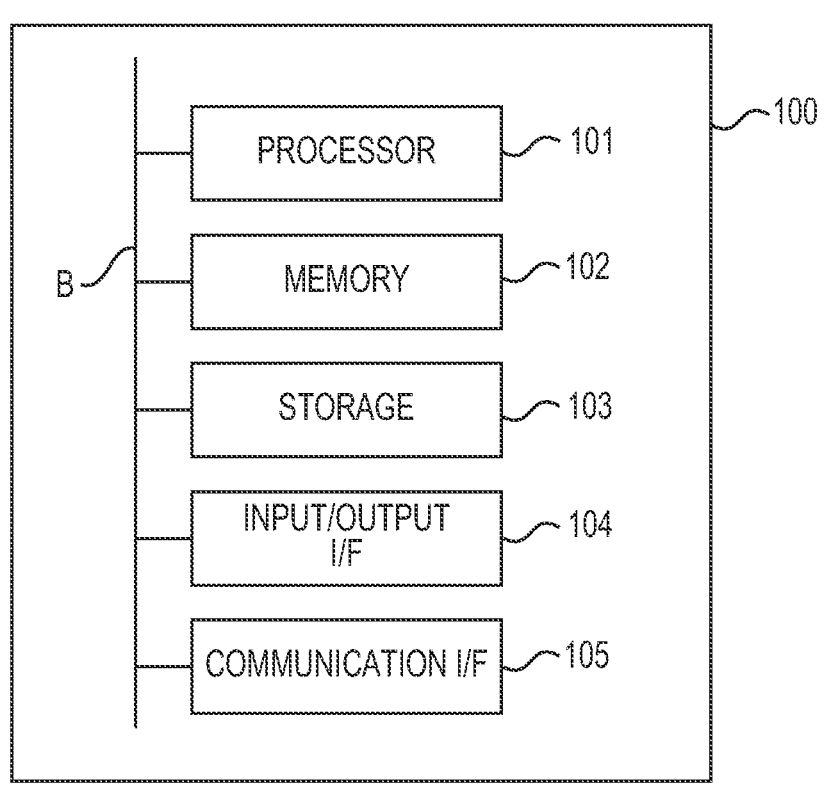
FIG. 4 is a configuration diagram showing an example of a hardware configuration of a server device, a first user terminal, and a second user terminal in this disclosure.

Also, except for special cases, a second user terminal 200 and server device 400 in this disclosure can be configured with the same hardware configuration as in FIG. 4.

Next, various functions that can be executed in a user terminal that starts an application realized by an information processing system according to the embodiment of this disclosure, and transitions of screens that are displayed, will be described with reference to the drawings.

Figure 5:
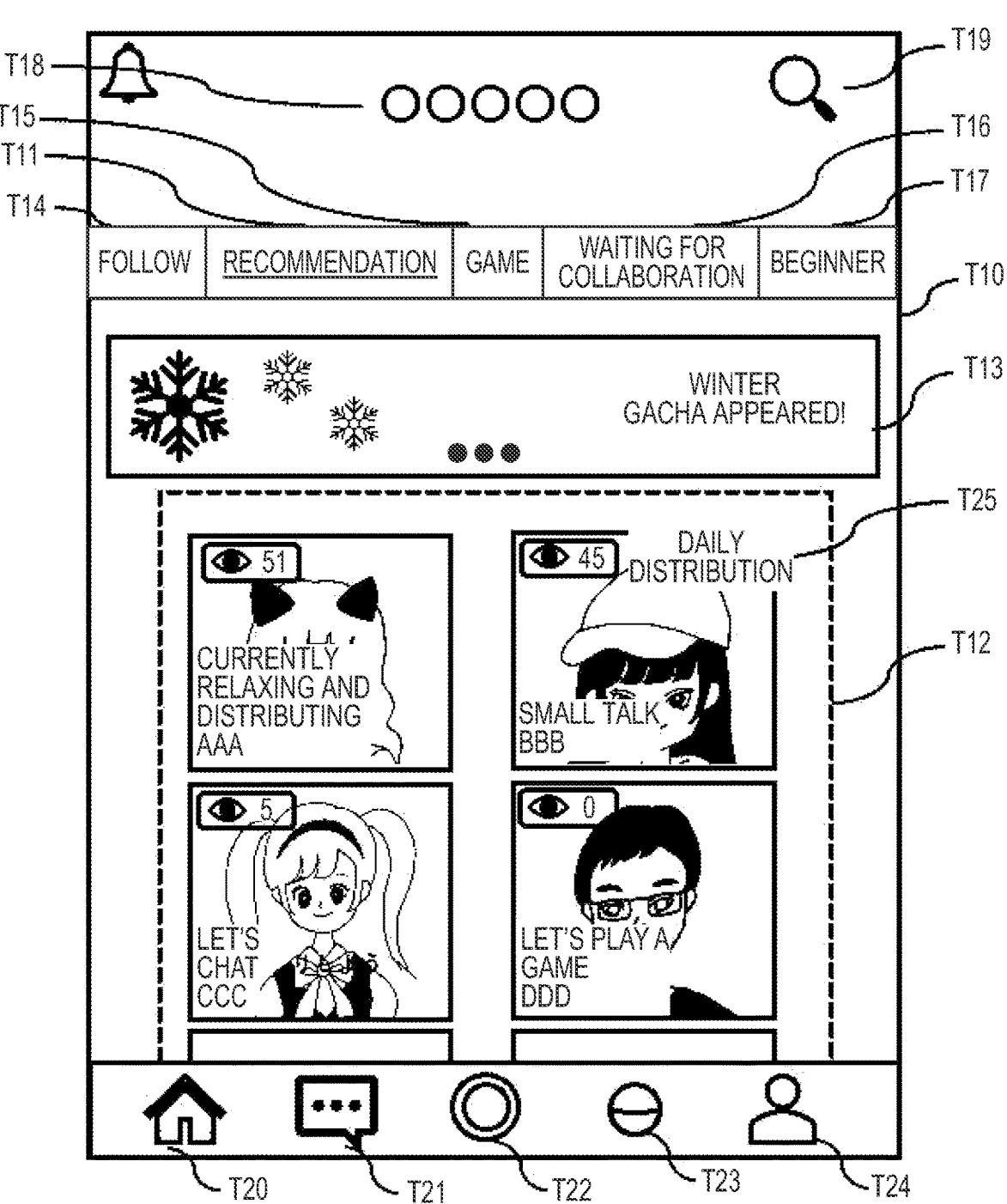
FIG. 5 is a conceptual diagram showing an image of a screen displayed on a user terminal.

FIG. 5 shows a top screen T10 displayed on a user terminal (here, it is not yet specified whether or not the user will view or distribute) when a video distribution/viewing application is started.

As shown in FIG. 5, by selecting one distribution channel (called a distribution frame, distribution program, distribution video or the like) from among thumbnail images of one or more recommended distribution channels T12 displayed in a recommendation tab T11 on the top screen T10, the user can view a video played on that distribution channel.

Alternatively, by accessing a fixed link for a specific distribution channel, the user can view a video played on that specific distribution channel. Such fixed links may come from a notification from a first user who is followed, or from a share notification sent by another user.

Here, the user who views the video is the viewing user, and the terminal for viewing the video is the second user terminal 200.

Further, as shown in FIG. 5, a display field T13 for notification of a campaign, an event, or the like may be displayed on the top screen T10. The display field T13 of this notification can be switched to another notification by a slide operation.

Additionally, from the top screen T10, a follow tab T14, a game tab T15 for displaying a game category, an awaiting collaboration tab T16 for displaying a distribution channel that is awaiting collaboration, and a beginner tab T17 for displaying a beginner's distribution channel are displayed. By selecting these (by switching the tabs), the top screen T10 transitions to respective different screens.

A service name display T18 and a search button T19 in an upper frame of the top screen T10 may be fixedly displayed on a transition destination screen.

Similarly, a home button T20, a message button T21, a distribution preparation button T22, a gacha button T23, and a profile button T24 in a lower frame of the top screen T10 may be fixedly displayed on the transition destination screen.

A user who selects displayed thumbnail images T12 on the top screen T10 or the like shown in FIG. 5 becomes a viewing user (second user) who views the video as described above, and a user who selects the distribution preparation button T22 can become a distributing user (first user) who distributes a video.

Figure 6:
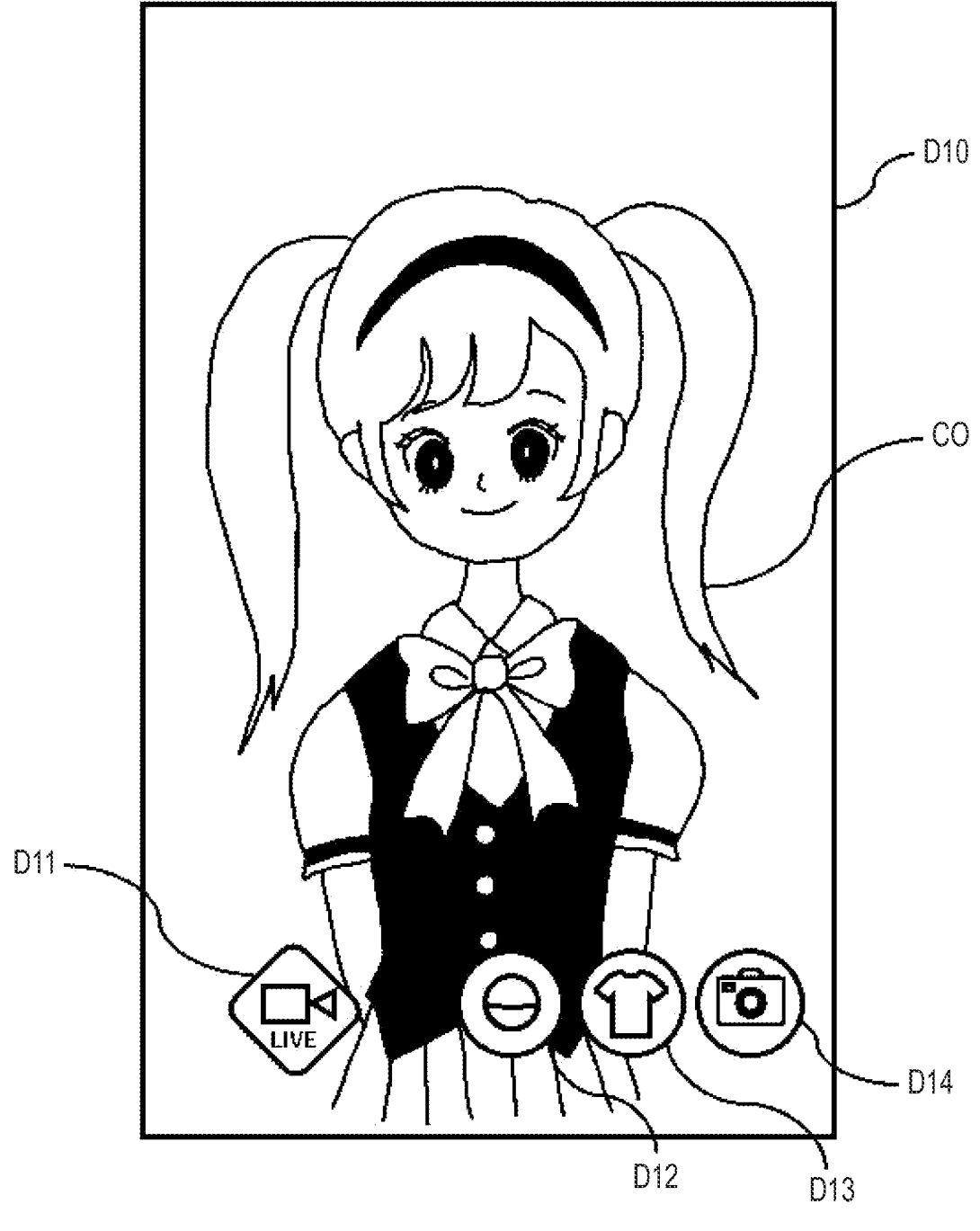
FIG. 6 is a conceptual diagram showing an image of a screen displayed on a user terminal.

As an example, when the distribution preparation button T22 is selected on the top screen T10 shown in FIG. 5, the screen transitions to an avatar setting screen D10 shown in FIG. 6. Then, when a distribution button D11 is selected on the avatar setting screen D10, the screen transitions to a distribution setting screen D20 shown in FIG. 7. Then, when a distribution start button D25 is selected on the distribution setting screen D20, the screen transitions to an avatar distribution screen D30 shown in FIG. 8.

Next, details of a flow up to the start of video distribution will be described.

The one or more computer processors in this disclosure may include a distribution start request receiver, a distribution setting portion, and a distribution start portion.

The distribution start request receiver receives a distribution start request for a first video including an animation of a character object from the first user terminal of the first user.

Here, the first video refers to a video including an animation of a character object. In this specification, the character object may be referred to as an "avatar."

The above-described distribution start request can be sent from the user terminal to the information processing device 400 by selecting the distribution button D11 located on the avatar setting screen or the like that has transitioned from the top screen displayed on the user terminal (later to become the first user terminal) that started a dedicated application (video distribution/viewing application) for accessing the above-described video distribution platform.

FIG. 6 shows an example of the avatar setting screen D10. A character object CO, the distribution button D11, a gacha button D12, a clothes-changing button D13, a photo button D14, and the like can be displayed on the avatar setting screen D10.

When the clothes-changing button D13 is selected by the user, a closet screen for selecting various avatar parts such as eyes, nose, mouth, hair, accessories, clothes, and background of the character object CO appears.

When the gacha button D12 is selected by the user, a lottery screen for obtaining the above-described avatar parts appears.

When the photo button D14 is selected by the user, a capturing screen for capturing a still image of the character object appears.

When the distribution button D11 is selected by the user, a distribution start request is sent to the information processing device 400.

The distribution setting portion sets the distribution setting of the first video based on the designation from the first user terminal 100 in response to the distribution start request of the first video received by the distribution start request receiver.

Figure 7:
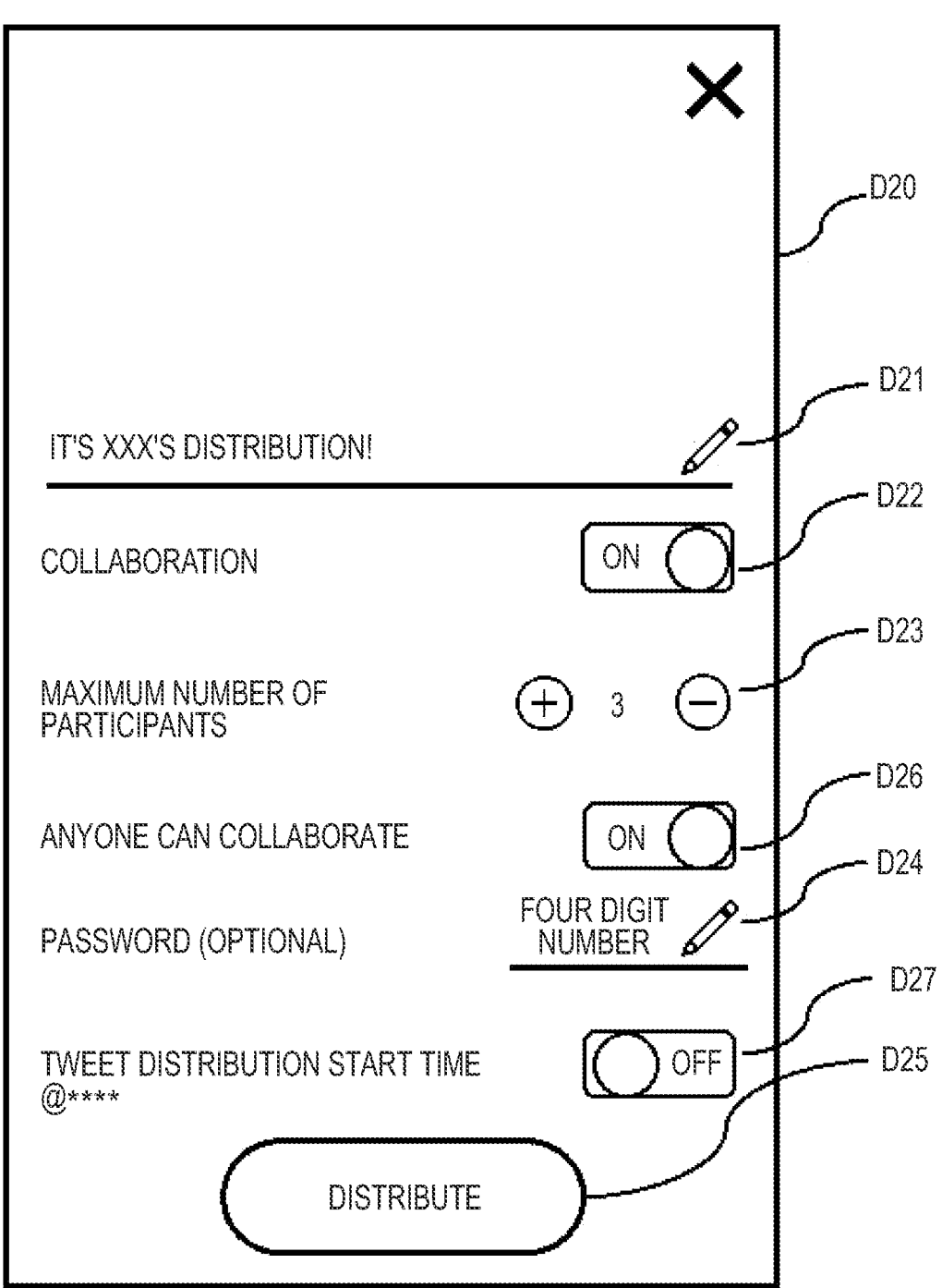
FIG. 7 is a conceptual diagram showing an image of a screen displayed on a user terminal.

As an example, when the distribution button D11 is selected, the screen displayed on the first user terminal 100 transitions from the avatar setting screen D10 shown in FIG. 6 to the distribution setting screen D20 shown in FIG. 7.

The distribution setting can include at least one of a setting related to the title of the first video, a setting regarding whether other users can appear in the first video, a setting related to the number of people who can appear in the first video, or a setting related to a password.

These distribution settings can be set in a title setting field D21, a collaboration possibility setting field D22, a number-of-people setting field D23, and a password setting field D24 in FIG. 7, respectively. Additionally, in FIG. 7, an anyone-can-collaborate possibility setting field D26 and an SNS posting possibility field D27 are further displayed.

The title of the first video can be freely determined by the distributing user within a range of a number of characters up to an allowable upper limit. If there is no input by the distributing user, a preset title, including the name of the character object (distributing user) such as "This is so and so's distribution ♪, " may be determined automatically.

Whether other users can make a request for appearance in the first video can be freely determined by the first user. If yes, other users can make a request for appearance to the distributing user. If no, other users cannot make a request for appearance to the distributing user. A state in which another user appears in the video of the first user may be referred to as "collaboration" in this specification. Details of the collaboration will be described later.

The number of people who can appear in the first video can be set only when other users can appear in the first video mentioned above, and the distributing user can freely determine this number within a range of the number of people up to an allowable upper limit.

A password can be arbitrarily set only when other users can appear in the first video mentioned above, and the distributing user can freely determine the designated number of digits. When another user makes a request for appearance in the first video, entering of such a password is required. A configuration is acceptable in which the password setting field D24 may become active only when the anyone-can-collaborate possibility setting field D26 is OFF.

The distribution start portion distributes information about the first video to the viewing user terminal(s) 200 of the viewing user(s) based on the conditions set by the distribution setting portion.

The instruction to start such distribution is sent by selecting the distribution start button D25 shown in FIG. 7.

As an example, the distribution start portion distributes information about the video (first video) including the animation of the character object of the first user to the second user terminal 200 of the second user (avatar distribution).

Information about the first video includes, for example, motion information indicating movement of the character object, sound information of the first user, and gift object information indicating a gift sent from another viewing user. The gift object information includes at least gift object identification information that specifies the type of the gift object and position information that indicates the position where the gift object is to be displayed.

Then, the distribution start portion can live-distribute the video via the video distribution platform described above.

Figure 8:
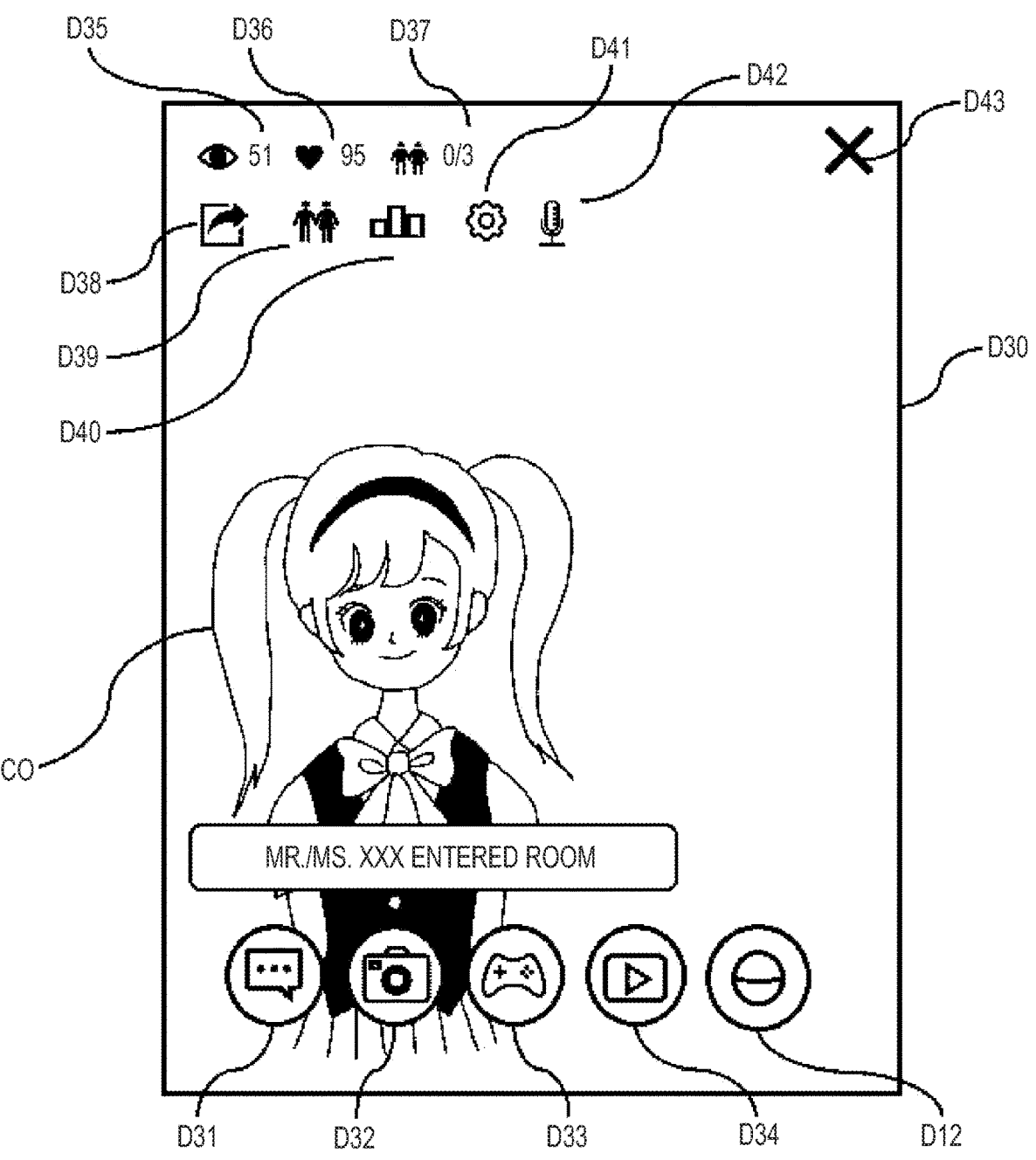
FIG. 8 is a conceptual diagram showing an image of a screen displayed on a user terminal.

FIG. 8 shows the avatar distribution screen D30 displayed on the first user terminal 100.

In addition to displaying the character object CO on the avatar distribution screen D30, a comment input button D31 for the distributing user to input a comment, a photo button D32 for saving a still image of the screen, a play start button D33 for playing a game described later, an external service liaison button D34 for viewing a video provided by an external service, and the gacha button D12 for obtaining an avatar part can be displayed.

Additionally, a cumulative number-of-viewers display D35, a cumulative number-of-likes display D36, a number-of-collaborators display D37, a share button D38 for an external SNS, a guest details button D39, a ranking display button D40, a setting button D41, and a sound switching button D42 for switching sound ON/OF can be displayed. Further, an end button D43 for ending the distribution is also displayed.

Although detailed description of these displays and buttons is omitted, it is possible to change the distribution settings set on the distribution setting screen D20 by selecting the setting button D41.

FIG. 8 shows an example of starting distribution in which the distribution setting screen D20 allows other users to appear in the first video, and the number of people who can appear in the first video is three. Therefore, the character object CO is displayed in a state of being closer to the lower left. This is a state in which up to three character objects of other users are able to appear in a vacant space.

The above is a description of the screen transition when the avatar distribution of this disclosure is performed.

Subsequently, a screen transition when the distributing user plays a game during distribution will be described.

The one or more computer processors in this disclosure may include a game request receiver, a game video distribution portion, and a game display processor.

The distributing user can request to start playing a game by selecting the play start button D33 during avatar distribution such as is shown in FIG. 8.

The game displayed by selecting the play start button D33 can be a dedicated game implemented in the application realized by the information processing system in this disclosure, and can be different from a general-purpose game provided by an external service. Therefore, the game distribution in this disclosure may be distinguished from the distribution of a general-purpose game play video provided by an external service together with a live broadcast of the distributing user.

Alternatively, the play start request may be sent from the first user terminal 100 to the information processing device 400 by selecting the play start button arranged on a predetermined screen displayed on the first user terminal 100 of the first user.

Figure 9:
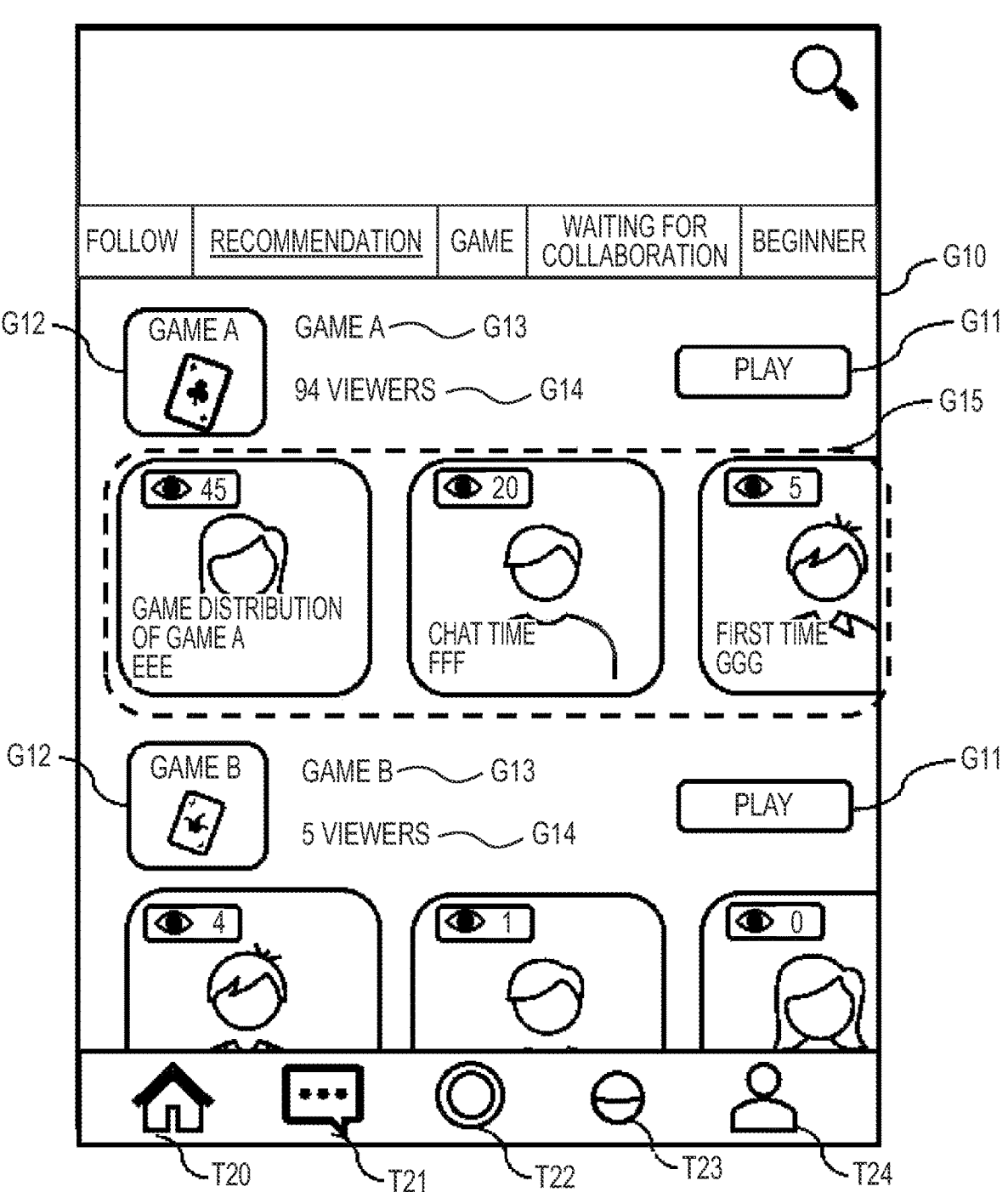
FIG. 9 is a conceptual diagram showing an image of a screen displayed on a user terminal.

FIG. 9 shows an example of a screen G10, in which a play start button G11 is arranged, as the predetermined screen. The screen G10 shown in FIG. 9 is a screen that has transitioned from the top screen T10 (FIG. 5) displayed on a user terminal that has started the application realized by the information processing system in this disclosure by selecting the game tab T15.

At least the play start button G11 that can send a request to start play of a predetermined game is displayed on the screen G10.

Then, when the game request receiver receives the request to start play of the predetermined game, the game video distribution portion distributes information about a second video to the second user terminal 200.

Here, the second video is a play video of a predetermined game. In this specification, distributing a video so that it is displayed on the screen of the second user terminal 200 is called "game distribution."

Further, as a first user, after starting the application realized by this disclosure, the user can send the request for the start of distribution of the second video to the information processing device 2400 by selecting a play start object arranged on the game list screen and the game detail screen.

The game list screen or the game details screen is a first screen to be described in detail below.

That is, the game display processor performs display processing of the first screen including (i) a distribution start object that can send a distribution start request, (ii) a play start object that can send a play start request for a predetermined game, and (iii) a thumbnail image of a video that is distributing a play video for a predetermined game.

The screen G10 shown in FIG. 9 corresponds to the game list screen of the first screen. The first screen, which is the game list screen, is a screen that has transitioned from the top screen T10 by selection of the game tab T15.

The first screen includes (i) the distribution preparation button T22 as a distribution start object, (ii) the play start button G11 as a play start object, and (iii) a thumbnail image showing a distribution channel of a video.

On the first screen, for each of a plurality of playable games, the play start button G11, a game icon G12, a game name G13, a total number-of-viewers G14 of the distribution channel of the game, and a distribution list G15 including thumbnail images of the distribution channels during the game distribution are displayed.

The order of the thumbnail images displayed in the distribution list G15 displayed here may be different depending on the viewing user. As an example, the thumbnail images are arranged in the order of (i) the order in which the number of viewing users following and the number of views by those viewing users are highest, (ii) the order in which the cumulative number of viewers is highest, and (iii) the order in which the distribution start is oldest. Additionally, the display range of the thumbnail images of the distribution list G15 can be changed by horizontal scrolling.

Additionally, the games displayed on this game list screen will read the top 10 titles with the following priorities. As an example, the priority is determined by (i) the order by newest date within 48 hours from the game distribution start date and time, and in which a viewing user last played within 30 days, (ii) the order of highest priority of a period ID, and (iii) the descending order of the period ID.

This distribution list G15 will be updated (i) when returning from the screen of another tab and (ii) when a refresh operation (Pull-to-Refresh) has been performed.

Figure 10:
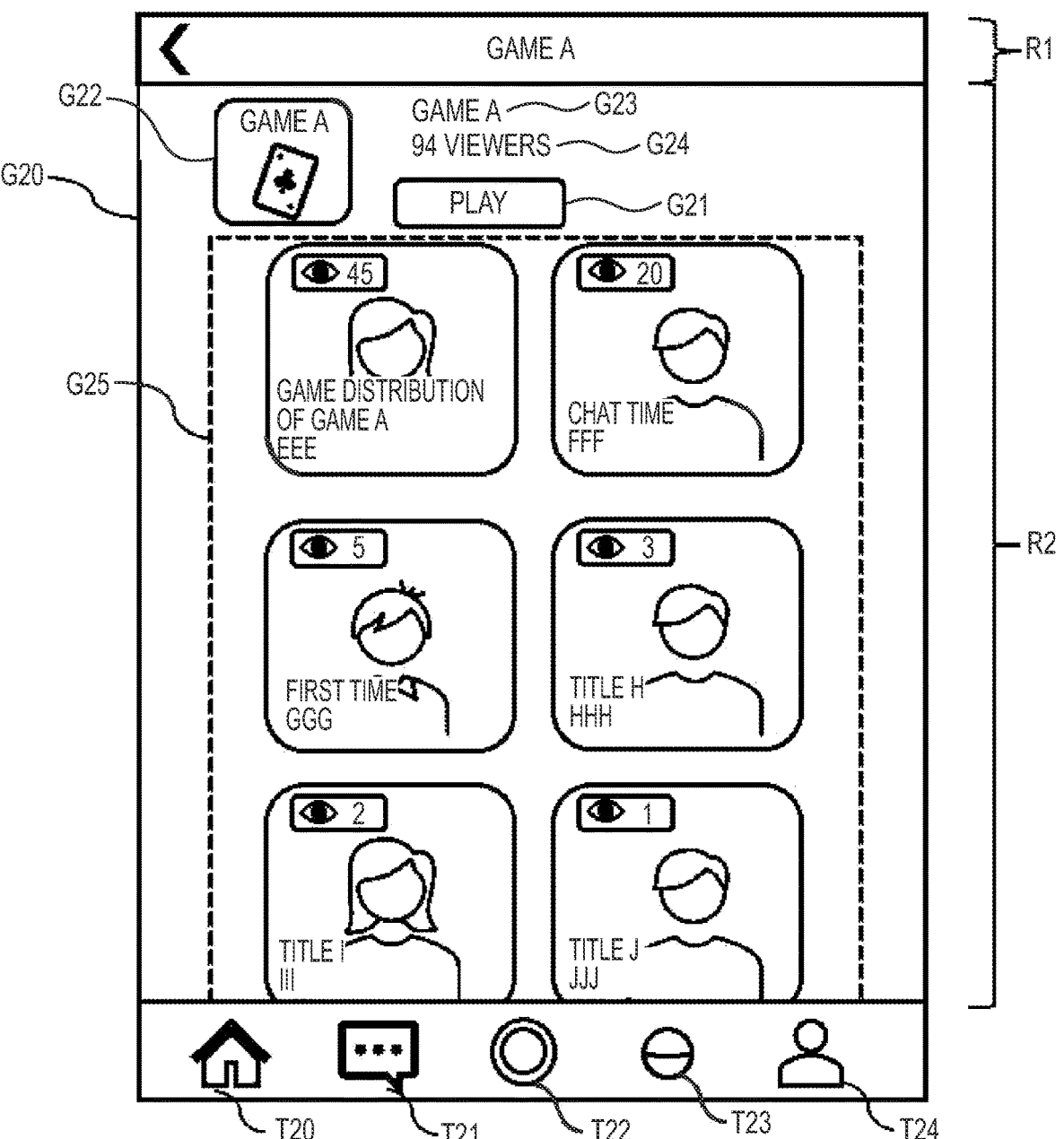
FIG. 10 is a conceptual diagram showing an image of a screen displayed on a user terminal.

FIG. 10 corresponds to a game detail screen of the first screen. The first screen, which is the game detail screen, is a screen that has been transitioned to by selecting a game icon G12 or a game name G13 displayed on the game list screen shown in FIG. 9, and is G20.

The first screen includes the distribution preparation button T22 which is a distribution start object, a play start button G21 which is a play start object, and thumbnail images showing video distribution channels.

Further, on the first screen, a game icon G22, a game name G23, a total number-of-viewers G24 of the distribution channel of the game, and a distribution list G25 including thumbnail images of the distribution channels that are distributing the game are displayed.

The order of the thumbnail images displayed in the distribution list G25 displayed here may be different depending on the viewing user. As an example, the order is arranged in the order of (i) the order in which the number of viewing users following and the number of views by the viewing users is highest, (ii) the order in which the cumulative number of viewers is highest, and (iii) the order in which the distribution start is oldest. Additionally, the display range of the thumbnail images of the distribution list G25 can be changed by vertical scrolling.

This distribution list G25 will be updated (i) when returning from the screen of another tab and (ii) when a refresh operation (Pull-to-Refresh) has been performed.

As described above, a user who selects the distribution start object or the play start object becomes a first user who makes the distribution start request or the play start request.

Further, a user who selects a thumbnail image becomes a second user who views the second video.

In addition, the first screen includes a first region in which a scrolling operation is not possible, and a second region in which a scrolling operation is possible.

The first screen referred to here is the first screen shown in FIG. 10. The first screen includes a first region R1 and a second region R2. Specifically, the game title is displayed in the first region R1, and the play start button G21, the game icon G22, the game name G23, the number of viewers G24, and the distribution list G25 described above are displayed in the second region R2.

The first region R1 is a portion in which a scrolling operation is not possible, and is fixedly displayed on the display screen, and the second region R2 is a portion in which a scrolling operation by the user is possible. By scrolling the second region R2, the user can check the thumbnail images hidden outside the screen.

However, since the play start button G21 may be hidden outside the screen by scrolling in the second region, the display processor in this disclosure can display a play start object (play start button G21) in the first region R1 according to a display state of a play start object (play start button G21) displayed in the second region R2.

Figure 11:
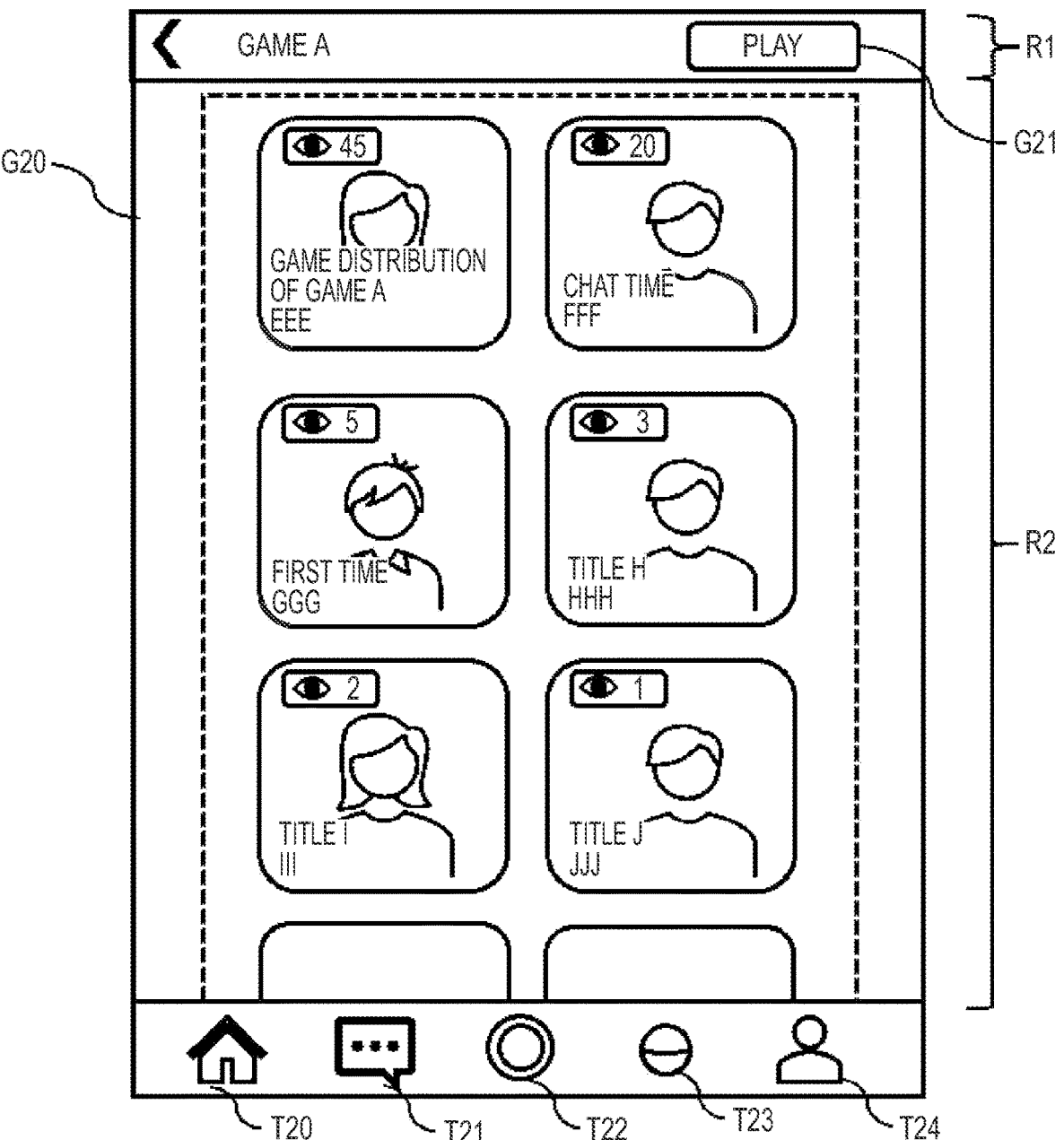
FIG. 11 is a conceptual diagram showing an image of a screen displayed on a user terminal.

As an example, in FIG. 10, the play start button G21 is displayed in the second region R2, but in FIG. 11, it is displayed in the first region R1. That is, when part or all of the play start button G21 is not displayed in the second region R2, the play start button G21 appears in the first region.

Further, the game display processor may display the play start object in the first region R1 in stages according to the display state of the play start object displayed in the second region R2.

Such an expression can be realized by changing the transparency of the play start object according to the scroll amount of the second region R2.

As an example, a scroll amount (unit is pixels) of 0 to 50 is caused to correspond to a button transparency of 0.0 (completely transparent) to 1.0 (completely opaque). Thus, in the initial display state, the object is completely transparent and cannot be seen, and when scrolling by 50 pixels or more has been performed, the object is completely displayed. During that scrolling (0 to 50), it is preferable to change the transparency of the object linearly. The unit of the scroll amount is a logical pixel, which may be different from an actual pixel of the display.

Further, the game request receiver can accept a play end request for a predetermined game from the first user terminal 100 after the game video distribution portion distributes information about the second video.

The play end request can be sent by selection of an end button arranged on the game screen.

Then, when the game request receiver receives the play end request of the predetermined game, the video distribution portion can end the distribution of the information about the second video and distribute the information about the first video.

That is, what is distributed here is not part of the information of the first video, but all the information of the first video.

Then, when the video distribution portion ends the distribution of the information about the second video and distributes the information about the first video, what is displayed on the second user terminal 200 is the first video.

The following is an explanation of a flow to start viewing the video.

The one or more processors in this disclosure may further include a viewing receiver.

The viewing receiver receives a video viewing request from a user.

The video distribution portion distributes video and sound information as video information to the user's information processing terminal in response to the viewing request.

Figure 12:
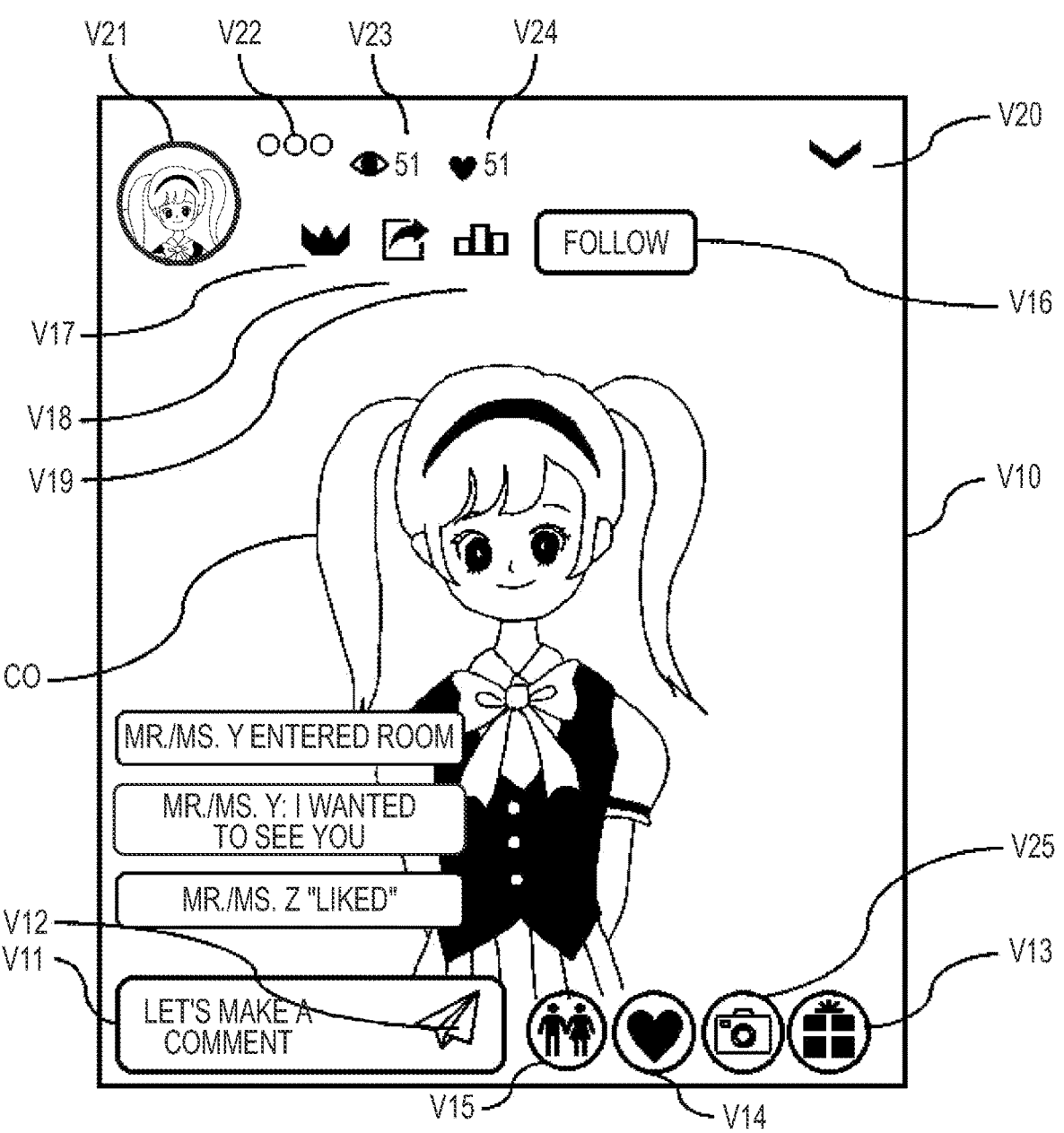
FIG. 12 is a conceptual diagram showing an image of a screen displayed on a user terminal.

FIG. 12 is an example showing a viewing screen V10 of an avatar video displayed on the second user terminal 200.

The viewing user can post a comment by inputting text in a comment posting field V11 and pressing a send button V12.

Further, by pressing a gift button V13, a gift list (screen V30 in FIG. 13) is displayed to the viewing user, and a display request for a gift designated by selection can be sent.

At this time, the one or more processors in this disclosure may include a determination portion. The determination portion determines whether there is a gift display request from the second user terminal 200.

The display request can include gift object information. The gift object information includes at least (i) gift object identification information that specifies the type of the gift object and (ii) position information that indicates the position where the gift object is to be displayed.

Figure 13:
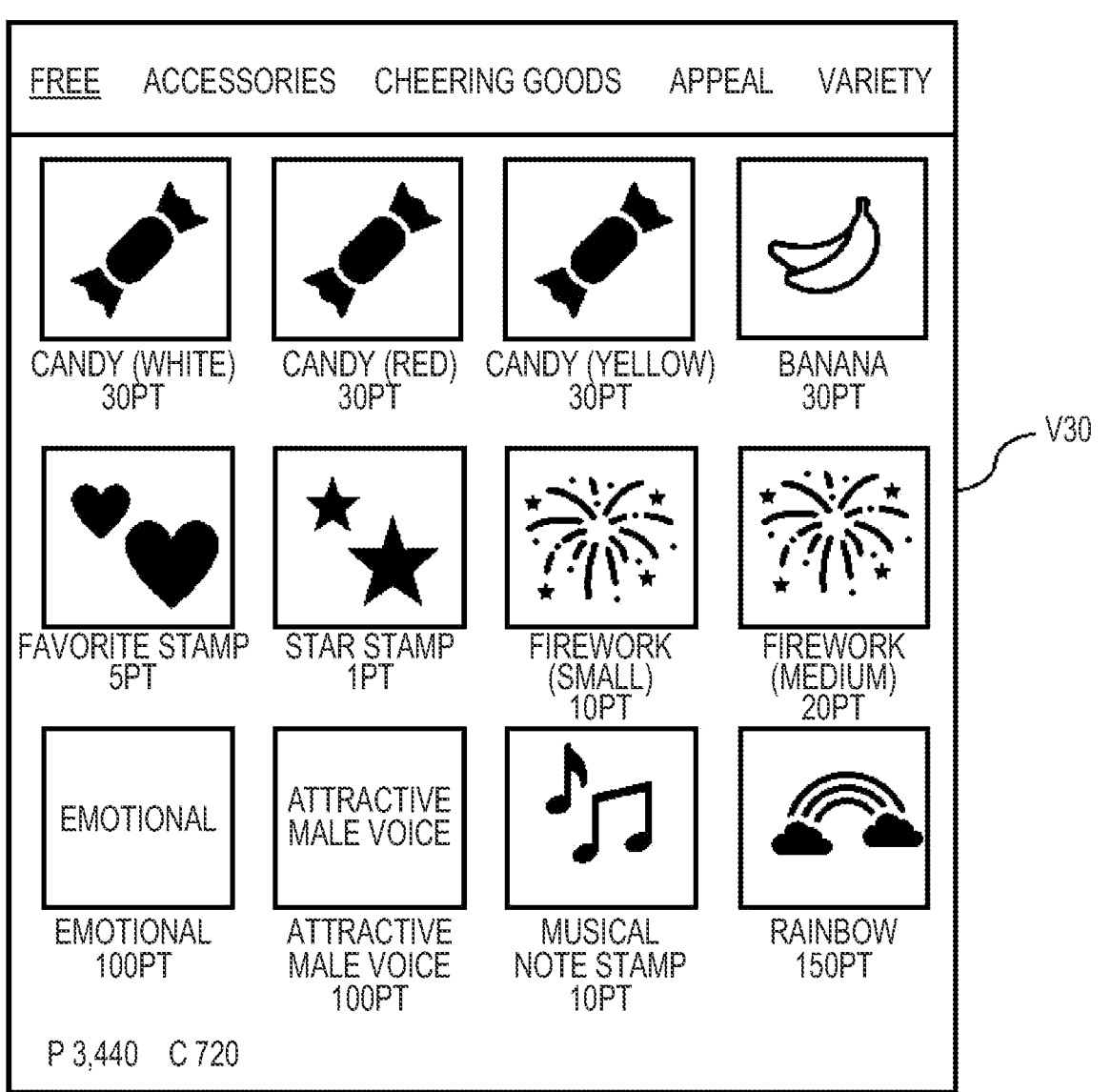
FIG. 13 is a conceptual diagram showing an image of a screen displayed on a user terminal.

Further, as shown in FIG. 13, gifts can be displayed separately for each category (free (paid) gifts, accessories, cheering goods, appeal, variety, or the like).

Here, a paid gift is a gift (coin gift) that can be purchased by the consumption of "My Coin" purchased by the viewing user. A free gift is a gift (point gift) that can be obtained with or without consumption of "My Points," which the viewing user has obtained for free.

The term "gift" used in this application means the same concept as the term "token." Therefore, it is also possible to replace the term "gift" with the term "token" to understand the technology described in this application.

Furthermore, the viewing user can post a rating showing favor by pressing a like button V14. In addition to/in place of the like button V14, it is also possible to display a button for posting a negative rating or other emotions.

In addition, when the first user has enabled other users' appearances in the distribution settings, a user can send a request to appear in the video by selecting a collaboration request button V15.

In addition, a follow button V16 for a second user to follow a distributing user is displayed on the screen of a video distributed by a first user whom the second user has not yet followed. This follow button functions as an unfollow button on the screen of a video distributed by a first user whom a second user is already following.

This "follow" may be performed from a second user to another second user, from a first user to a second user, and from a first user to another first user. However, this "follow" is managed as a one-way association, and a reverse association is managed separately as a "follower."

Additionally, a photo button V25 for saving a still image of the screen can also be displayed.

Further, a cheering ranking display button V17, a share button V18, and a ranking display button V19 are also displayed on the viewing screen V10.

The cheering ranking displays the ranking of a second user who cheers a first user, and the ranking can be calculated according to the amount of gifts (points/coins) or the like.

Additionally, regarding the sharing of videos, by pressing the share button V18, the second user can check a list of SNS (Social Networking Services) that can be shared, and can send a fixed link to a designated location of the SNS designated by selection.

Furthermore, by pressing the collaboration request button V15, it is possible to request collaborative distribution from a first user. Collaborative distribution means that the character object of a second user is caused to appear in a distributed video of the first user.

At the top of the viewing screen V10, a distributing user icon V21, a distributing user name (character object name) V22, a cumulative number-of-viewers display V23, and a cumulative number-of-likes display V24 can be displayed.

Further, when the viewing end button V20 is selected, a screen for ending viewing appears, and a viewing end request can be sent.

The screen for ending such viewing will be described in detail. Such a screen is called "small window sound distribution," and is for viewing a video in a manner of playing only the sound without displaying the image of the video.

The selection of the viewing end button V20 is accepted by the viewing receiver as a video viewing end request.

At this time, the video distribution portion ends the distribution of the image-related information in response to the viewing end request, but does not end the distribution of the sound-related information.

Thus, when the image- and sound-related information are distributed at the user terminal, the image is displayed on the main screen at the user terminal, and when only the sound information is distributed, the image is not displayed at the user terminal and a sub screen indicating that the video is being viewed is displayed.

Figure 14:
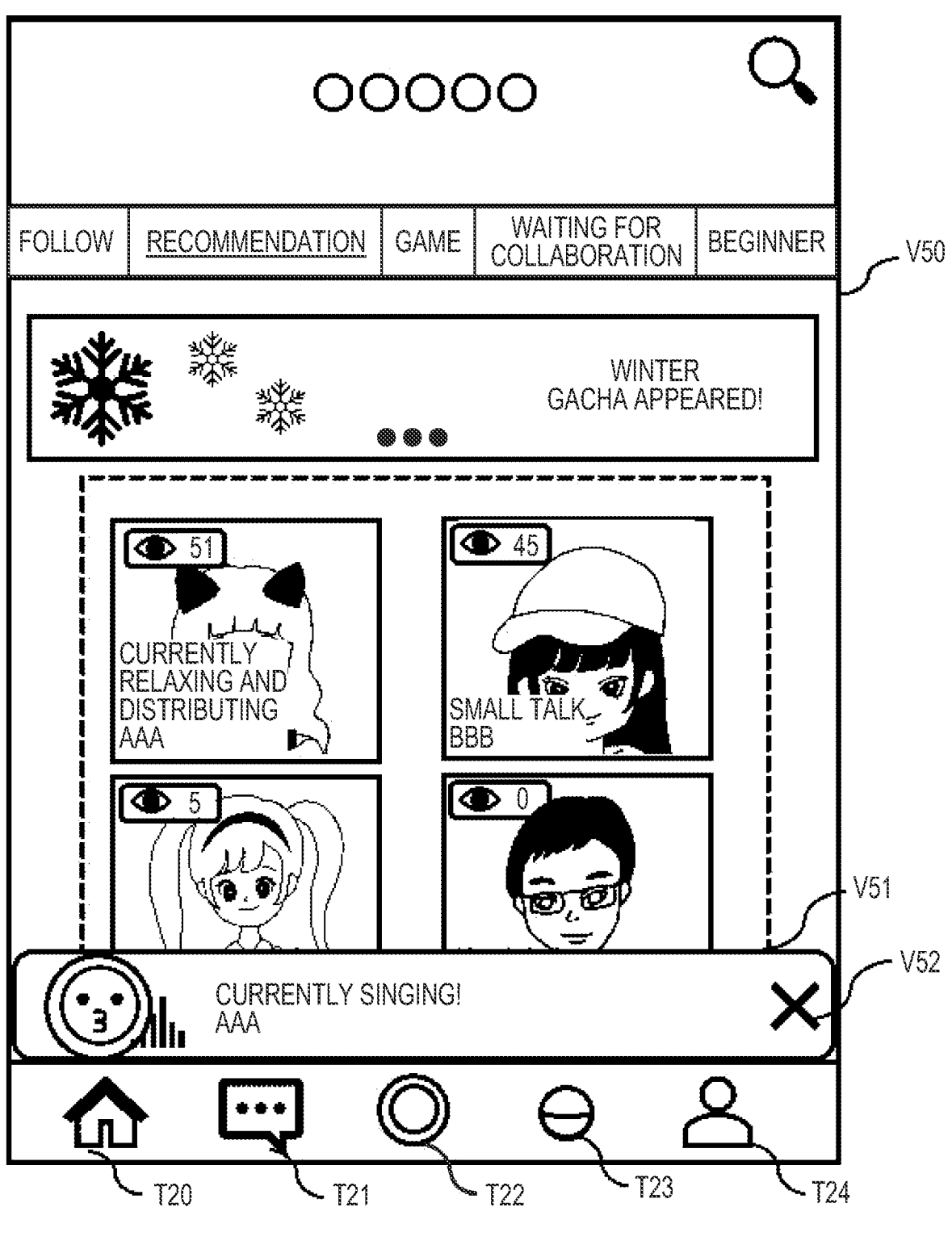
FIG. 14 is a conceptual diagram showing an image of a screen displayed on a user terminal.

FIG. 14 shows an image of a screen V50 on which a sub screen V51 is displayed.

When this sub screen V51 is displayed, the main screen displayed at the back transitions to the screen before viewing the video. For example, when moving from a recommendation tab to the viewing frame, the display returns to the recommendation tab, and when moving from the follow tab to the viewing frame, the display transitions to the follow tab.

When this sub screen V51 is being displayed, operation on the main screen becomes possible, and transition to another screen becomes possible.

On the sub screen V51, a profile image, a name, a title, and a sound icon that can visually identify that sound is playing are displayed.

Then, by selecting an end icon V52 displayed on the sub screen V51, the viewing can be completely ended.

Regarding the end of the display of the image, the information may be sent from the server device, but not displayed at the terminal side, or the transmission of the information itself from the server device may be stopped.

With such a configuration, it becomes possible to search for other distributions and enjoy chatting with other users while listening only to sound.

Next, a "collaboration" in which another user appears in the video of the first user will be described.

As described above, a second user can send a request to participate in the video via the confirmation screen of the collaborative distribution participation request, which is displayed by pressing the collaboration request button V15 shown in FIG. 12.

A collaboration avatar display portion provided to one or more computer processors in this disclosure causes a character object generated based on the movement of the viewing user who made the participation request to be displayed in the video, in response to the received participation request.

Figure 15:
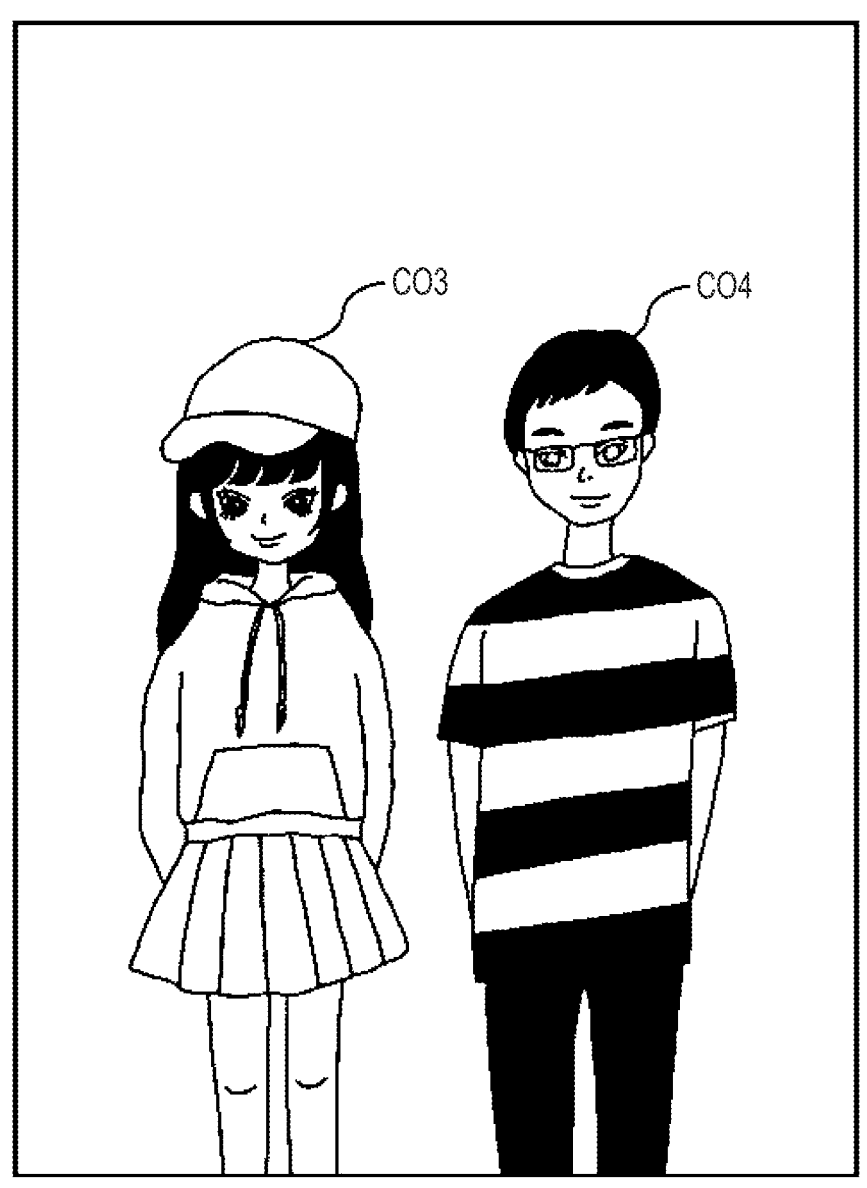
FIG. 15 is a conceptual diagram showing an image of a screen displayed on a user terminal.

FIG. 15 shows, as an example, a viewing or distribution screen when a second avatar CO4, which is a character object of a guest user, participates in a video in which a first avatar CO3, which is the character object of the host user, is displayed. In FIG. 15, the display of objects other than the avatars is omitted.

Figure 16:
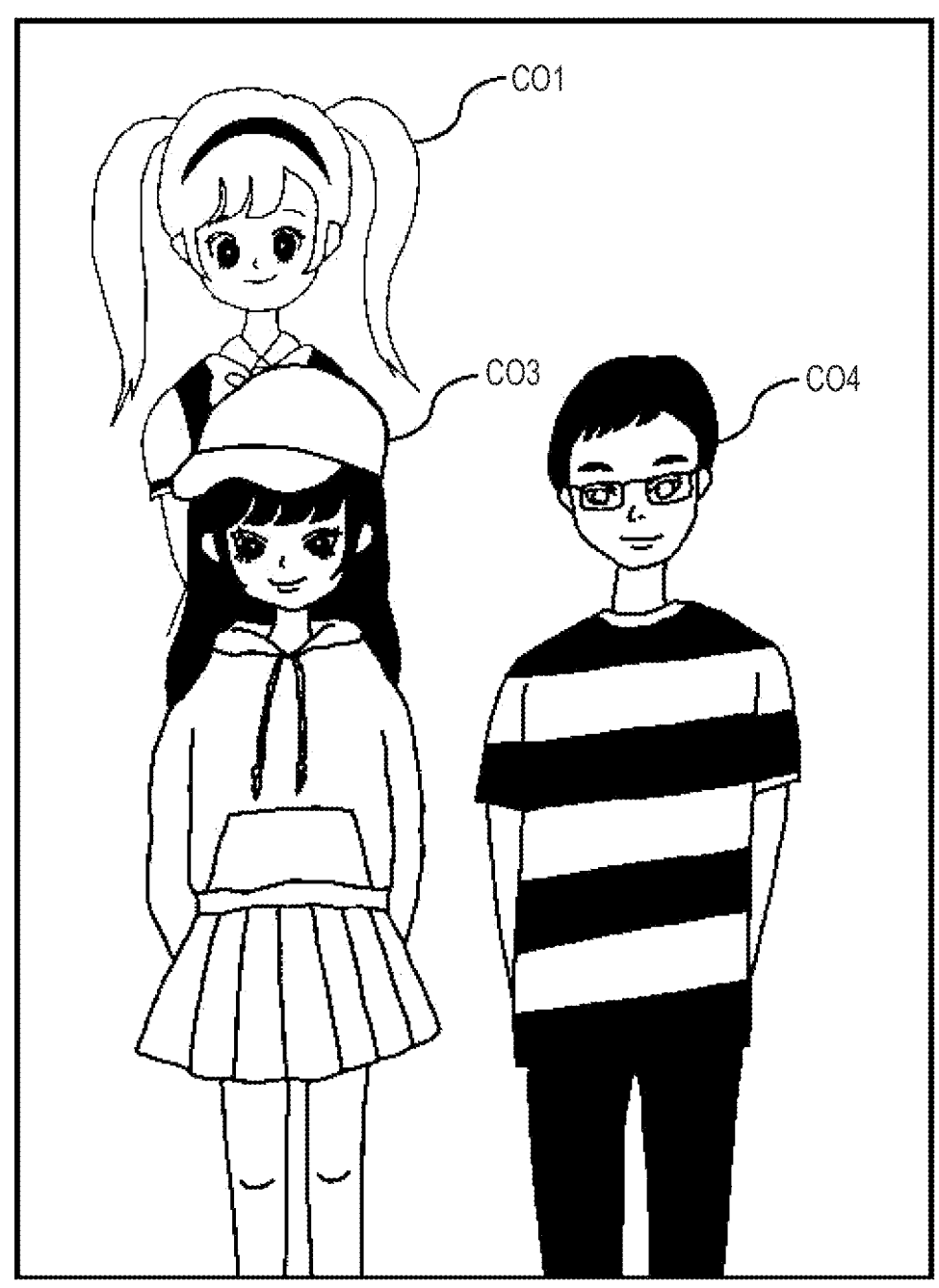
FIG. 16 is a conceptual diagram showing an image of a screen displayed on a user terminal.

Further, as shown in FIG. 16, a third avatar CO1, which is a character object generated based on the movement of another viewing user, may participate in the video. Additionally, although the third avatar CO1 is arranged behind the first avatar CO3 and the avatar CO4 in FIG. 16, the three people may be arranged so as to line up in a horizontal row. Further, the arrangement position of the avatars may be designated by the distributing user.

Figure 17:
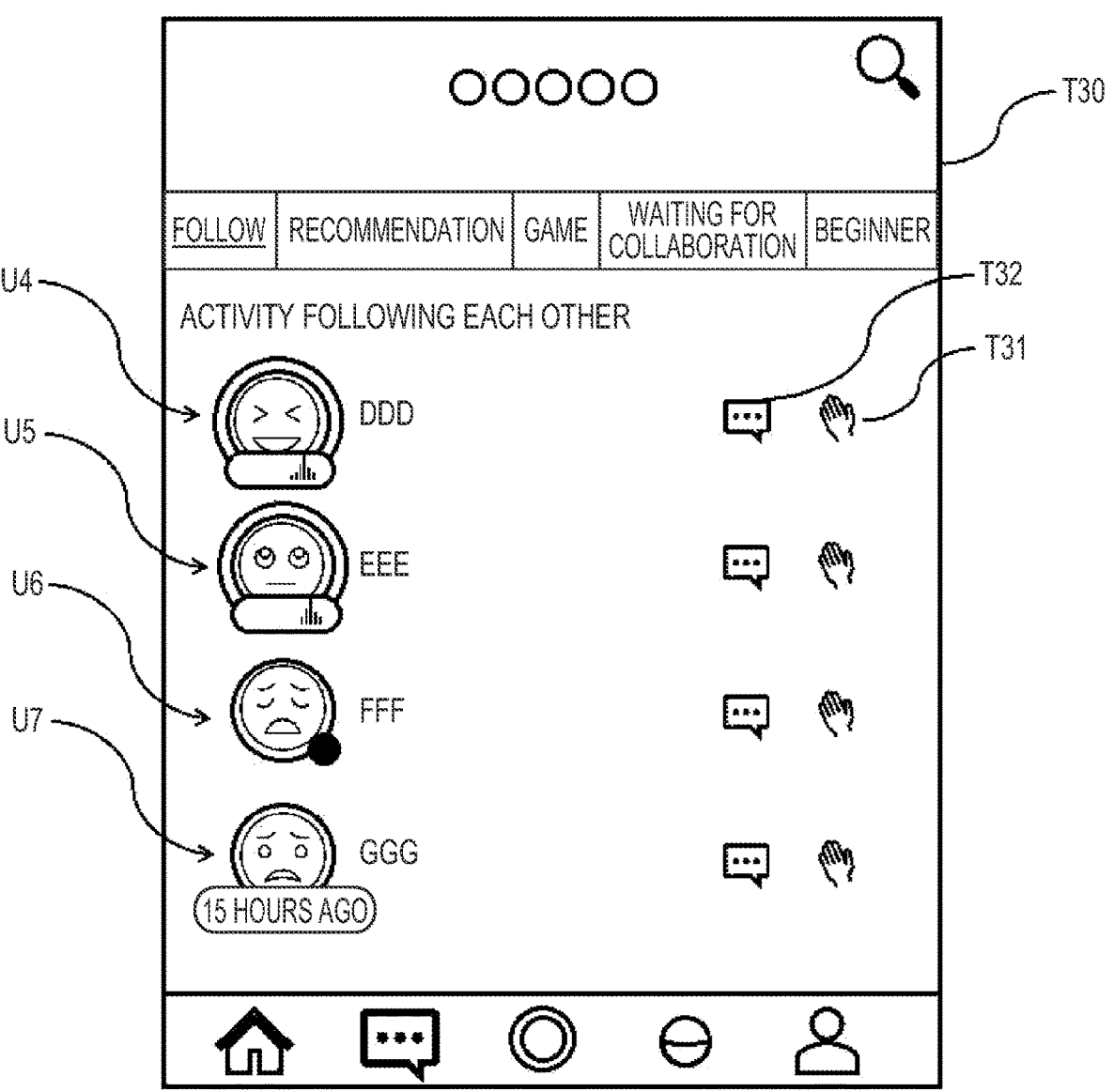
FIG. 17 is a conceptual diagram showing an image of a screen displayed on a user terminal.

FIG. 17 shows a list screen T30 of users having a mutual follow relationship, which is displayed by selection of the follow tab on the top screen shown in FIG. 5. Mutual follow is a relationship in which each is a follower of the other.

On the list screen T30, profile images and names of users who have a mutual follow relationship are displayed.

As shown in FIG. 17, a first object T31 is displayed on the list screen T30 for each of the users having a mutual follow relationship. Further, a chat object T32 may be displayed together with the first object T31. By selecting this chat object, it is possible to transition to an individual chat screen with a second user.

Selection of the first object T31 sends a predetermined notification to the terminal of the user associated with the first object T31.

The predetermined notification may be, for example, a call notification.

Nest, a detailed description of a flow for executing a video chat in an embodiment of this disclosure will be explained.

As an example, a user can execute a video chat from an individual chat screen or a group chat screen.

These chat screens can be transitioned to, for example, from a chat list screen C10 (FIG. 18) expanded by selecting the message button T21 on the top screen T10 (FIG. 5).

Figure 18:
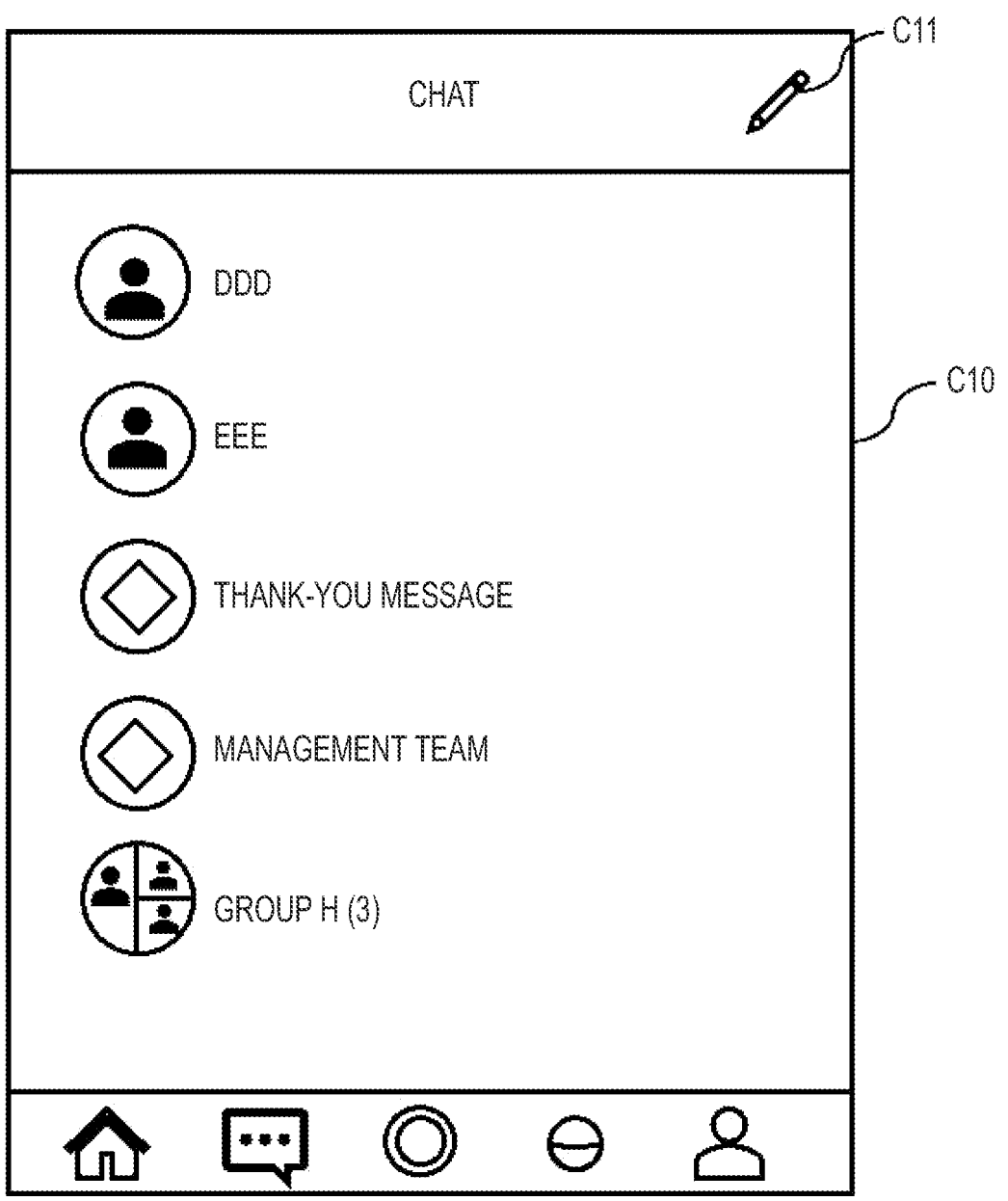
FIG. 18 is a conceptual diagram showing an image of a screen displayed on a user terminal.

The chat list screen C10 shown in FIG. 18 displays icons of users (character objects) or icons of groups that have sent or received messages (chats) in the past, along with their names or titles. The icons of groups can include icons of users (character objects) participating in the groups.

Figure 19:
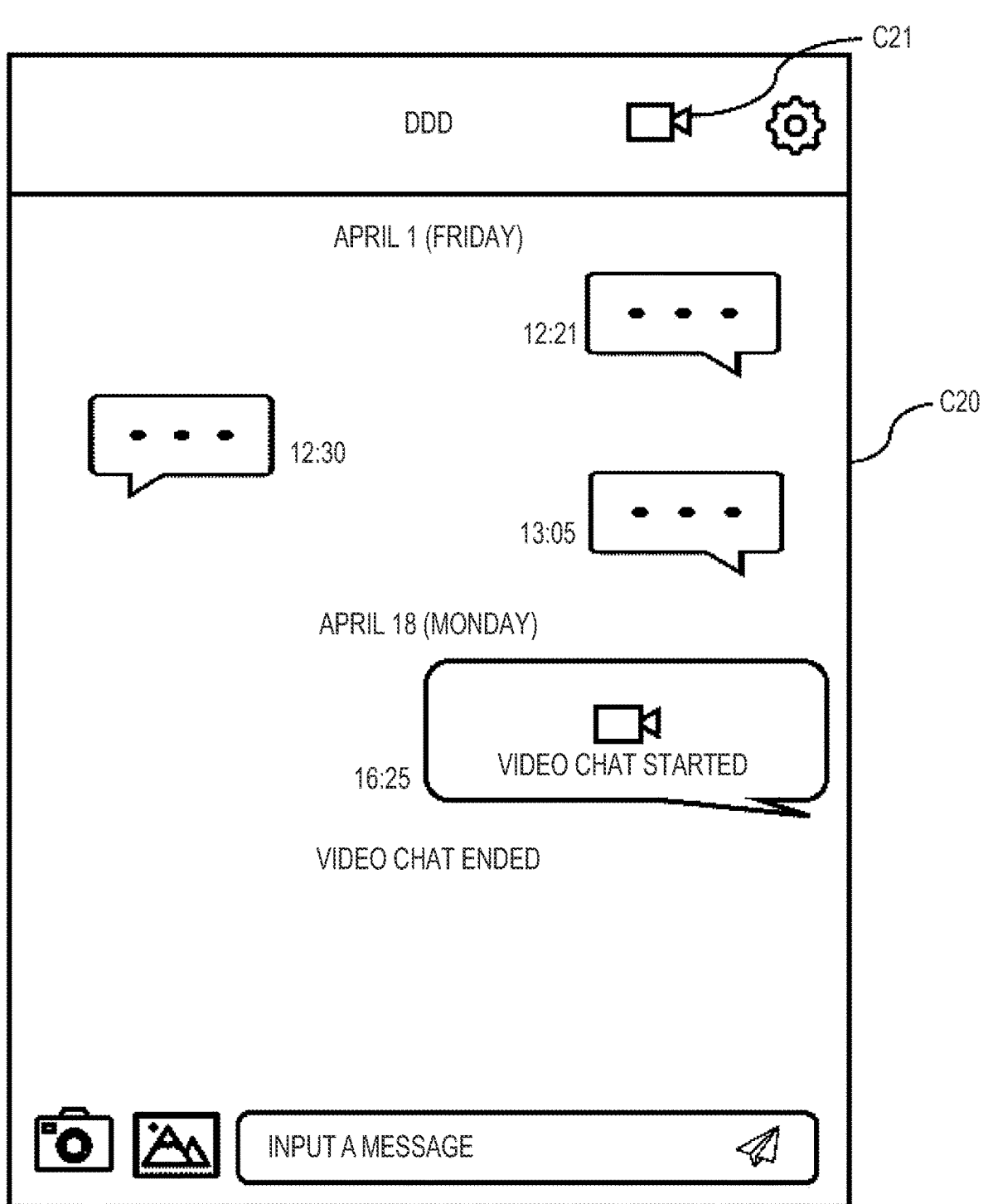
FIG. 19 is a conceptual diagram showing an image of a screen displayed on a user terminal.

The user can then select one user or group on the above-described chat list screen C10, open an individual chat screen C20 (FIG. 19) or a group chat screen, and select a video chat button C21 to start a video chat.

Figure 20:
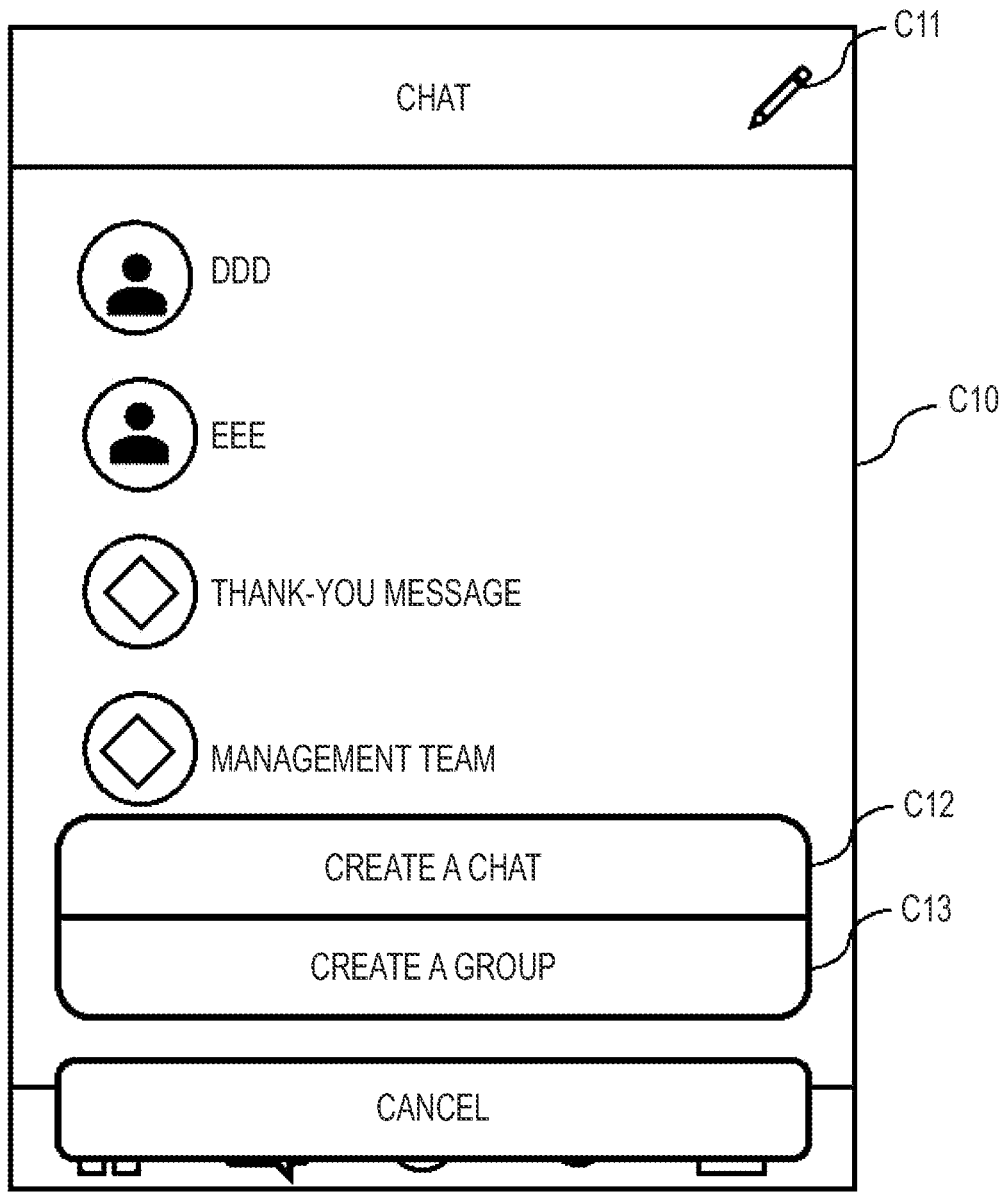
FIG. 20 is a conceptual diagram showing an image of a screen displayed on a user terminal.

Additionally, by selecting a chat creation button C12 or a group creation button C13 displayed by selecting an edit button C11 on the chat list screen C10 (FIG. 20), a chat screen of a user or group not displayed on the chat list screen C10 can be created.

Figure 21:
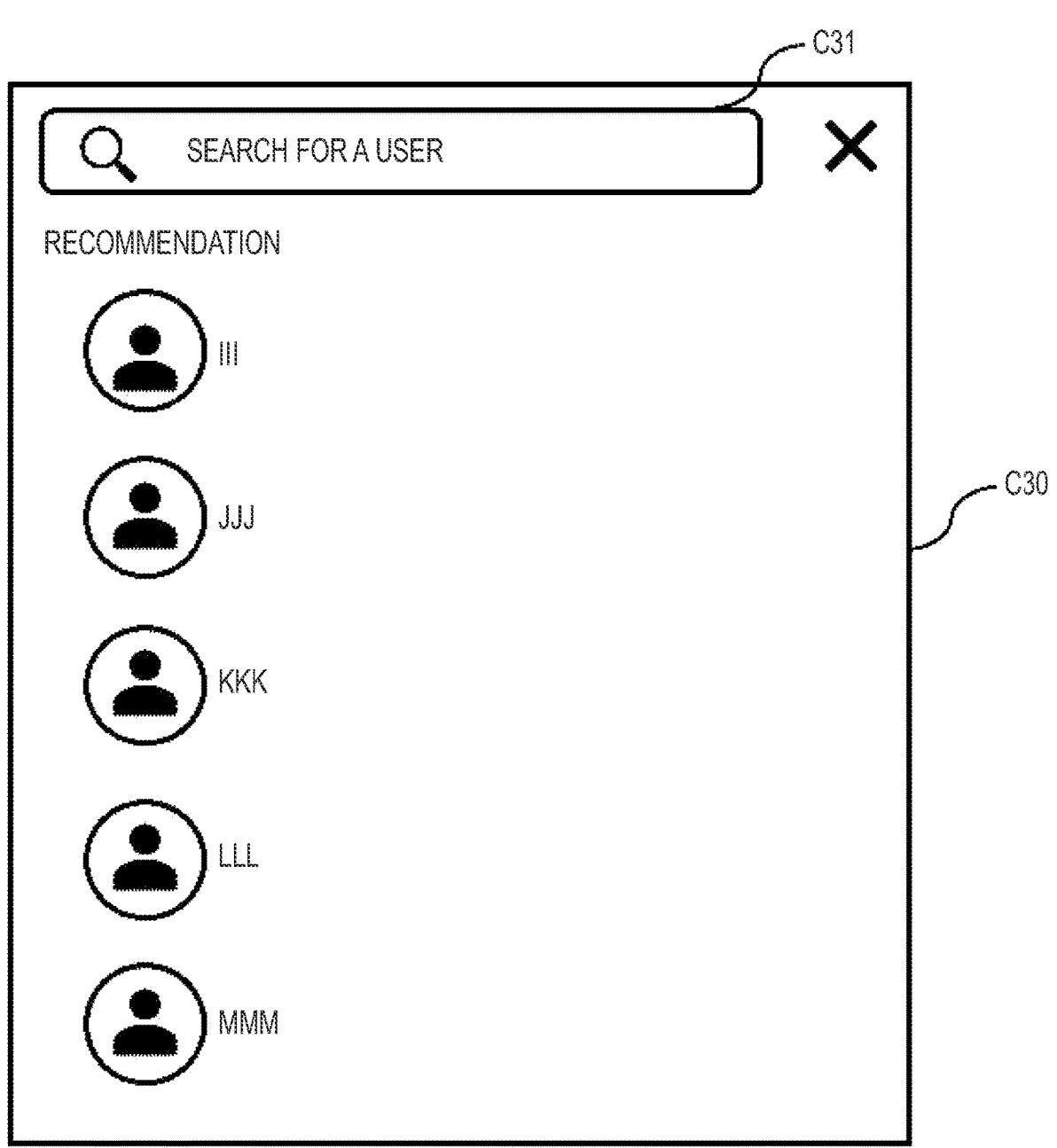
FIG. 21 is a conceptual diagram showing an image of a screen displayed on a user terminal.

FIG. 21 is a user selection screen C30 that deploys when the chat creation button C12 is selected, and a chat screen with a recommended user(s) that is being displayed or a user searched for using a search field C31 is displayed/generated. A configuration of the generated chat screen is the same as the chat screen C20 shown in FIG. 19, and video chatting can be started by selecting the video chat button C21.

Figure 22:
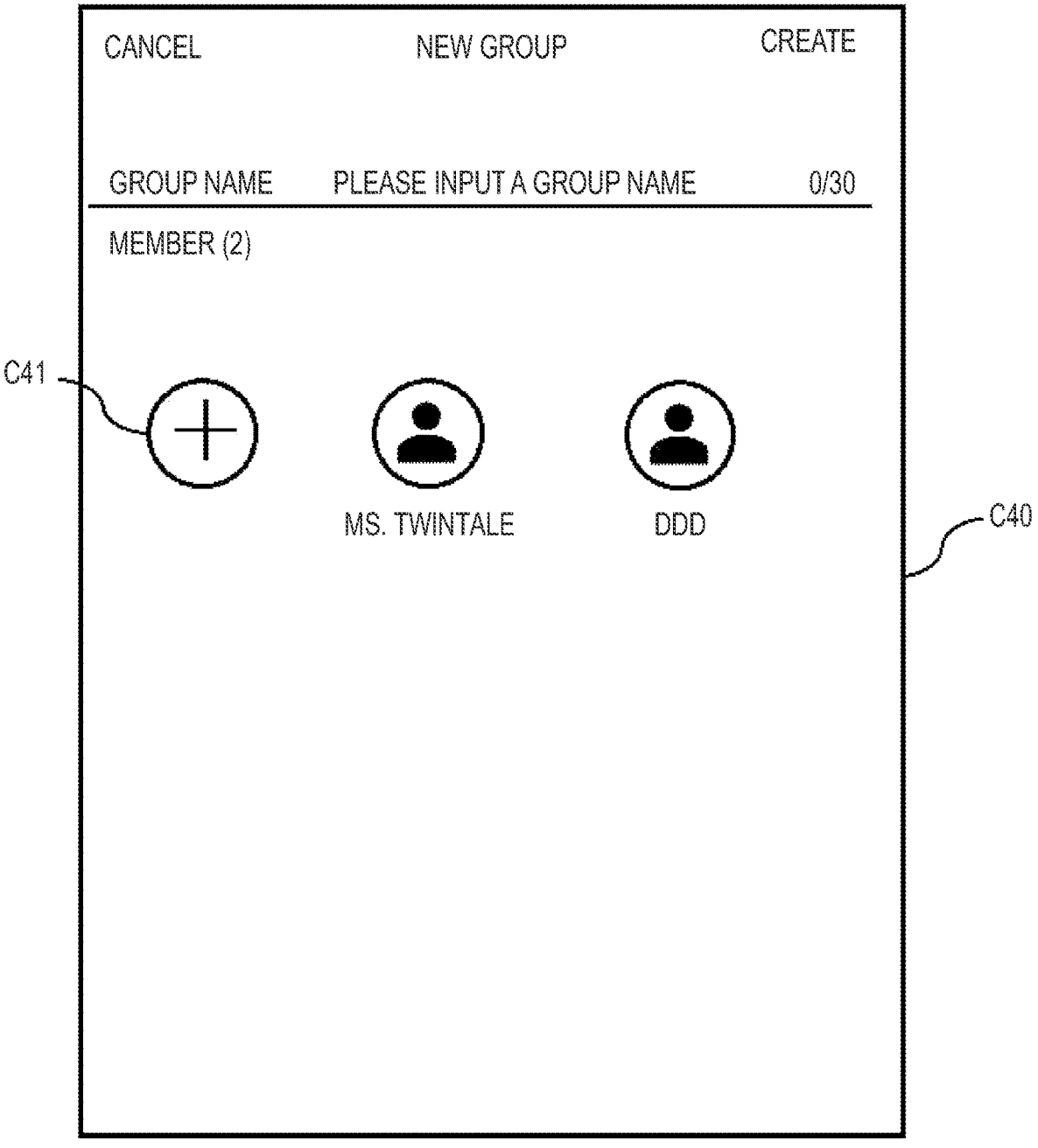
FIG. 22 is a conceptual diagram showing an image of a screen displayed on a user terminal.

Similarly, FIG. 22 shows a group creation screen C40 that deploys when the group creation button C13 is selected. The user can add users other than himself/herself as group members by selecting a user addition button C41. As an example, the number of group members that can be added is up to 7. A group name can also be set on this screen.

Figure 23:
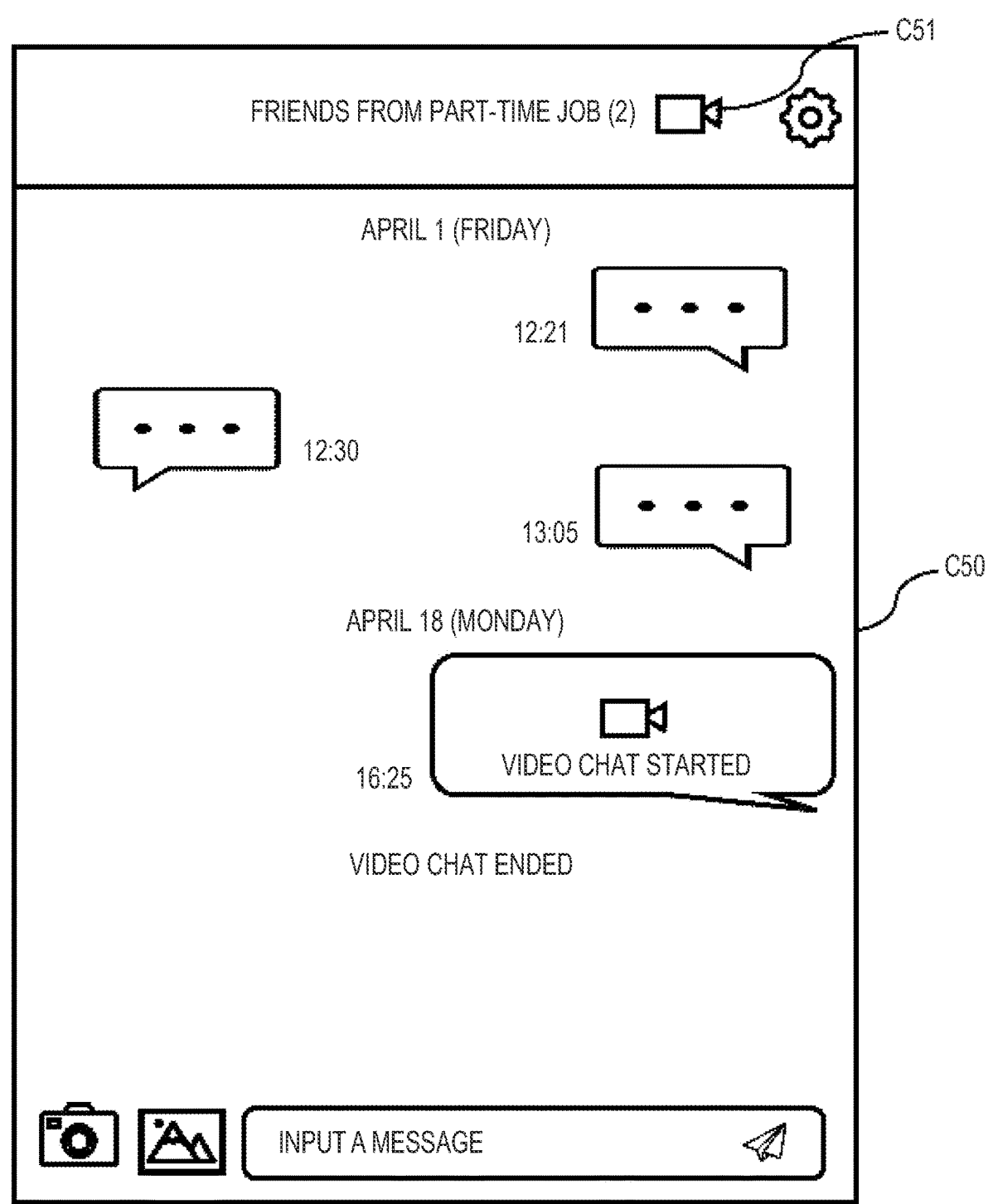
FIG. 23 is a conceptual diagram showing an image of a screen displayed on a user terminal.

Once a group is created, a group chat screen C50 is displayed (FIG. 23). In the group chat screen C50 as well, video chatting can be started by selecting a video chat button C51.

Furthermore, the above-described chat screen C20 can be transitioned to from the chat icon T32 of the follow list screen T30 (FIG. 17).

Also, a chat icon can also be arranged on a profile screen of another user, and the user can transition from various pages to a chat screen, and start a video chat.

When a video chat is started, a notification is sent to the other party, and the other party can participate in the video chat by responding to the notification. Users can set whether or not to receive such notifications.

Furthermore, the system may be configured to allow video chatting only with users who are in a mutual follow relationship. In this case, the system may be configured to display an icon on the follow list screen indicating that a user in a mutual follow relationship is in a video chat with another user, and a user may select the icon to participate in such an ongoing video chat.

The video chat in this disclosure can be said to be a function that allows only a specific user to view the collaborative distribution described above. The specific user here refers to a user participating in a video chat.

Next, an image of the spread of the virtual space in this disclosure will be described with reference to FIG. 24.

Figure 24:
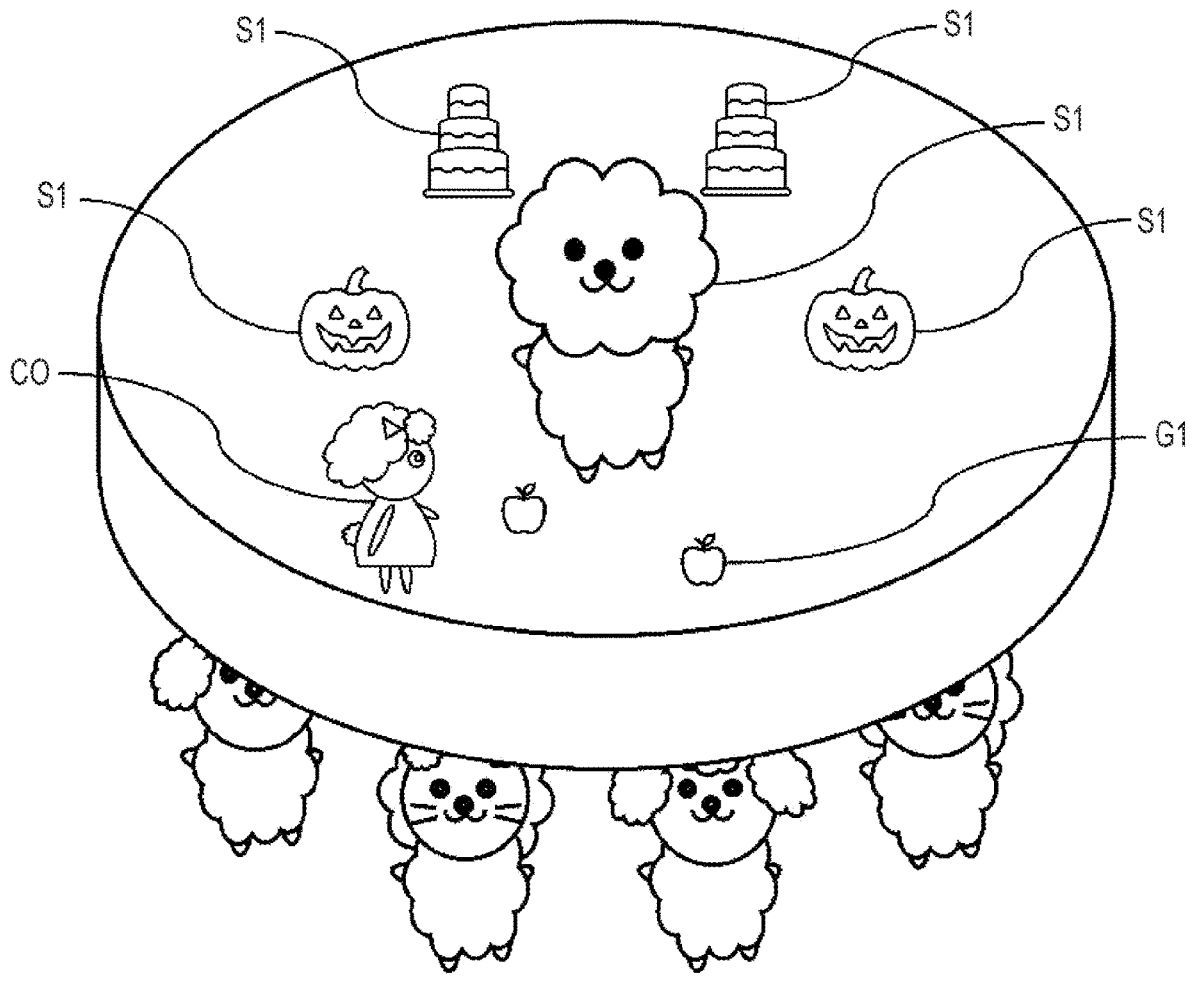
FIG. 24 is a conceptual diagram showing an image of a virtual space described in this disclosure.

As shown in FIG. 24 as an example, the virtual space in this embodiment is arranged such that a disk-shaped island (world) is floating in the air. This island is an object in the form of a tower-shaped cake turned upside down, and can be configured such that various objects are arranged on a disk-shaped ground. The island and the ground are shown as an example, and the display mode thereof is not particularly limited.

The objects that can be displayed include at least the character object CO of a first user, a gift object G1 corresponding to a gift for which a display request was made by a second user, and an object Si, the display position and display timing of which are controlled by the server device 400 (system side).

The character object can be caused to move, jump, and the like within the world by user operation, and such functions can be provided as one of the games described above, for example. In this disclosure, this is specifically referred to as "world distribution" and the procedures for starting and ending game distribution described above apply.

Specifically, switching from normal distribution (avatar distribution) to world distribution can be performed by selecting the play start button D33 of a game displayed in the avatar distribution video (FIG. 8) or by selecting the play button G11 or G21 of one game selected from the game list displayed on the destination screen to which the user has moved by selecting the play start button D33 (FIG. 9, FIG. 10).

Also, switching from world distribution to avatar distribution can be performed by selecting a play end button displayed in a world distribution video.

Next, various functions executable in the information processing system 3000 according to an embodiment of this disclosure will be described with reference to the drawings.

The information processing system 3000 according to an embodiment of this disclosure can be, for example, an information processing system that provides a virtual space in which the character object of the user can be displayed.

The virtual space is not particularly limited as long as the space is one that can display the user's character object.

Figure 25:
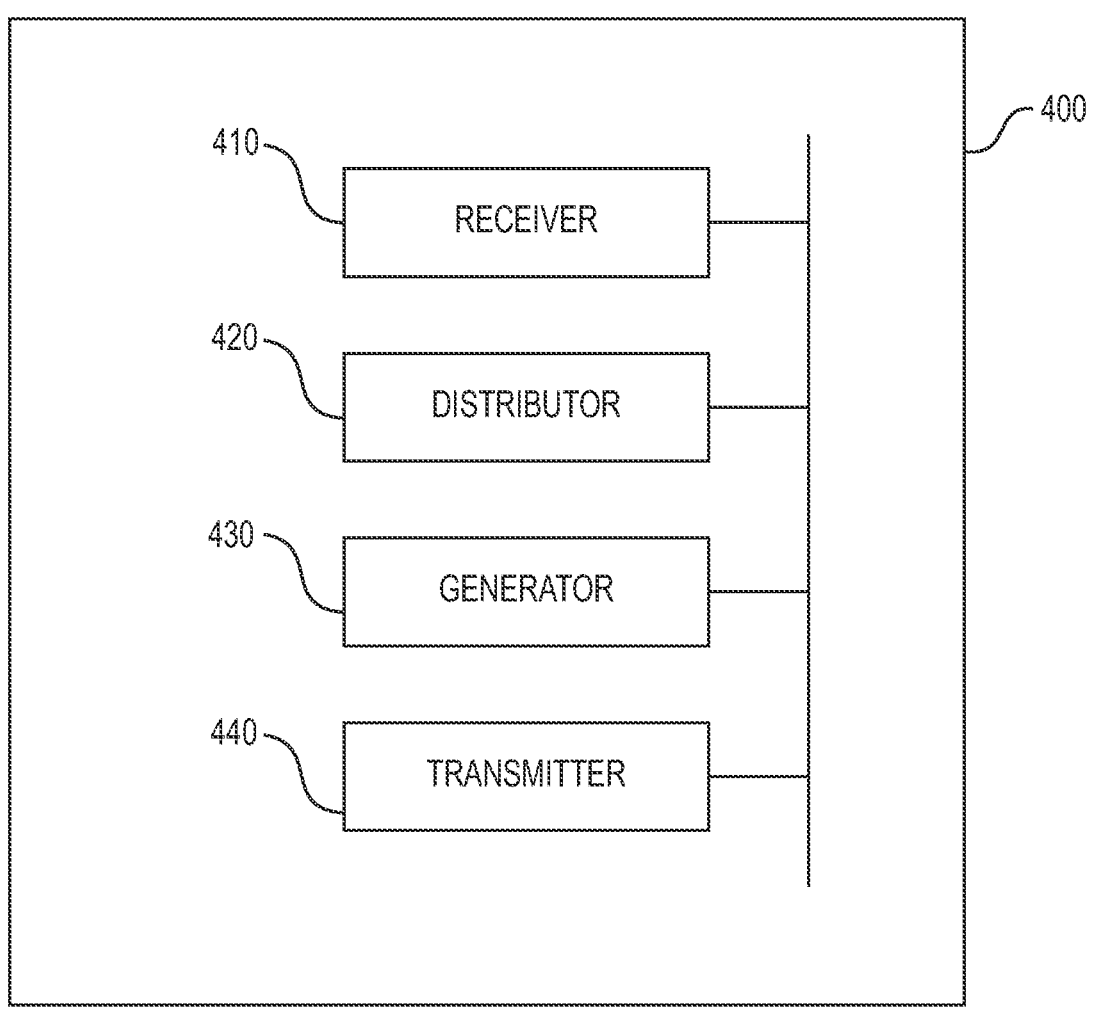
FIG. 25 is a configuration diagram showing an example of a functional configuration of a server device in this disclosure.

One or more computer processors included in the information processing system 3000 include a receiver 410, a distributor 420, a generator 430, and a transmitter 440, as shown in FIG. 25 as an example.

In this embodiment, the receiver 410, the distributor 420, the generator 430, and the transmitter 440 are all included in the server device 400, but this illustrative and not limiting.

The receiver 410 receives information transmitted from the first user terminal 100 of the first user and/or the second user terminal 200 of the second user.

Here, it is assumed that the first user is a distributing user, and that the first user terminal 100 is the information processing device of the distributing user.

Similarly, it is assumed that the second user is a viewing user, and that the second user terminal 200 is the information processing device of the viewing user.

The information transmitted from the first user terminal 100 includes all information transmitted from the first user terminal 100.

As an example, the information transmitted from the first user terminal 100 includes information for displaying character objects such as the motion data and audio data of the first user, requests to display various screens, other operation information, and the like.

Furthermore, the information transmitted from the second user terminal 200 includes all information transmitted from the second user terminal 200 to the server device 400.

As an example, the information transmitted from the second user terminal 200 includes display requests for gifts, comments, or the like; other operation information; and the like.

By transmitting information regarding a video including the first user's character object to the second user terminal 200, the distributor 420 makes the video viewable on the second user terminal 200.

As described above, the information regarding the video containing the first user's character object includes motion information indicating the movement of the character object, audio information of the first user, gift object information indicating a gift sent from the viewing user (second user or another user), or the like.

The generator 430 generates object display data, which is data to be displayed in an object display frame displayed on the second user terminal 200 together with video, based on history information stored in association with the first user and/or the second user.

The history information can be stored in a memory that can be provided in the information processing system 3000, a memory device that can be connected to the information processing system 3000, or a memory that can be provided in the first user terminal 100 or the second user terminal 200.

The history information stored in association with the first user includes, as an example, a history regarding an action of the first user and/or a history regarding an action of the second user on the video of the first user, or the like.

The action of the first user is, for example, participation in an event by the first user.

The event is an event related to a score during video distribution in which a distributing user can participate, and can be broadly classified into three types: ranking type, score achievement type, and score achievement ranking type.

The score is determined by the number of coins and the number of points required for the viewing user to cast (make a display request for) gifts acquired during video distribution. As an example, the score can be calculated as ten times the number of gift coins acquired during video distribution plus one times the number of gift points acquired during video distribution.

A ranking type event is an event in which a ranking of distributing users is created based on the cumulative score obtained by each distributing user during a predetermined period (for example, an event period), and rewards are given to the top several users.

A score achievement type event is an event in which a reward is given on the condition that the cumulative score obtained by each distributing user in a predetermined period reaches a predetermined value.

A score achievement ranking type event is an event in which, in addition to a reward being given on the condition that the cumulative score obtained by each distributing user in a predetermined period reaches a predetermined value, a ranking of distributing users based on the cumulative scores is created and additional rewards are given to the top several users.

Upon receiving a request to participate in a predetermined event from the first user terminal 100, the server device 400 associates the first user and the predetermined event and stores these as an event participation history. The participation history herein includes at least information regarding the event in which the first user is currently participating.

Further, the history regarding the actions of the first user can include an act in which the first user specifies a gift that he or she desires (a begged gift).

The desired gift can be specified from the distribution setting screen D20, or the like, and the first user can specify the gift ID, gift theme color, gift theme number, and the like.

The action by the second user on the video of the first user is, for example, a request by the second user to display a gift in the video of the first user.

Upon receiving a gift display request from the second user terminal 200, the server device 400 stores the number of display requests as a gift history for each gift type (for each object ID).

The gift history referred to here may be aggregated for the videos that the second user is currently viewing, or may be aggregated for all videos of the first user that have been viewed in the past.

Figure 26:
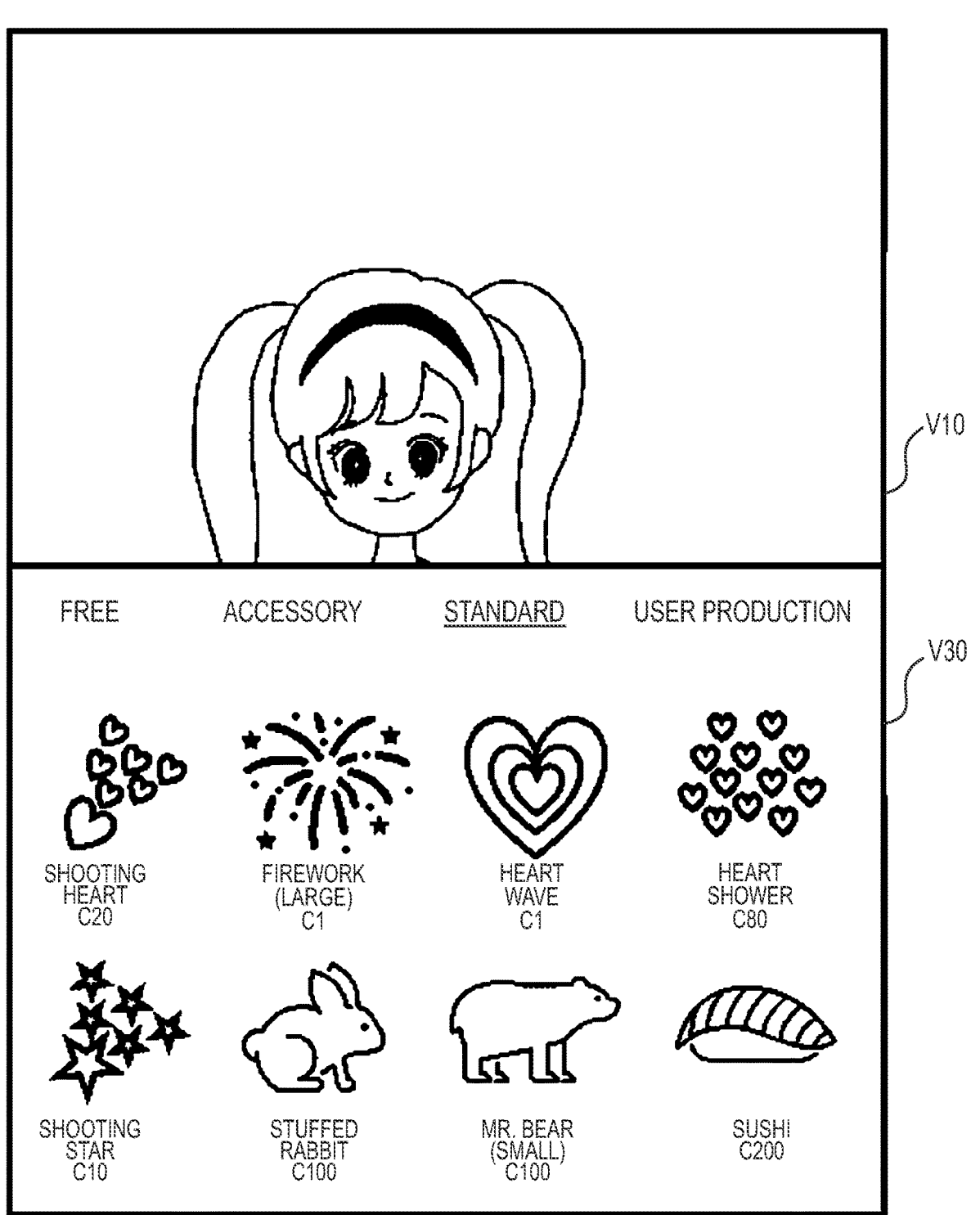
FIG. 26 is a conceptual diagram showing an image of a screen displayed on a user terminal.

Here, FIG. 26 shows a conventional example of an object display frame displayed on the second user terminal 200 together with a video.

In FIG. 26, buttons and objects other than the avatar displayed in the video are as described above, and are therefore not shown.

As shown in FIG. 26, on the viewing screen V10, an object display frame V30 is displayed together with the video. Being displayed together with the video includes a mode in which the video and the object display frame V30 are displayed separately, as well as a mode in which the object display frame V30 is displayed superimposed on the video.

In this way, the object display frame V30 is a display frame for the second user to request display of an object (gift). That is, the object display frame V30 corresponds to the gift list screen V30 shown in FIG. 13.

Furthermore, as shown in FIG. 26, in the object display frame V30, objects can be displayed in separate tabs for each category (free (paid), accessory, standard, user-created, or the like).

The object display data is data that defines the position, order, and/or display mode for displaying objects in the object display frame V30.

Alternatively, the object display data may be image data in which objects are arranged for display in the object display frame V30.

Here, as shown in FIG. 26 as a conventional example, when object display data is not generated based on history information, the display position, display order and/or display mode of objects in the object display frame V30 displayed on one second user terminal basically do not change except for reasons on the system side such as adding, changing, or deleting objects.

Furthermore, when the object display data is not generated based on history information, the display position, display order, and/or display mode of objects in the object display frame V30 displayed on each of a plurality of second user terminals are basically the same.

On the other hand, when the object display data is generated based on history information as in this disclosure, the display position, display order, and/or display mode of objects in the object display frame V30 displayed on one second user terminal can change.

Furthermore, when the object display data is generated based on history information as in this disclosure, the display position, display order and/or display mode of objects in the object display frame V30 displayed on each of a plurality of second user terminals can each be different.

Figure 27:
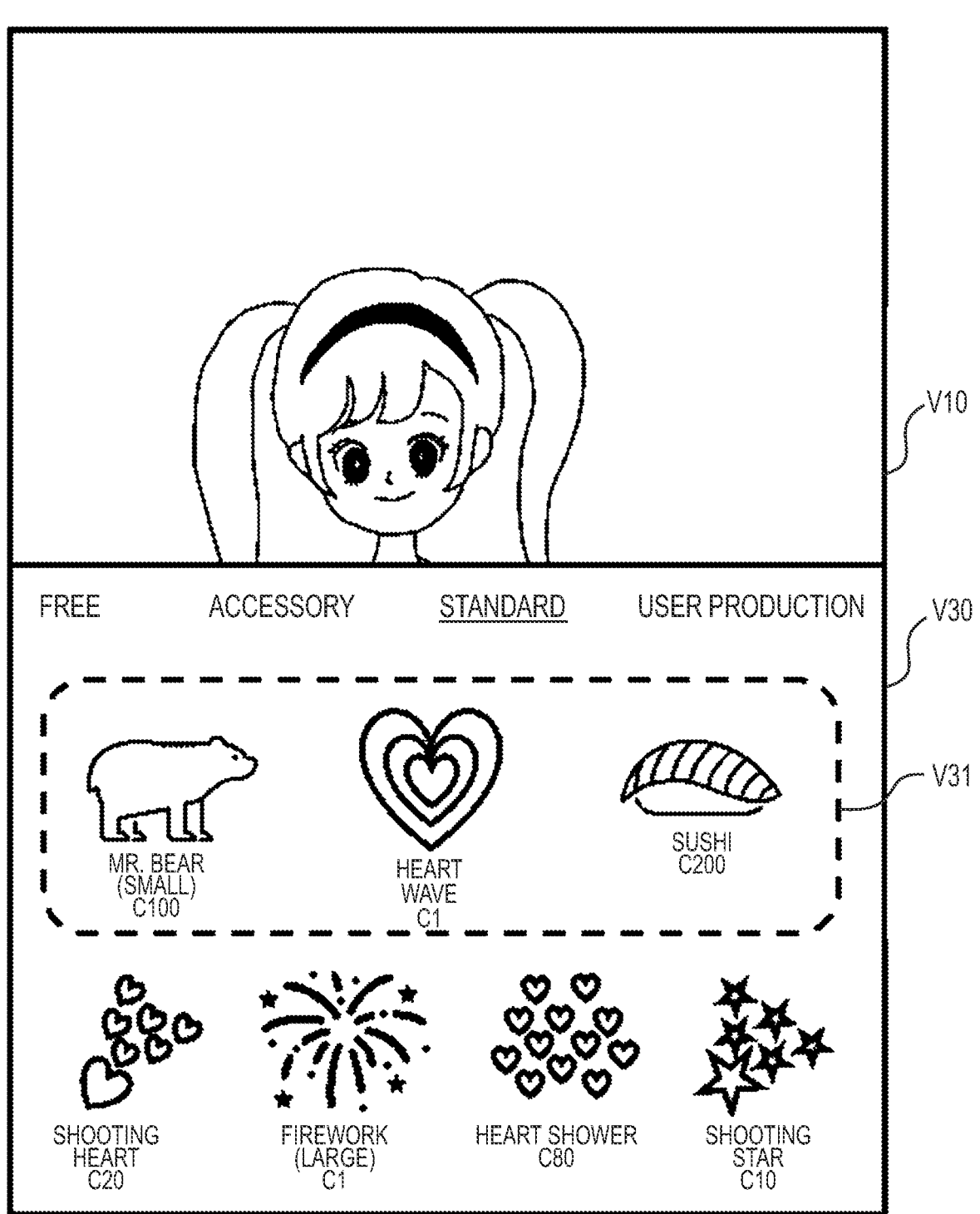
FIG. 27 is a conceptual diagram showing an image of a screen displayed on a user terminal.

FIG. 27 shows an example of the object display frame V30 displayed in accordance with the object display data generated based on the history information.

In FIG. 27, the upper position of the object display frame V30 is a first position, and with the configuration of this disclosure, it becomes possible to display an object corresponding to a gift that the second user requires/desires the first user to cast and/or that the second user desires to cast in the first position in an easy-to-understand manner for the second user.

For example, the generator 430 specifies a target object to be subjected to specific display control from among the objects displayed in the object display frame V30, based on the history information.

The specific display control is, for example, displaying the target object in the first position in the object display frame.

In this way, the generator 430 can generate the object display data for performing the above-mentioned specific display control.

Then, the transmitter 440 transmits the object display data generated by the generator 430 to the second user terminal 200 in response to the request for displaying the object display frame V30 from the second user terminal 200 that the receiver 410 has received.

As a result, the object display frame V30 in which objects are displayed is displayed at the second user terminal 200.

In the above explanation, it is assumed that generation of the object display data by the generator 430 is performed before the display request for the object display frame V30 from the second user terminal 200, but this may be performed after the aforementioned display request.

The above-described configuration provides a technical improvement that solves or alleviates at least part of the problem of the conventional technology described above.

Specifically, with the configuration of this disclosure, it is possible to improve the desire of a distributing user to distribute, the desire of a viewing user to view, and/or the desire of users to interact with each other.

Conventionally, depending on the distributing user, there may have been a gift that was needed/desired, but the viewing user had to search for the corresponding gift for each distributing user, and it took considerable effort to find the corresponding gift among a gift list where a huge number of gifts were displayed. Particularly in terminals with small displays, such as smartphones, if there are many gifts, the number of scrolls will increase. Therefore, there was a concern that the desire of the viewing user for gifting would decrease.

However, with the configuration of this disclosure described above, the objects (list of gifts) displayed in the object display frame displayed on the viewing user terminal are displayed according to the object display data generated based on the history information. Therefore, it is easier to find the desired gift than before, and the desire for gifting can be increased.

Furthermore, an increase in the number of giftings leads to an increase in the desire of the distributing user for distribution and an improvement in video quality.

Furthermore, the desire of viewing users to view high-quality videos increases, and as the number of viewing users increases, the desire of users to distribute videos further increases.

Furthermore, by gathering users who are highly motivated to use and distribute content, interaction among users will also be activated.

Next, details of the history information stored in association with the first user will be explained.

The history information stored in association with the first user can include information regarding a participation history, in which the first user and a predetermined event are associated.

As described above, upon receiving a request to participate in a predetermined event from the first user terminal 100, the server device 400 associates the first user with the predetermined event and stores these as a participation history for the event.

In principle, the number of predetermined events associated with the first user is one, but it is also acceptable to enable association of a plurality of events.

By using such history information, it becomes possible to display the gifts necessary for the first user to achieve a target score in an event, in the object display frame V30 displayed on the second user terminal 200, in a manner easy to search by the second user.

The history information stored in association with the first user can include information regarding a request to display a predetermined object in a video associated with the first user, which is transmitted from the second user terminal 200.

As described above, the request to display the predetermined object is, for example, a request by a second user to display a gift in the video of the first user.

The second user here can mean all viewing users who view the first video.

Upon receiving a gift display request from the second user terminal 200, the server device 400 stores the number of display requests and/or the time at which the display request was received as a history for each type of gift (for each object ID). The history here may be related to one video that the second user is currently viewing, or may be related to all videos of the first user that the second user has viewed in the past.

By using such history information, it becomes possible to display, in the object display frame displayed on the second user terminal 200, gifts that have been cast the most by all viewing users who watch the videos of the first user or gifts that have been cast recently, in a manner easy to search by the second user.

In addition, the gifts that are cast the most by viewing users with respect to the video of the first user are often gifts that the first user wishes to be cast in the video, so even if the first user does not speak in the video, or even if the second user misses what is said, the second user can understand the gift(s) that the first user desires by simply confirming the object display frame V30 displayed on his or her terminal.

Additionally, by displaying the most recently cast gifts in an easy-to-find manner, it becomes possible to cast specific gifts in succession with good timing. This is useful in cases where casting specific gifts in succession with good timing has the effect of displaying a special gift object.

Next, details of the history information stored in association with the second user will be explained.

The history information stored in association with the second user may include information regarding a request to display a predetermined object in the video associated with the first user, which is transmitted from the second user terminal 200.

The request to display a predetermined object is, for example, a request by the second user to display a gift in the video of the first user.

Upon receiving a gift display request from the second user terminal 200, the server device 400 stores the number of display requests and/or the time at which the display request was received as a history for each type of gift (for each object ID). The history here may be related to a video that the second user is currently viewing, or may be related to all videos of the first user that the second user has viewed in the past.

By using such history information, it becomes possible to display, in the object display frame V30 displayed on the second user terminal 200, a gift that the user has cast the most or a gift that have been cast recently with respect to the video of the first user, in an easy-to-find manner.

The history information stored in association with the second user includes a request, sent from the second user terminal 200, to display a predetermined object in an arbitrary video that includes the video associated with the first user.

The request to display a predetermined object is, for example, a request by the second user to display a gift in the video of an arbitrary user.

Upon receiving a gift display request from the second user terminal 200, the server device 400 stores the number of display requests and/or the time at which the display request was received as a history for each type of gift (for each object ID). The history here may be related to a video that the second user is currently viewing, or may be related to all videos the second user has viewed in the past.

By using such history information, it becomes possible to display in the object display frame V30 displayed on the second user terminal 200 the gifts that the user has cast the most with respect to videos, or the gifts that have been cast most recently, in an easy-to-search manner.

As described above, the generator 430 can specify a target object to be subjected to specific display control from among the objects displayed in the object display frame V30, based on the history information.

The object specified by the generator 430 can be associated with being a specific object and stored in a predetermined memory, as shown in FIG. 28, for example.

Although FIG. 28 shows an example in which there is one target object, a plurality of objects may be specified.

Then, the generator 430 can generate object display data that displays the target object at a first position V31 in the object display frame V30.

Figure 29:
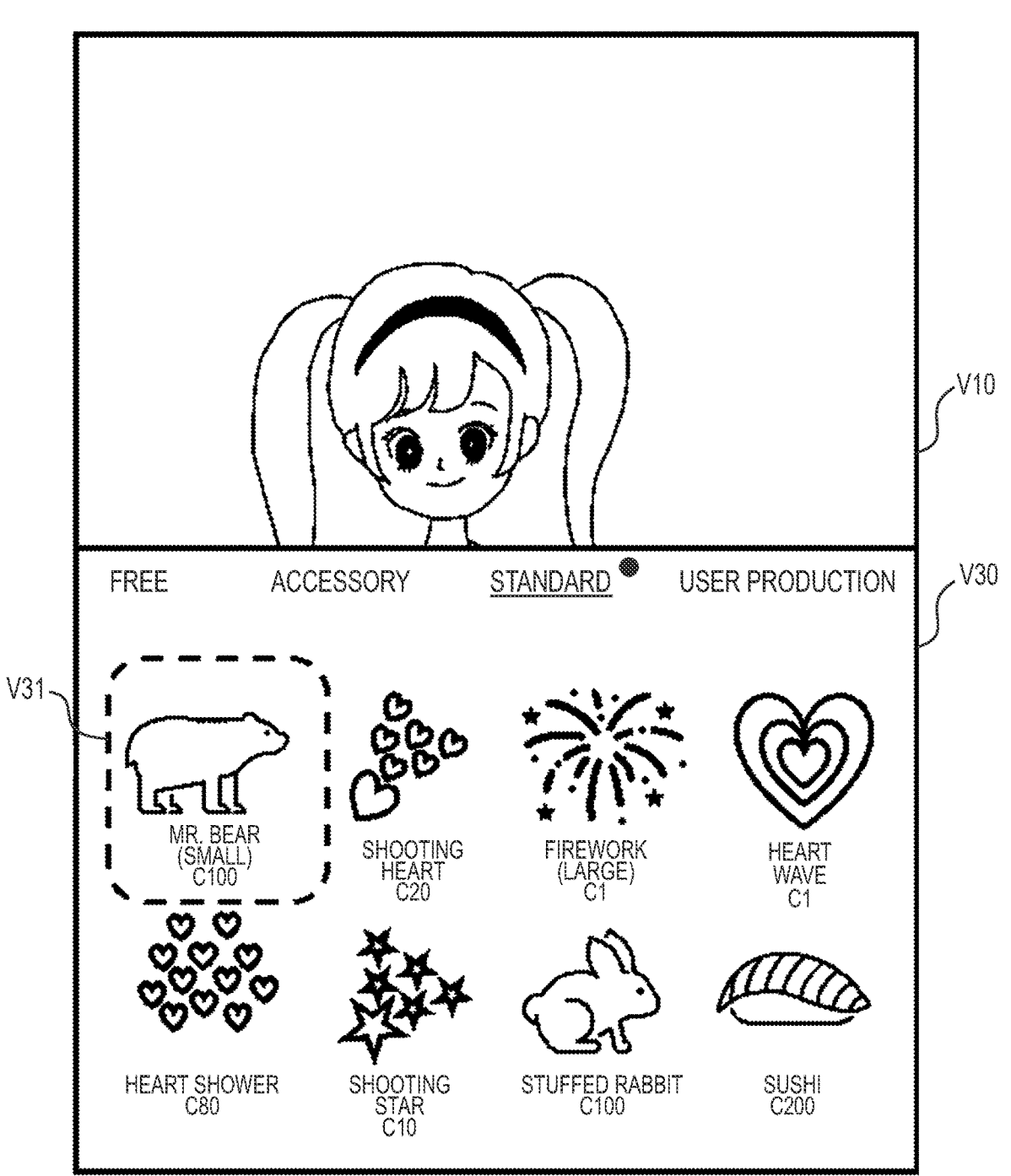
FIG. 29 is a conceptual diagram showing an image of a screen displayed on a user terminal.
Figure 30:
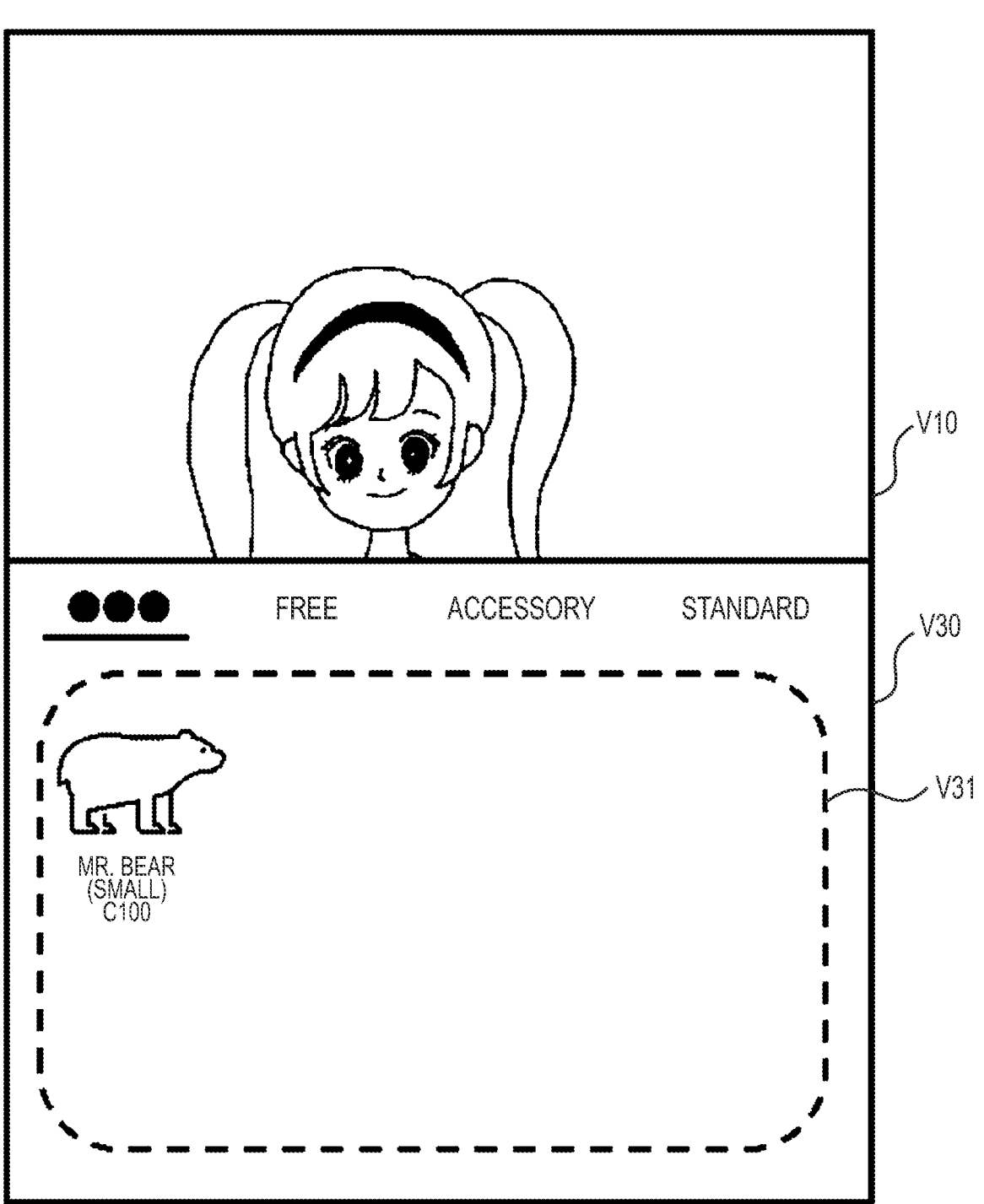
FIG. 30 is a conceptual diagram showing an image of a screen displayed on a user terminal.

The first position V31 in the object display frame V30 is not particularly limited as long as such is a position that can be distinguished from other objects, but as an example, may be the positions shown in FIGS. 27 and 29-30.

FIG. 29 is an image diagram showing a case where the first position V31 is the lead position of each tab.

As shown in FIG. 29, the target object is displayed in the lead position of the tab of the category to which the object belongs.

As described above, FIG. 27 is an image diagram showing a case where the first position V31 is the upper position of the object display frame V30.

As shown in FIG. 27, a level for displaying the target object is provided at the top of the object display frame V30, and the target object is displayed on this level.

FIG. 30 is an image diagram showing a case where the first position V31 is a position within a specific tab in the object display frame V30.

As shown in FIG. 30, a specific tab is provided in the object display frame V30, and the target object is displayed within this specific tab.

Alternatively, the generator 430 can generate object display data that displays the target object in a manner different from other objects in the object display frame V30.

Figure 31:
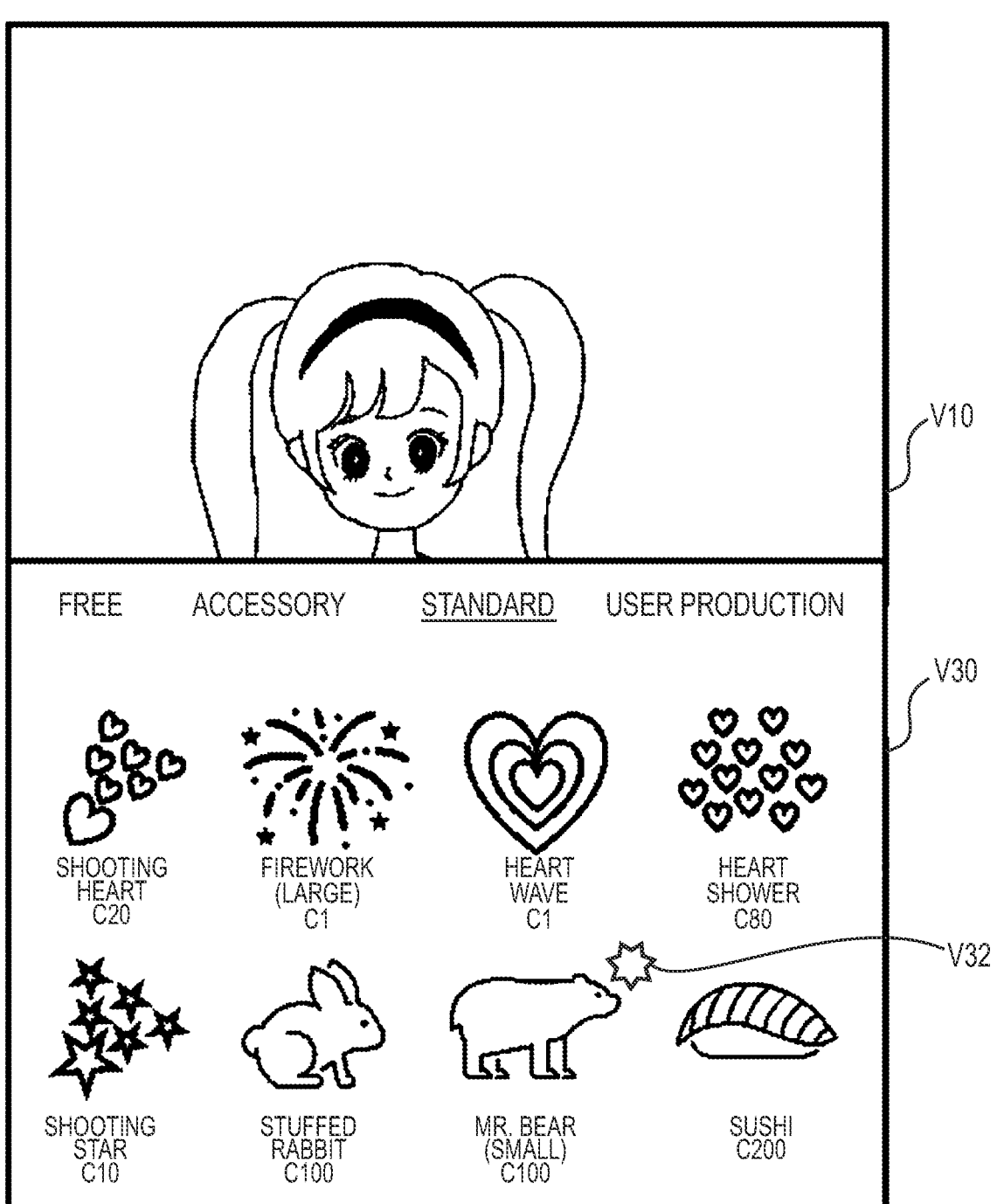
FIG. 31 is a conceptual diagram showing an image of a screen displayed on a user terminal.

FIG. 31 is an example in which a predetermined mark V32 (for example, a star-shaped mark) is attached to the target object, and the target object is displayed so as to be distinguishable from other objects. Alternatively, the target object may be tagged with content such as "I want it!".

Figure 32:
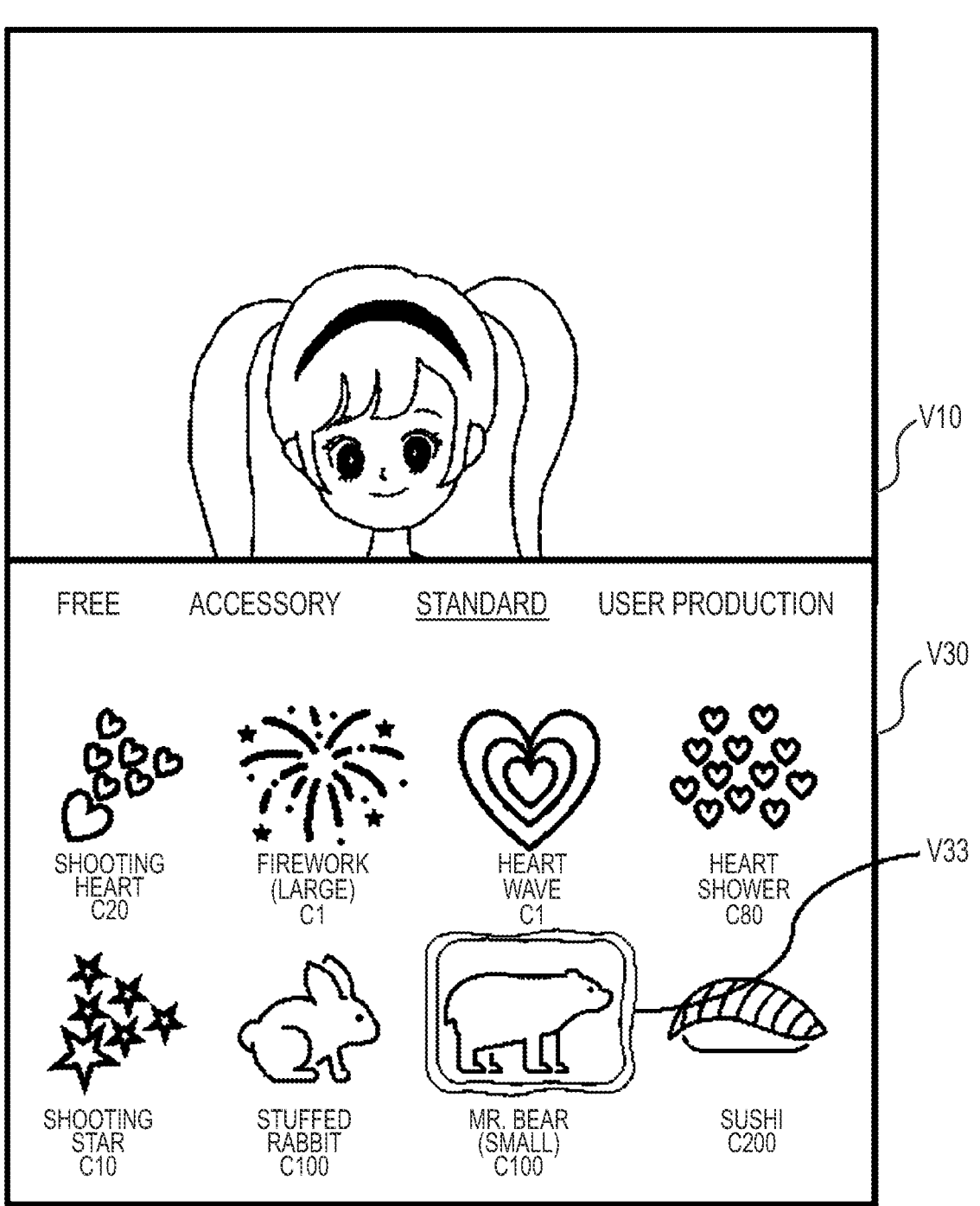
FIG. 32 is a conceptual diagram showing an image of a screen displayed on a user terminal.

FIG. 32 is an example in which a frame V33 is attached to the target object and the target object is displayed so as to be distinguishable from other objects.

Furthermore, if multiple operations are required as operations for making an object display request (for example, the target object is selected by tapping, and the display request is made by again tapping the selected target object, and the like), the generator 430 may generate the object display data to be displayed in the object display frame V30 with the target object already in a selected state (initial selection state). With this configuration, it becomes possible to reduce the number of operations required to make a display request.

Based on the history information, the generator 430 can specify, as the target object, a predetermined object for which a display request has been transmitted from the second user terminal 200 and which has a different recent predetermined number.

The predetermined object for which a display request has been transmitted from the second user terminal 200 and which has a different recent predetermined number, can be rephrased as, for example, a gift recently sent by the second user with respect to a video.

Figure 33:
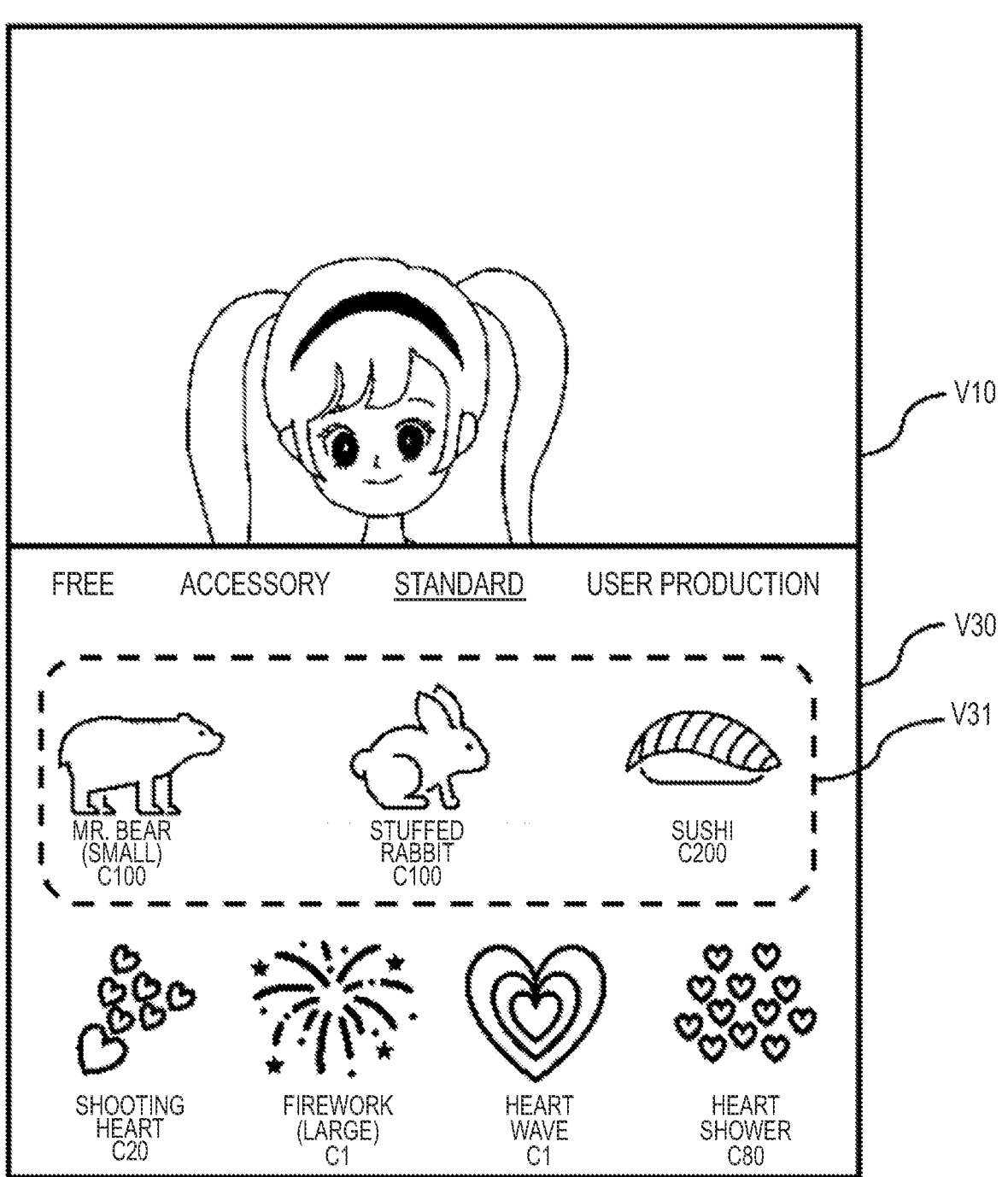
FIG. 33 is a conceptual diagram showing an image of a screen displayed on a user terminal.

For example, as shown in FIG. 33, when the second user has sent three sushi gifts, five stuffed rabbit gifts, and two Mr. Bear (small) gifts with respect to a video in this order, a sushi gift, a stuffed rabbit gift, and a Mr. Bear (small) gift can be specified as target objects and displayed in the first position V31.

In the first position V31, it is assumed that the left side is the most recent.

At this time, the first position V31 functions as a gift transmission history field.

Figure 34:
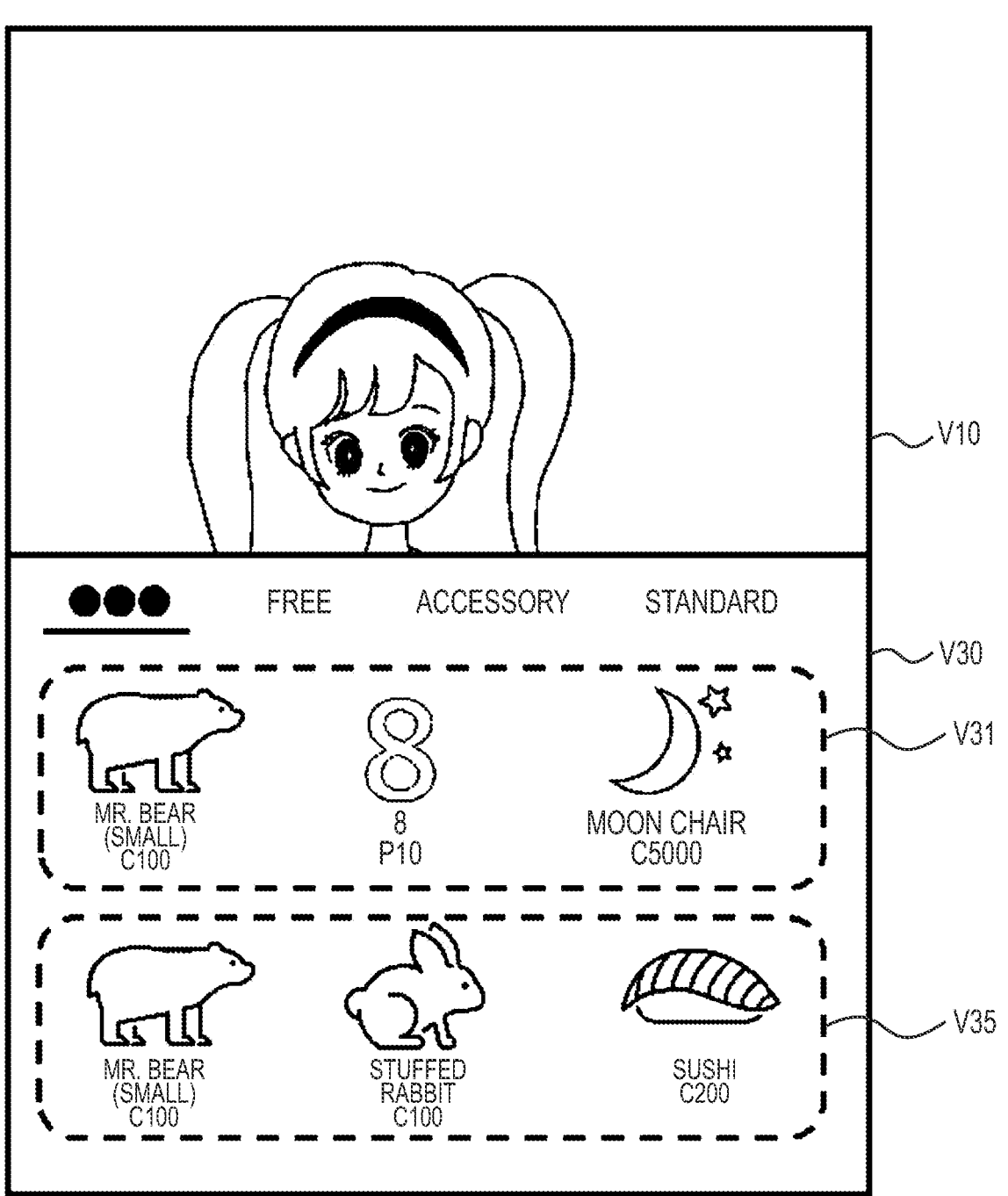
FIG. 34 is a conceptual diagram showing an image of a screen displayed on a user terminal.

In addition, as a modification, as shown in FIG. 34, the top row of the history tab can be a display field V34 of a predetermined number (3 in FIG. 34) of objects that the viewing user has most recently sent to any video that is not related to the distributing user, and the second and subsequent rows can be a display field V35 for a recent predetermined number of objects (3 in FIG. 34) that have been given to the distributing user who is viewing.

The generator 430 can generate object display data in which the number of times display requests for a predetermined object have been transmitted at one time is associated with the target object, based on the history information.

As an example, the second user can send multiple display requests for one object by tapping the object displayed in the object display frame multiple times within a predetermined period of time, or long-pressing the object.

Figure 35:
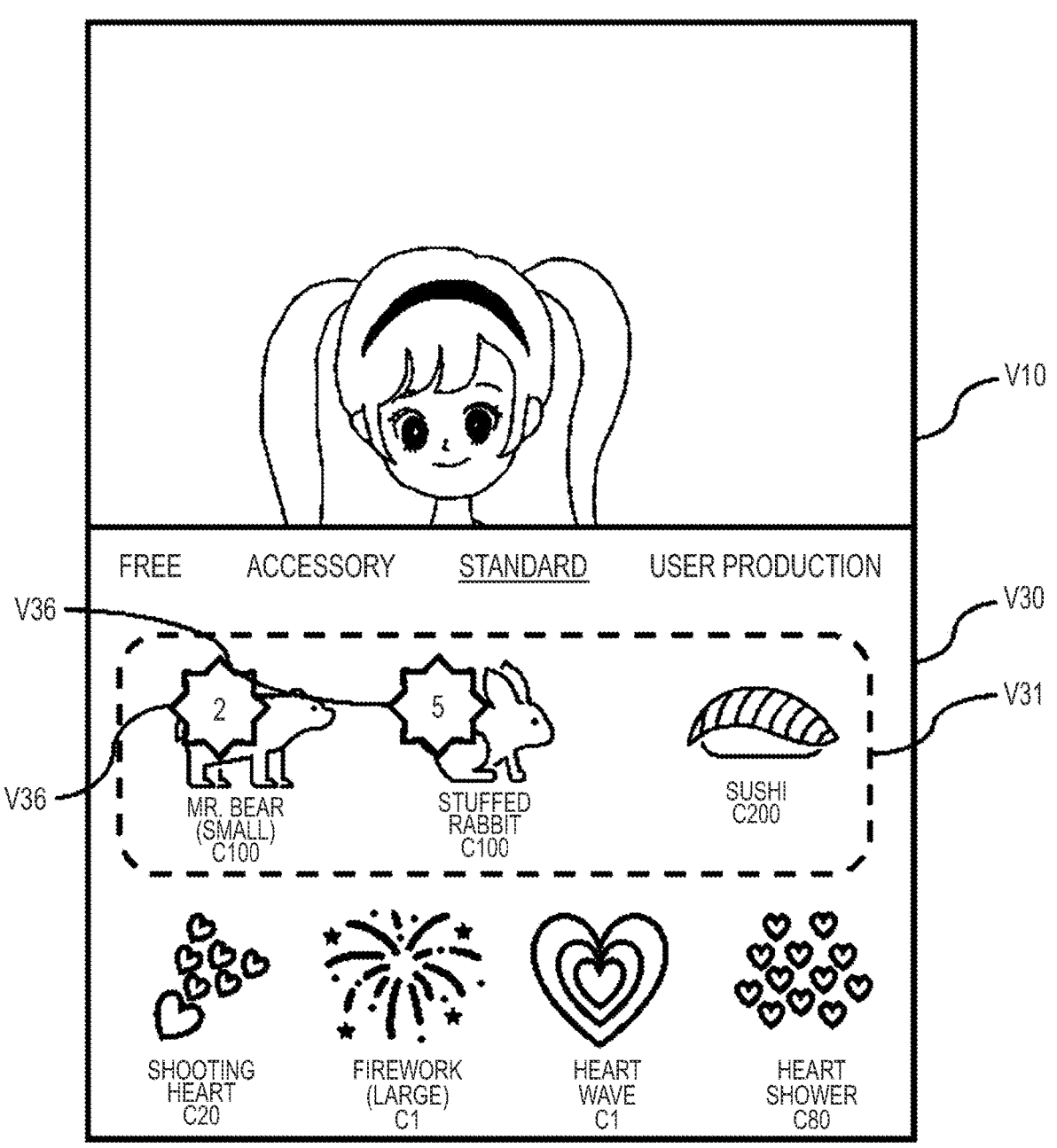
FIG. 35 is a conceptual diagram showing an image of a screen displayed on a user terminal.

In the above-described configuration, for example, when the second user sends one sushi gift, five stuffed rabbit gifts, and two Mr. Bear (small) gifts with respect to a video in this order, a stuffed rabbit gift and a Mr. Bear (small) gift are displayed in association with number-of-times objects V36 of 5 times and 2 times, respectively, as shown in FIG. 35.

If this number-of-times object V36 is selected, multiple display requests can be sent with a single selection.

The receiver 410 can further receive designation information of an object and/or an attribute of the object transmitted from the first user terminal 100 and/or the second user terminal 200.

Such designation information can be set from the distribution setting screen D20, or the like, and the first user can designate a gift ID, gift theme color, gift theme number, and the like.

Such a designation may be made by the first user or may be made by the second user. Designation information designated by the first user is applied to all second users, and designation information designated by the second user is applied only to the second user. Gifts designated by the first user can be called begged gifts.

Additionally, in the above-described example, colors and numbers were exemplified as the attribute designation information, but the price range or popularity of the gift, or the like, may also be used as the designation information.

The generator 430 specifies the designated object based on the designation information.

When a gift ID is designated, one gift having that gift ID is specified. Similarly, if a theme color of a gift, for example "black," is designated, one or more gifts associated with the color information of black are specified. Further, when a theme number, for example "8," is designated, one or more gifts associated with the number information of 8 are specified.

The generator 430 can then display the designated object in a second position inside the object display frame, or can generate object display data that displays the designated object in a manner different from other objects in the object display frame.

This second position may be the same as the first position described above, or may be a different position. For example, this may be displayed in a different position from the first position described above within the same object display frame, or may be displayed in an object display frame on a separate tab.

Next, details of a case where the history information stored in association with the first user is information regarding a history in which the first user and a predetermined event are associated will be explained.

Figure 36:
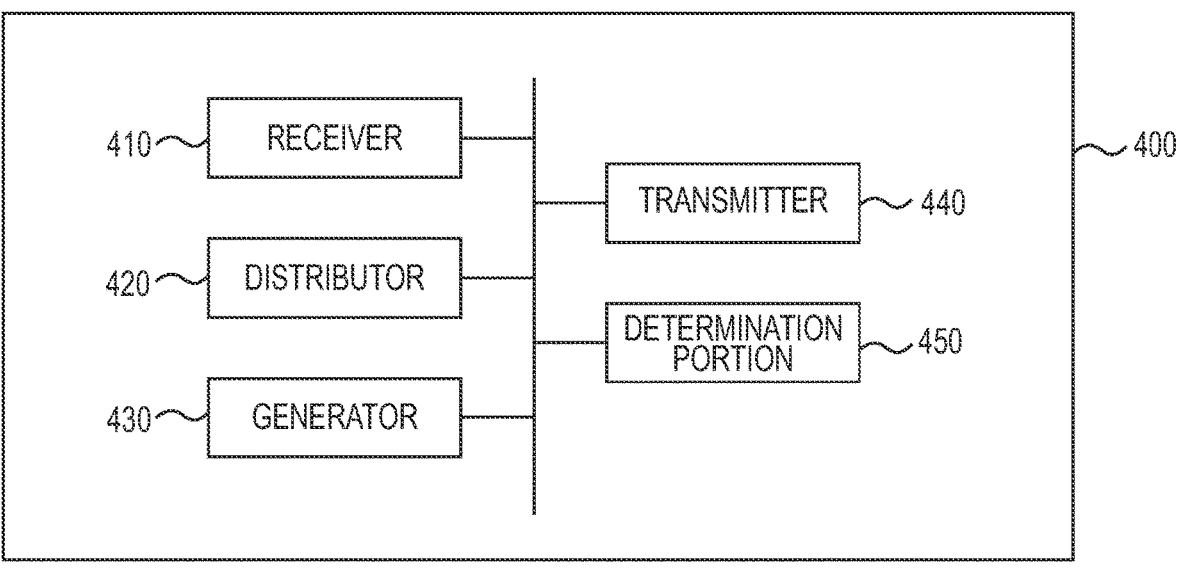
FIG. 36 is a configuration diagram showing another example of a functional configuration of a server device in this disclosure.

The one or more computer processors according to this disclosure can further comprise a determination portion 450, as shown in FIG. 36.

The determination portion 450 determines whether a predetermined event is associated with the first user.

When the determination portion 450 determines that the predetermined event is associated with the first user, the generator 430 generates display information regarding a necessary value needed for a parameter value associated with the first user in connection with the predetermined event to reach a predetermined value.

The parameter value can be, for example, a value (such as the above-mentioned score) that increases based on the number and/or value of requests to display an object in a video, transmitted from the second user terminal 200.

If the event is of the score achievement type, the predetermined value is a value determined in advance for the predetermined event.

On the other hand, if the event is of the ranking type, the predetermined value is a value necessary to attain a predetermined rank (first place or the lowest rank for which a reward is given) in the predetermined event. Therefore, the predetermined value in this case is a value that varies depending on parameter values associated with other users associated with the predetermined event.

The necessary value is calculated by finding the difference between the predetermined value and the parameter value.

Also, at this time, because the necessary value changes sequentially according to changes in the parameter of the first user and the parameters of other distributing users, the generator 430 may update the display information in real time in accordance with changes in the necessary value.

Updating the necessary value necessary for ranking changes in real time may result in a high load, so ranks and statuses in which small changes do not occur may be used.

Then, the transmitter 440 transmits the display information to the second user terminal 200.

Figure 37:
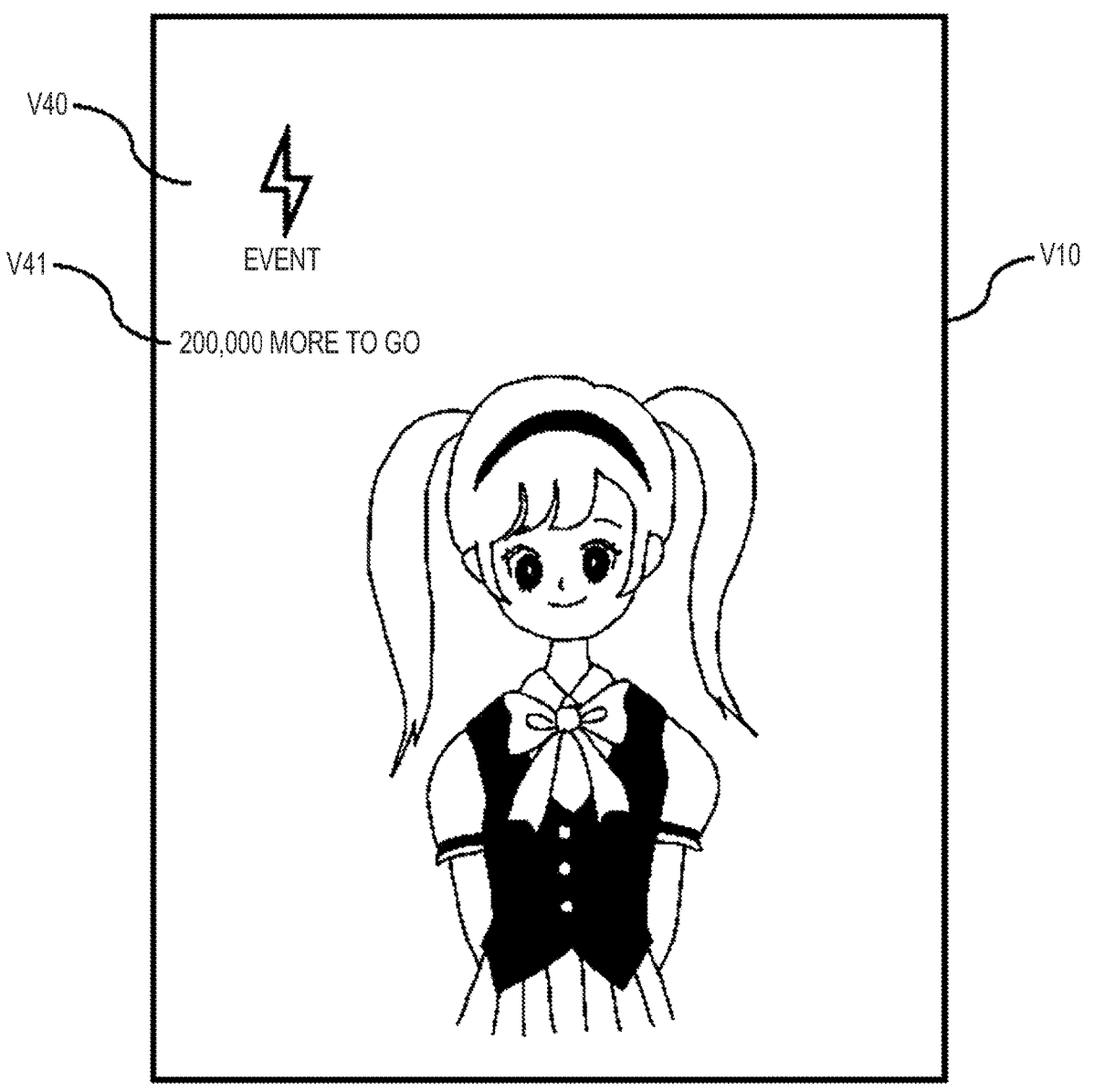
FIG. 37 is a conceptual diagram showing an image of a screen displayed on a user terminal.

FIG. 37 shows an image of the viewing screen V10 on the second user terminal 200 at which a video including display information is displayed.

In this way, the generator 430 can use a necessary value V41 as display information.

In FIG. 37, the necessary value V41 is displayed in the video together with an event icon V40 indicating that the user is participating in an event.

Figure 38:
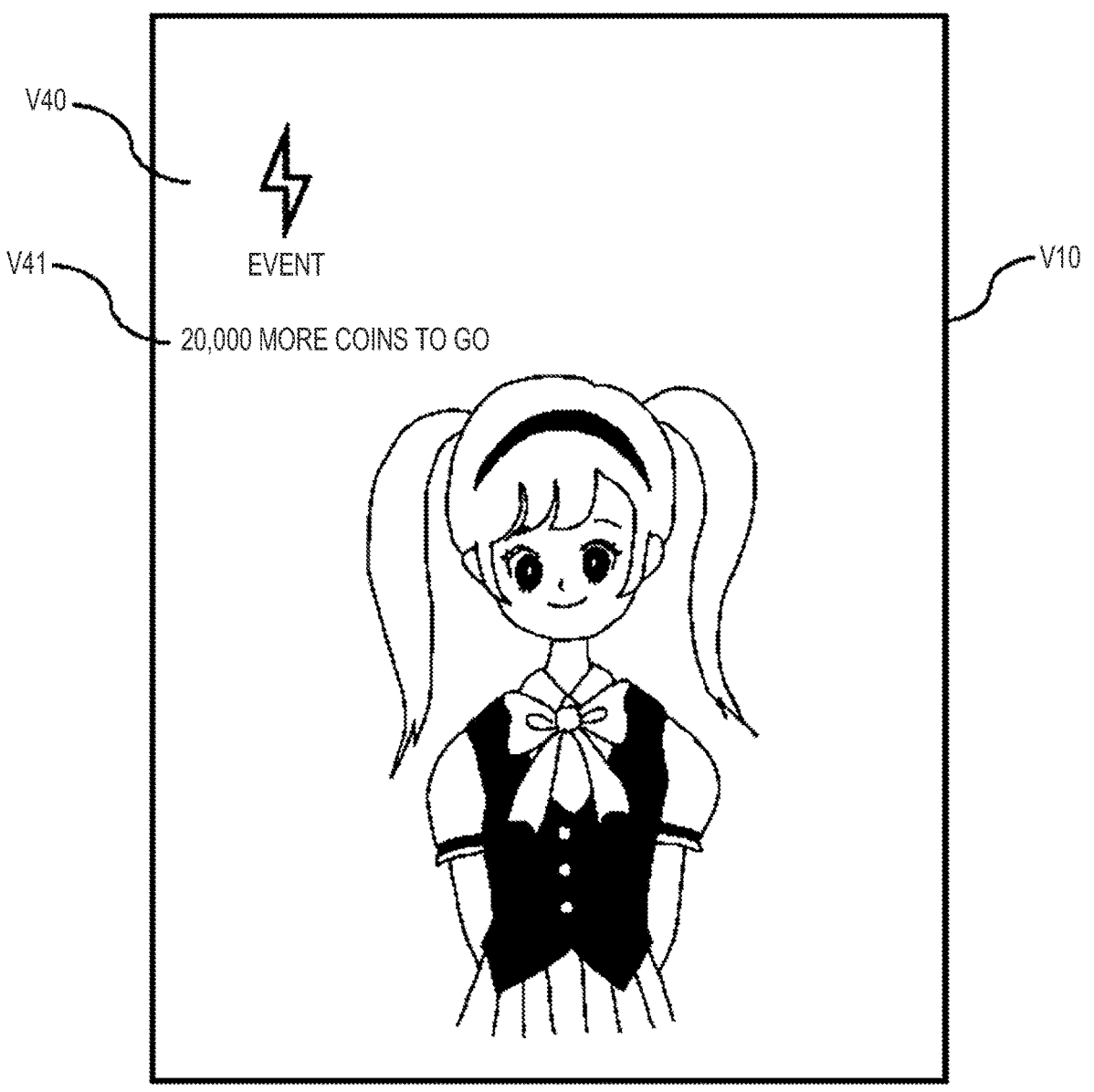
FIG. 38 is a conceptual diagram showing an image of a screen displayed on a user terminal.

Alternatively, as shown in FIG. 38, the generator 430 can calculate the necessary number of points required to set the necessary value to 0, and use a necessary number V41 as display information.

The necessary number of points here is assumed to be converted by either coins purchased by the user or points obtained for free, as described above.

For example, if the necessary value is 200,000, this will be 20,000 when converted into coins, and 200,000 when converted into points.

Alternatively, the generator 430 can determine the type of necessary object to set the necessary value to 0, calculate the number of necessary objects necessary to set the necessary value to 0, and make the type and number V43 of necessary objects the display information.

A specific example of a method to determine the necessary object(s) to set the necessary value to 0 will be described later, but the number can be the minimum number such that: the necessary value≤value of objects×number of objects.

Furthermore, the type of object may be changed as appropriate so that the value of objects×number of objects does not exceed the necessary value. For example, something that is initially converted into a tower cake, which is a high-value gift, can be converted into Mr. Bear (small), which is a small-value gift, at the end, that is, when the necessary value approaches 0.

However, if the event is of the ranking type, it is better to always display high-value gifts. In the case of the ranking type, other users also increase their own scores, so it is preferable to accumulate scores so that the necessary value exceeds 0 and becomes negative.

Figure 39:
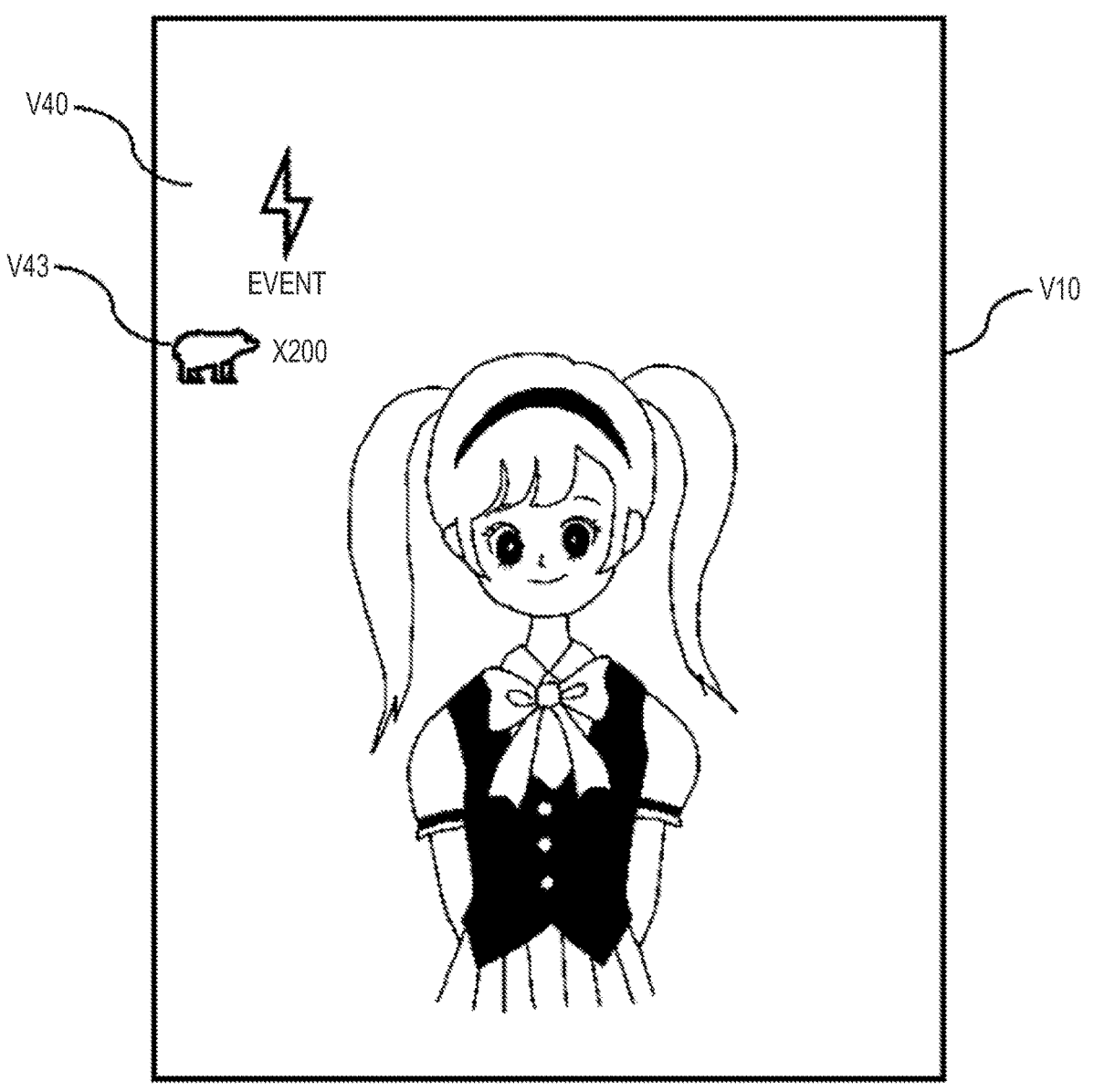
FIG. 39 is a conceptual diagram showing an image of a screen displayed on a user terminal.

As shown in FIG. 39, for example, if the necessary score is 200,000, this can be calculated as "200" of the "Mr. Bear (small)", which is a 100-coin gift, being required, and the type and number V43 of this object can be displayed in the video.

Figure 40:
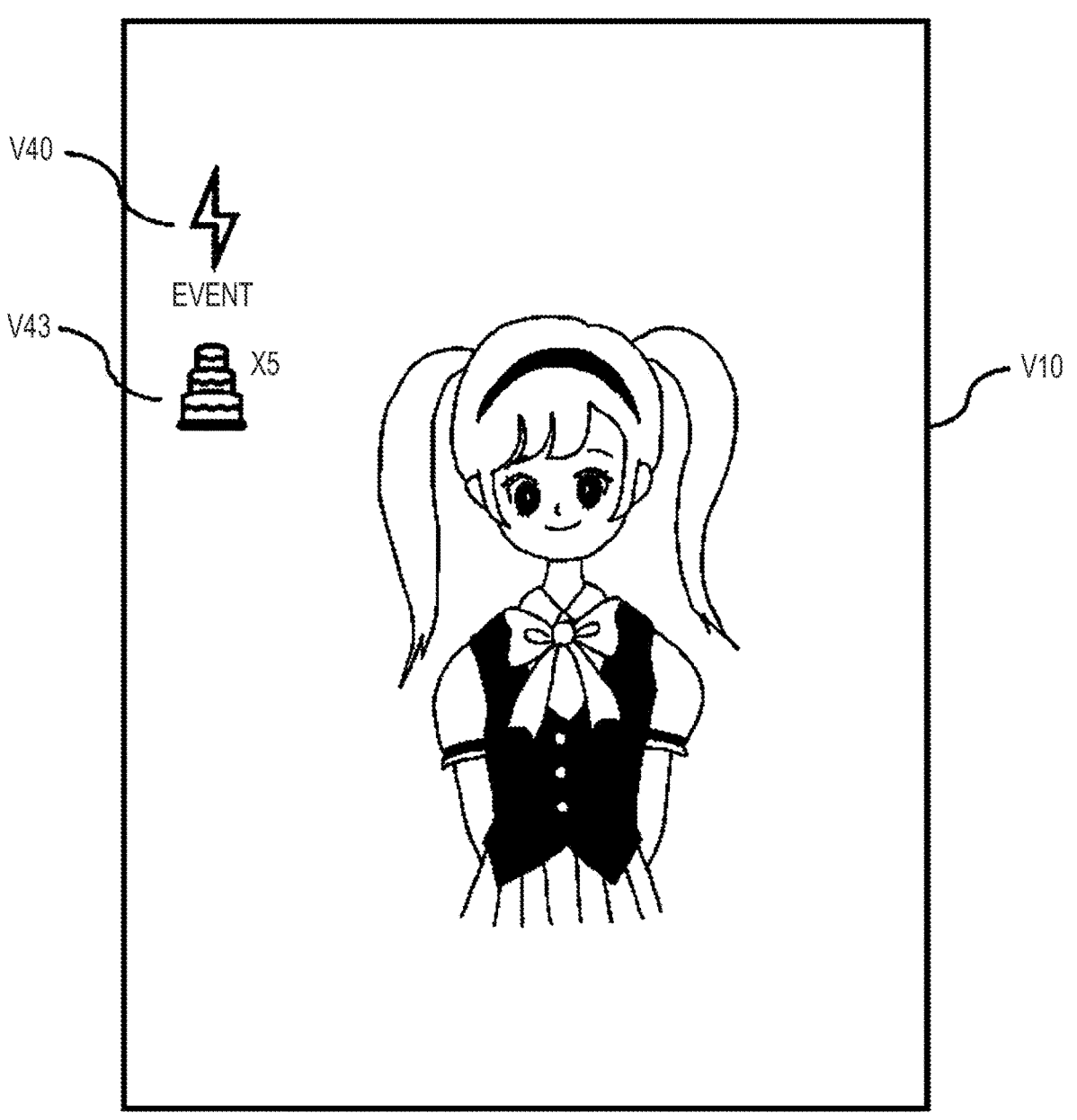
FIG. 40 is a conceptual diagram showing an image of a screen displayed on a user terminal.

Furthermore, as shown in FIG. 40 as an example, if the necessary score is 500,000, this can be calculated as "5" of the "tower cake," which is a 10,000-coin gift, being required, and the type and number V43 of this object can be displayed in the video.

Figure 41:
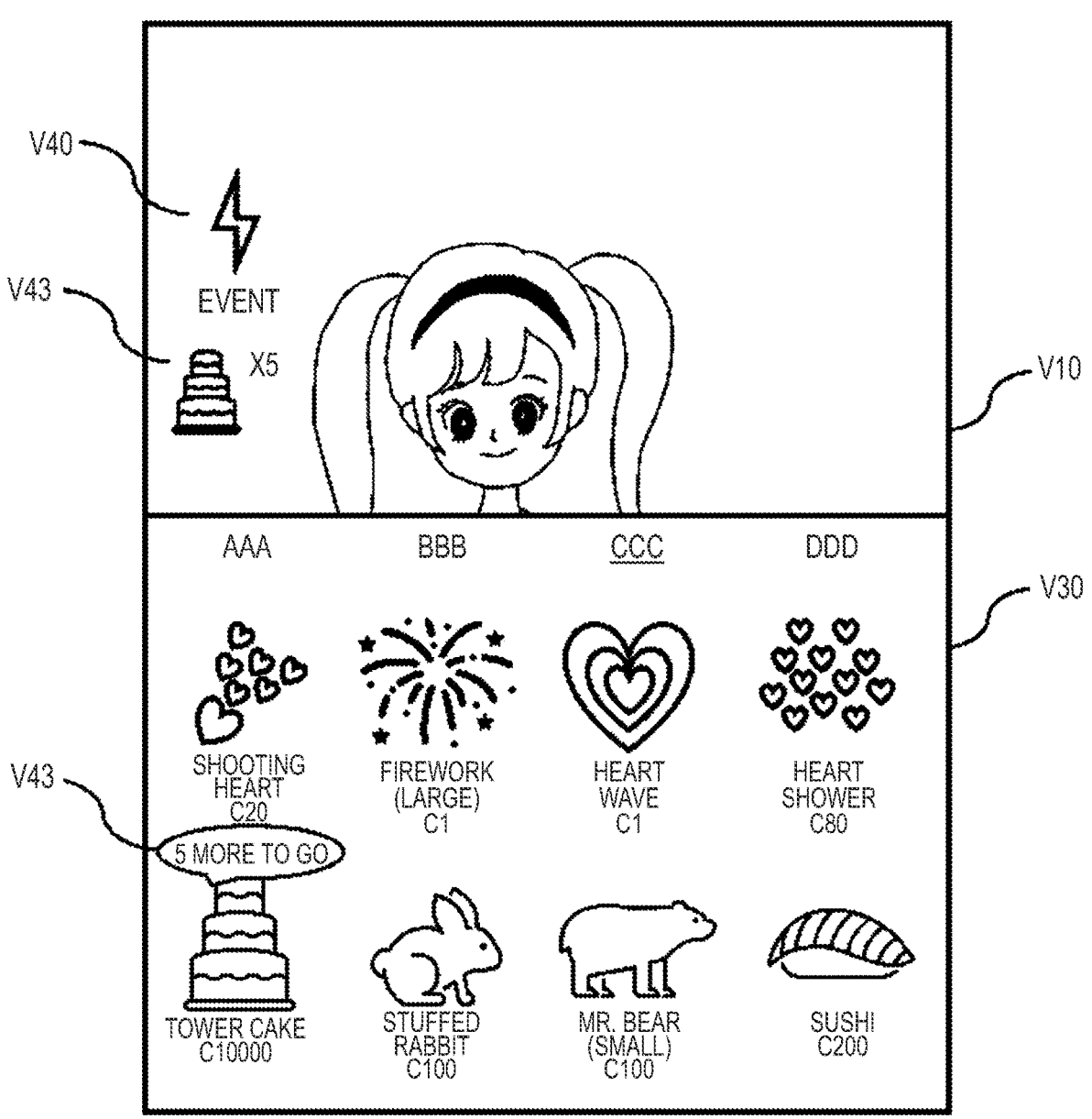
FIG. 41 is a conceptual diagram showing an image of a screen displayed on a user terminal.

Furthermore, at this time, as shown in FIG. 41, the above-described display information may be displayed in the object display frame V30. In the example shown in FIG. 41, the display information is displayed in association with the corresponding objects. The display information displayed in the above-described video and the display information displayed in the object display frame may be displayed together, or, when displayed in the object display frame V30, need not be displayed in the video.

The above-described number is updated in real time so as to be reduced each time a necessary object is cast.

Then, the generator 430 can determine the type of object necessary to set the necessary value to 0 based on the history information.

As described above, the history information includes the history regarding gifts, so for example, based on the gift history, the object with the largest number of gifts for which display requests have been made with respect to the video of the first user can be set as the necessary object.

Alternatively, based on the gift history, the object for which the most recent display request was made with respect to the video of the first user can be set as the necessary object.

Alternatively, based on the gift history, the most expensive object for which a display request has been made with respect to the video of the first user can be set as the necessary object.

Alternatively, based on the event history, a gift exclusive to the event can be set as the necessary object.

Alternatively, the above-mentioned begged gift can be set as the necessary object.

The generator 430 can determine the type of object necessary to set the necessary value to 0 based on the number of second user terminals 200.

For example, when the number of second user terminals is large, an inexpensive object is determined as the necessary object. Inexpensive here also includes free.

Conversely, when the number of second user terminals is small, an expensive object is determined as the necessary object.

The number of viewers displayed is the cumulative number of viewers, but in this case, the determination is made based on the number of simultaneous viewers. The number of simultaneous viewers is acquired by the server device 400.

The generator 430 can further generate information for displaying on the second user terminal 200 a batch object that can transmit a display request for the necessary number of necessary objects as a batch.

Figure 42:
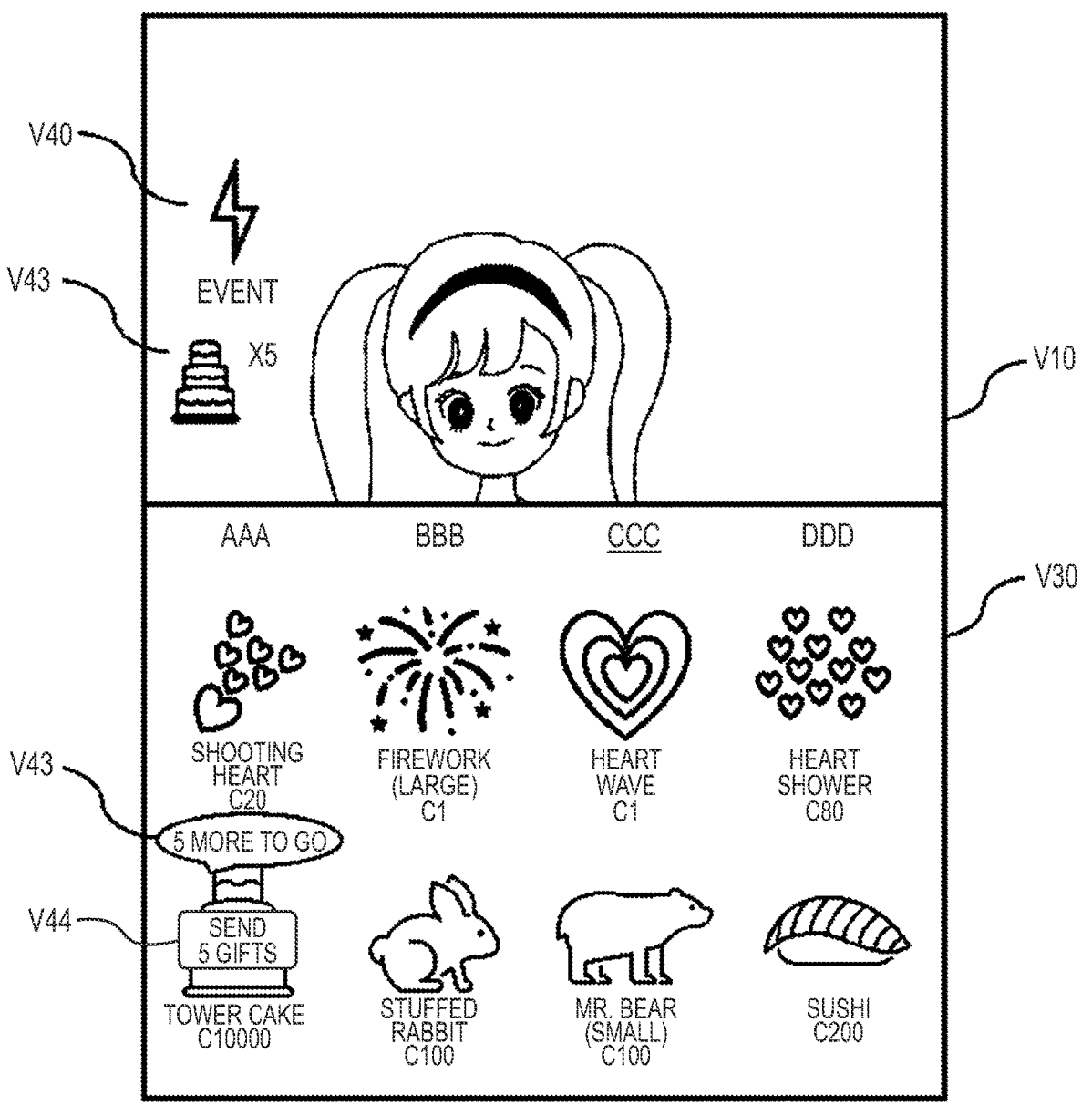
FIG. 42 is a conceptual diagram showing an image of a screen displayed on a user terminal.

FIG. 42 shows an example in which a batch transmission object V44 for receiving such a batch display request is displayed.

When such a batch transmission object V44 is selected, as an example, a display request for five objects can be transmitted with one selection.

With this configuration, it becomes possible to save time when the second user wants to send a plurality of gifts.

The receiver 410 can receive temporary display requests for a necessary object from the second user terminal(s) 200, and when the number of temporary display requests reaches the number, the receiver 410 can treat the number of display requests for the necessary object as having been received in a batch.

Figure 43:
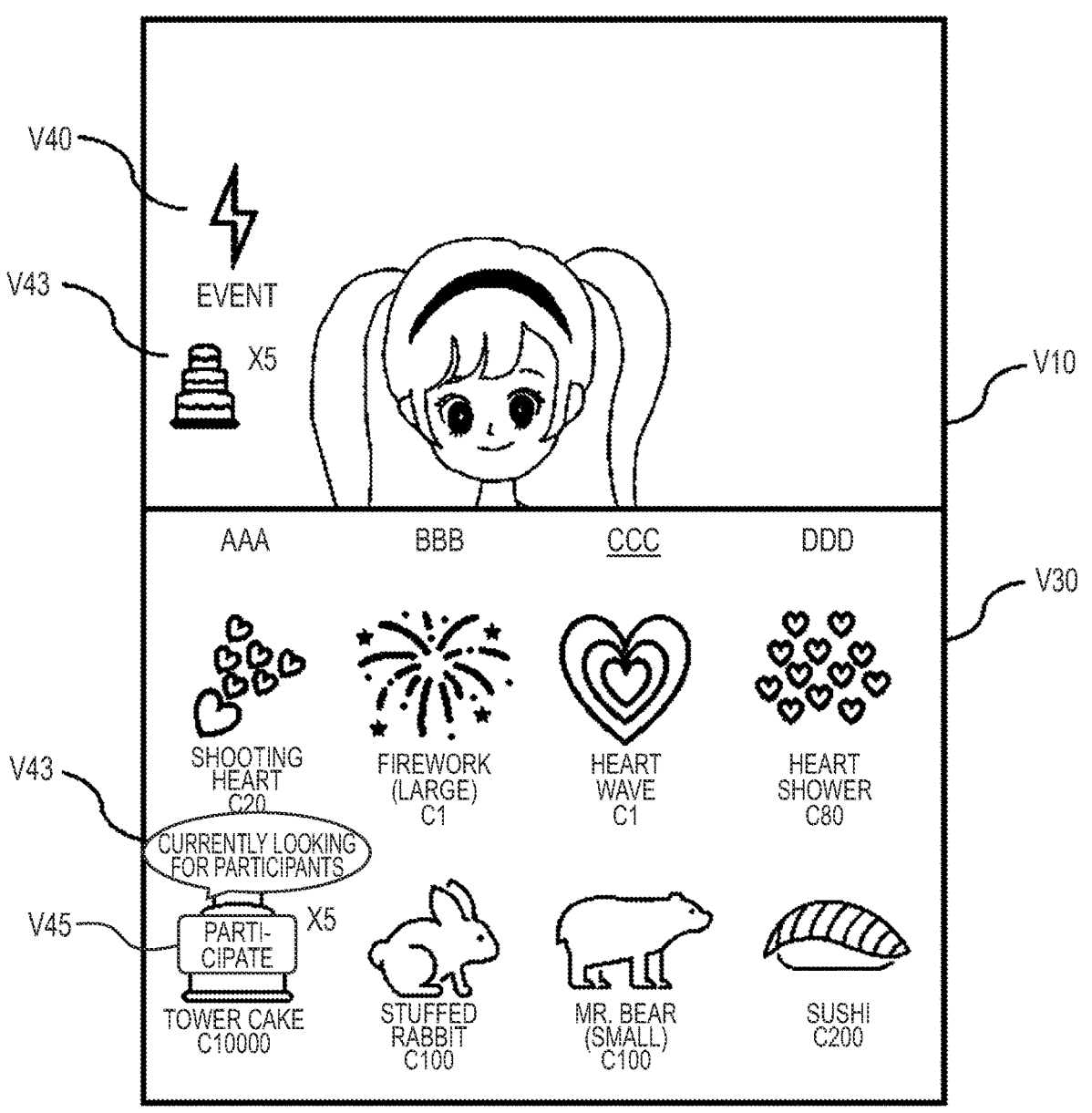
FIG. 43 is a conceptual diagram showing an image of a screen displayed on a user terminal.

As an example, FIG. 43 shows an example in which a participating object V45 for receiving such temporary display requests is displayed.

This participating object V45 can be set to be selectable by a single second user as many times as requested, or can be set to be selectable only once.

The necessary number displayed on the participating object V45 is gradually reduced by selections made by one or more second users. When the necessary number becomes 0, the gift object display request is sent to the server device.

The coins are not reduced at the time a temporary display request is made, but when the required number of temporary display requests are collected, the coins are reduced and the gift display request is sent to the server device 400.

With this configuration, there is no disadvantage for the second user when the required number of gifts is not collected, and it becomes possible to suppress gift casting reluctance.

Furthermore, the determination portion 450 shown in FIG. 36 may determine whether the number of points associated with the second user is sufficient for the necessary number.

When the determination portion 450 determines that the number of points is insufficient for the necessary number, the transmitter 440 transmits to the user terminal 200 information for displaying an object that is a lead to a screen that performs a process to increase points.

Figure 44:
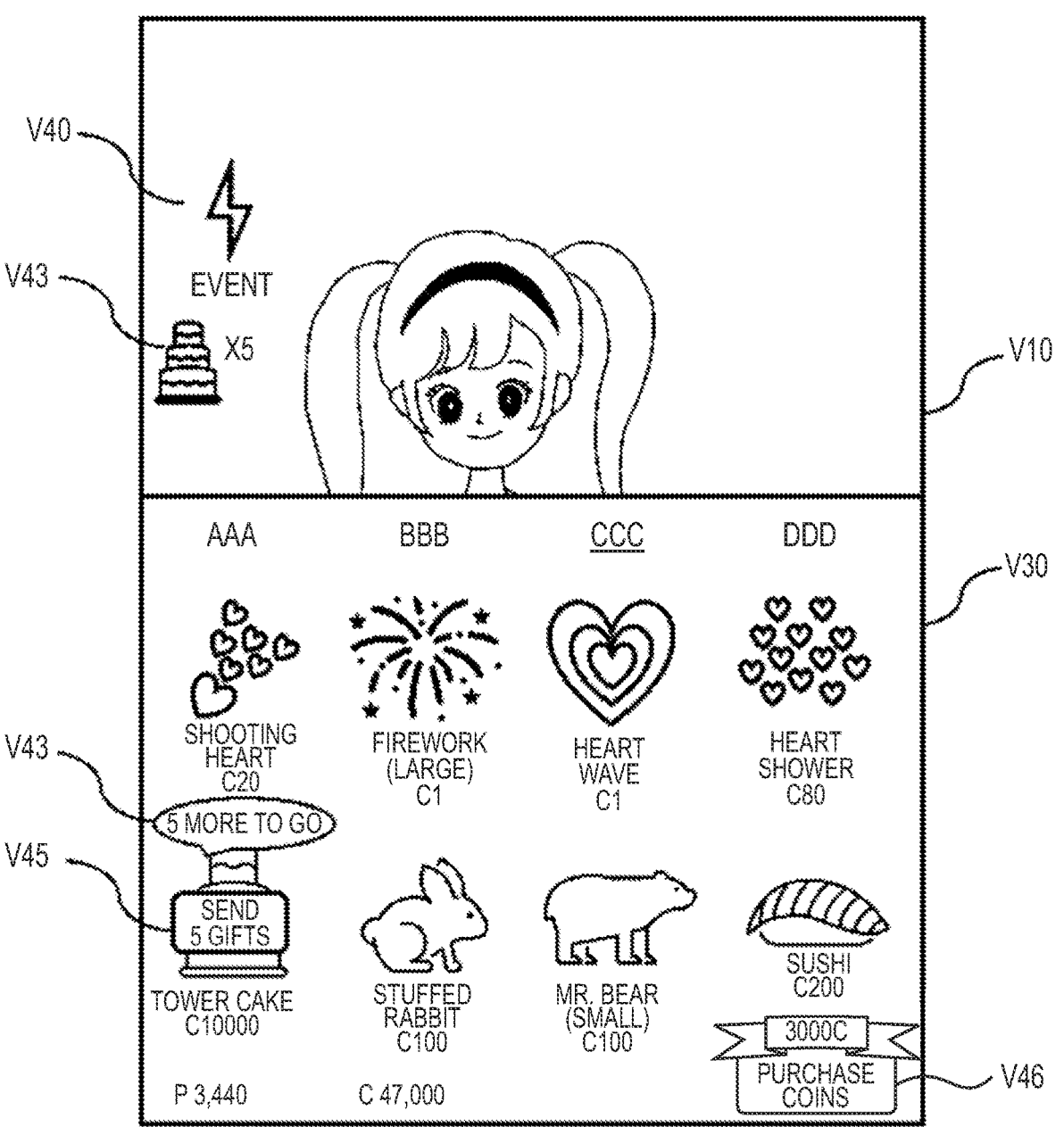
FIG. 44 is a conceptual diagram showing an image of a screen displayed on a user terminal.

The object that is a lead to the screen that performs the process to increase points can be a purchase object V46 for transitioning to a coin purchase screen, as shown in FIG. 44 as an example.

This purchase object V46 may be displayed regardless of the result of the determination portion 450, but in that case, if the determination portion 450 has determined that the number of points is insufficient for the necessary number, the system is configured so that the missing coins can be easily purchased on a transition destination screen.

Figure 45:
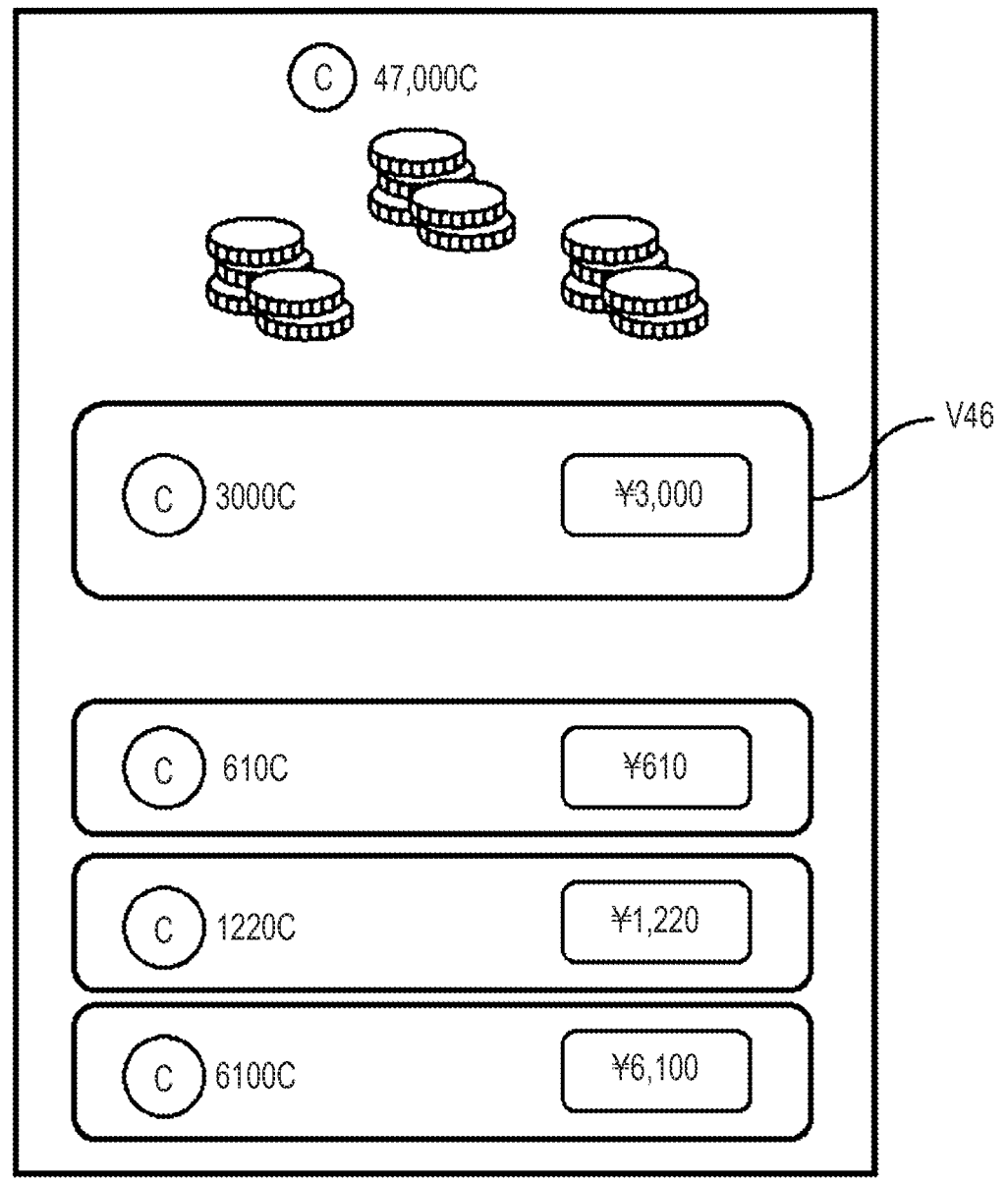
FIG. 45 is a conceptual diagram showing an image of a screen displayed on a user terminal.

FIG. 45 shows an example of a coin purchase screen. As shown in the lower part of FIG. 45, normally it is only possible to purchase in predetermined units, but in the disclosed embodiments, it is possible to purchase coins in a lump sum equal to the amount of the shortage. As an example, FIG. 45 displays the purchase object V46 for purchasing 3000C in bulk when the shortage is 3000C.

When the purchase object V46 is selected by the second user, 3000C are stored in association with the second user in exchange for payment of 3000 yen by the second user.

Thereafter, by selecting the batch transmission object V44 from the object display frame V30 shown in FIG. 42, a transmission request for the object relating to the video is transmitted to the server device 400.

With the above configuration, the lead to the coin purchase screen becomes clear, and it becomes possible to keep the second user from refraining from casting a gift due to a shortage of coins.

Next, a description will be given of the screen transition when the second user selects the event icon V40 displayed in the video.

Figure 46:
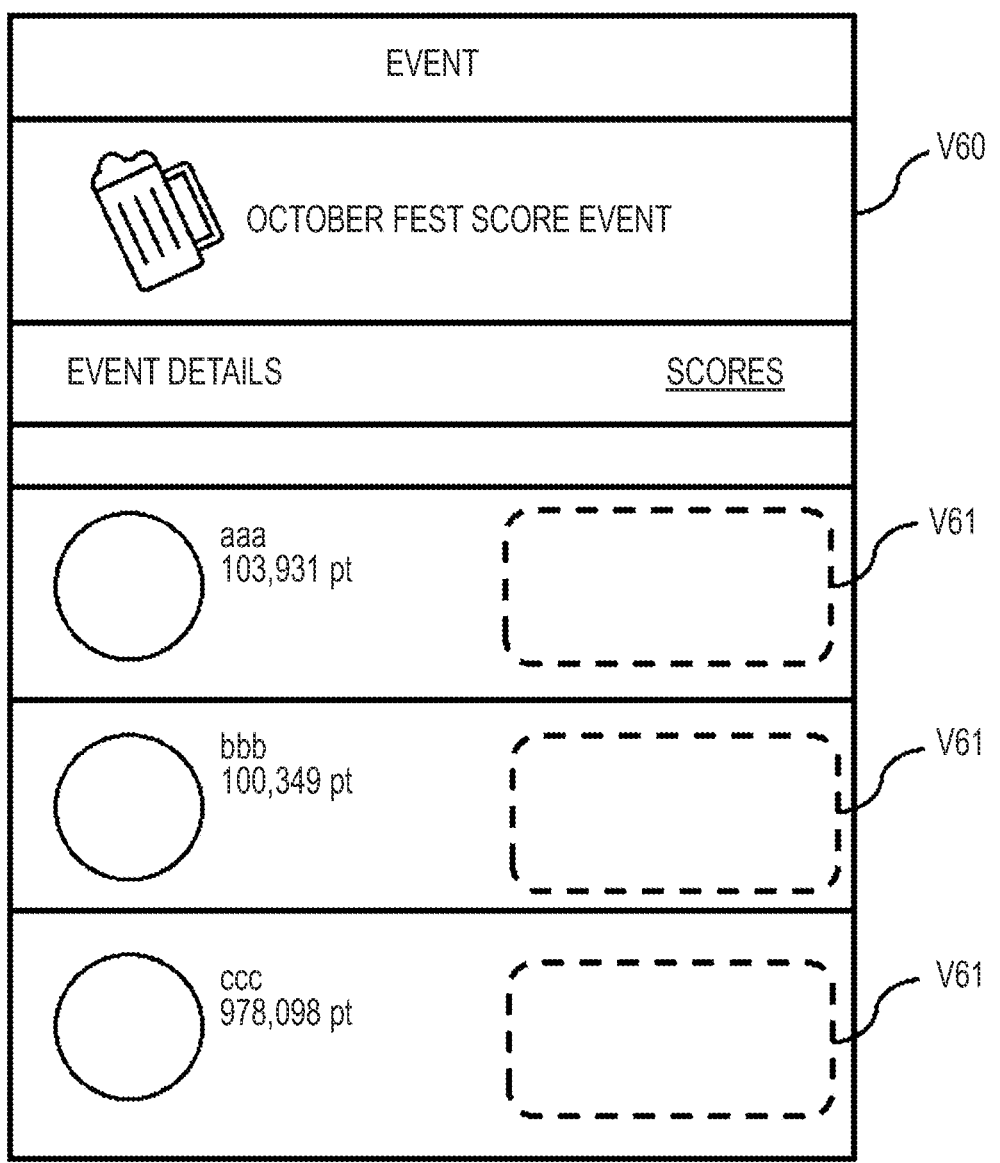
FIG. 46 is a conceptual diagram showing an image of a screen displayed on a user terminal.

When the second user selects the event icon V40 in the video, the viewing screen V10 transitions to the event screen V60 shown as an example in FIG. 46.

The event screen V60 is configured so that displayed information can be switched using an event details tab and a score tab.

In the information displayed on the score tab, the score of a first user, who is the distributing user of a video watched by a second user(s), is displayed at the top, and below that, the scores of other users are displayed in order of ranking. Alternatively, the scores of all users participating in the event may be displayed in ranking order, and among those, the first user, who is the distributing user of the video viewed by the second user(s), may be highlighted.

Further, as shown in FIG. 46, a display field V61 is displayed that displays information regarding the above-mentioned necessary value along with the score of each user. Details of the display contents of the display field V61 will be described later.

Then, by selecting this display field V61, the second user(s) can also make a gift display request via the event screen V60.

Figure 47:
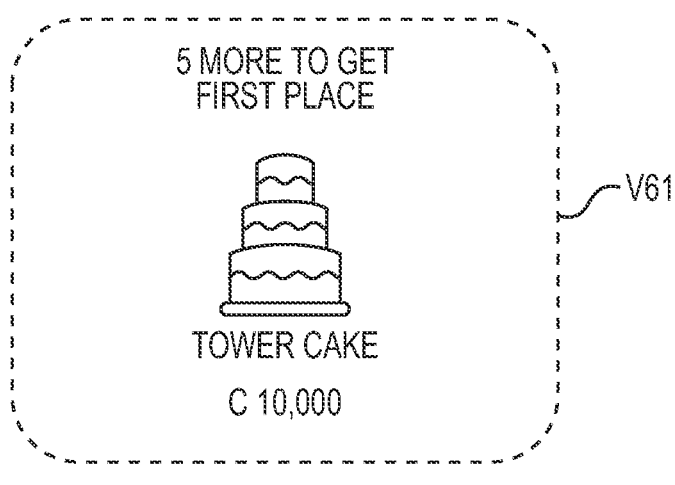
FIG. 47 is a conceptual diagram showing an image of a screen displayed on a user terminal.
Figure 48:
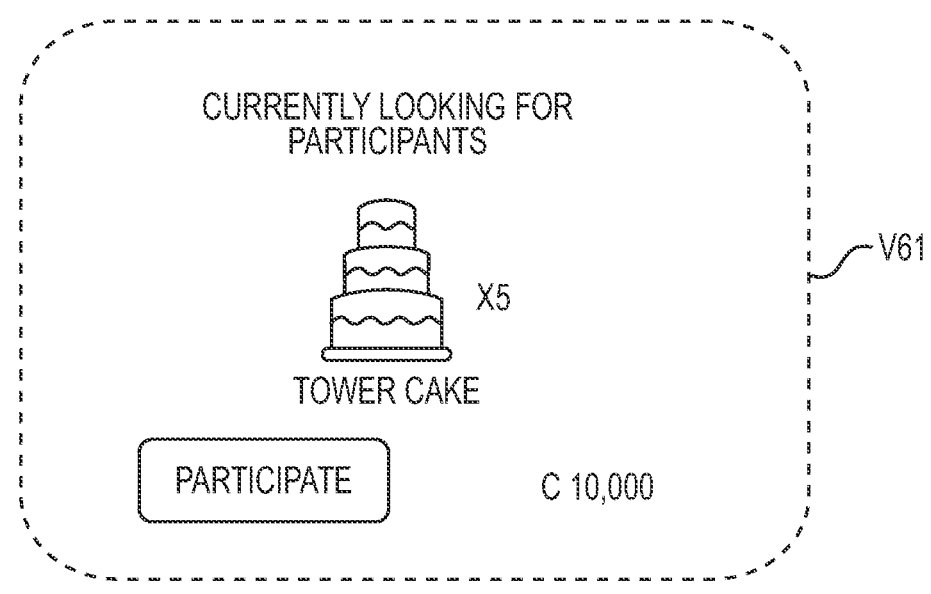
FIG. 48 is a conceptual diagram showing an image of a screen displayed on a user terminal.

Here, details of the display contents of the display field V61 shown in FIG. 46 are shown as examples in FIGS. 47 and 48.

In the example shown in FIG. 47, the display field V61 displays the necessary object (tower cake gift) indicating the type of gift necessary and the necessary number (five) for the user to be first in the ranking type event.

When the display field V61 is selected by the second user, a display request for one tower cake gift is transmitted to the server device.

Furthermore, in the example shown in FIG. 48, the necessary object (tower cake gift) indicating the type of gift necessary and the necessary number (five) for the user score to achieve a predetermined condition in the event are displayed in the display field V61.

The difference from the example shown in FIG. 47 is that when the second user selects the display field V61, a temporary display request for one tower cake gift is transmitted to the server device.

Regarding such temporary display requests, the temporary display requests for one tower cake gift are transmitted to the server device only when the necessary number of temporary display requests have been collected.

Such display fields V61 may be displayed only at the position for the first user shown in FIG. 46, or may be respectively displayed at positions corresponding to all users participating in the event, or may be displayed only at the position corresponding to a user who is currently distributing.

At this time, it is possible to make it so that even if the display field V61 of a user other than the first user is selected by a second user who is viewing the video of the first user, a gift display request with respect to the video of the other user is not transmitted.

Alternatively, when the display field V61 of a user other than the first user is selected by a second user who is currently viewing the video of the first user, a gift display request with respect to the video of the other user may be transmitted.

With the above configuration, it becomes easier for the second user to find the necessary object, leading to an increase in the desire for gifting.

The above explanation assumes that the second user casts a gift that corresponds to the necessary object displayed in the video, but naturally, the second user can freely cast another object differing from the necessary object.

In this case as well, the necessary value and the necessary number will naturally decrease, but it should be noted that if the type and number of necessary objects are displayed as the display information, it is possible that this number and the above-described number of other objects will not have a one-to-one correspondence.

Furthermore, compared to when the second user casts another object, a special effect may be displayed in the video when the second user casts the necessary object.

With the above configuration, it is possible to further improve the motivation of the second user to cast the necessary object.

In the above explanation, an example was given in which the video was solo distributed by the first user alone, but it is also possible to apply the features of this disclosure to a collaboratively distributed video.

In this collaborative distribution, the object display frame displayed on the second user terminal 200 can be the same as in the case of the solo distribution described above. At this time, the first user is the host user of collaborative distribution.

Alternatively, in this collaborative distribution, the object display frame displayed on the second user terminal 200 can be different from the case of the solo distribution described above.

For example, a plurality of object display frames displayed on the second user terminals 200 may be prepared based on object display data generated for each user (host user and guest users) appearing in the collaborative distribution.

Alternatively, there may be one object display frame displayed on the second user terminals 200, but multiple tabs may be prepared based on object display data generated for each user appearing in the collaborative distribution.

With the above configuration, even in collaboratively distributed videos, the viewing users can more easily cast appropriate gifts for each user appearing.

Next, an information processing method in an embodiment of this disclosure will be explained.

Figure 49:
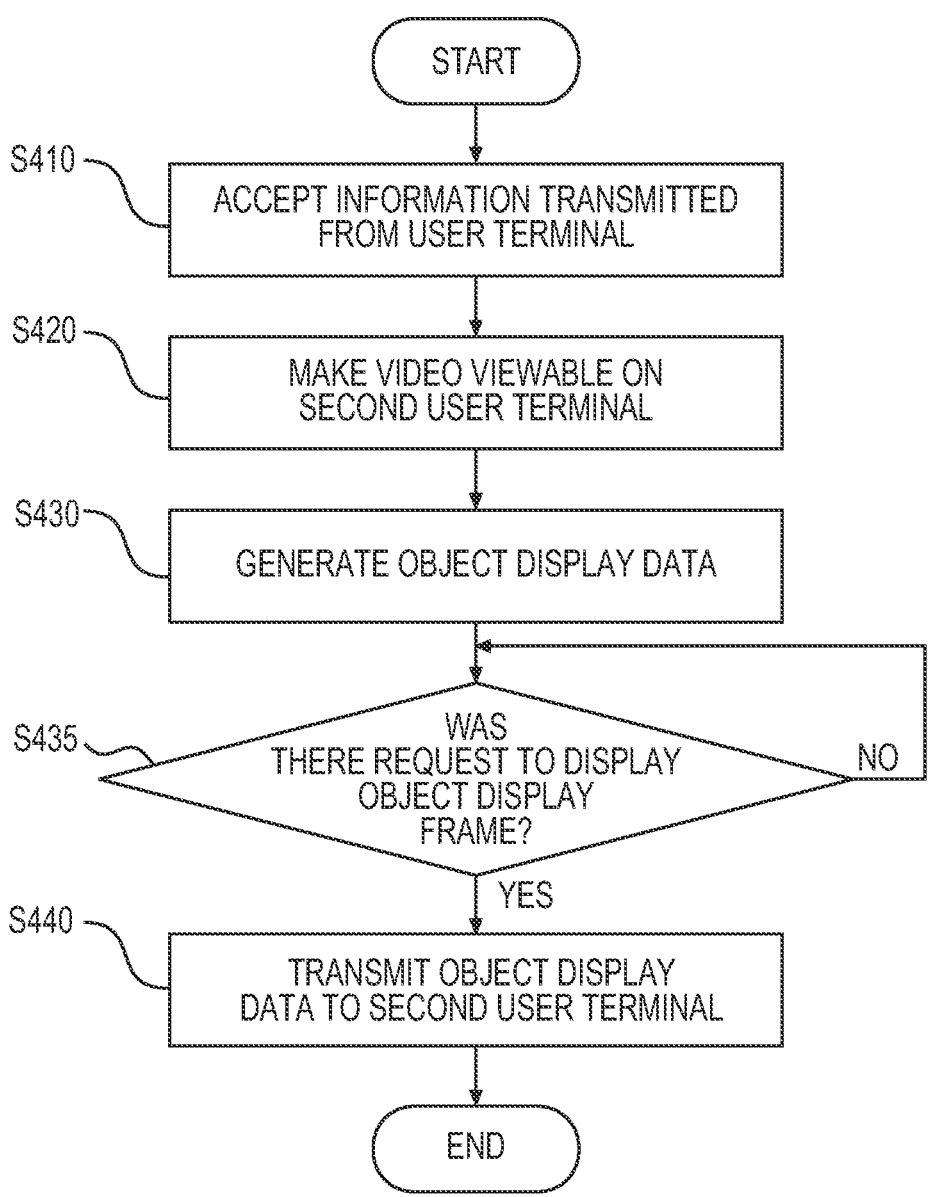
FIG. 49 is a flow diagram showing an example of a flow of an information processing method in this disclosure.

As shown in FIG. 49, the information processing method in an embodiment of this disclosure causes one or more computer processors to perform a receiving step S410, a distributing step S420, a generating step S430, a determining step S435, and a transmitting step S440.

In the receiving step S410, information transmitted from the first user terminal 100 of the first user and/or the second user terminal 200 of the second user is received.

This receiving step S410 can be executed by the receiver 410 described above.

The receiving step S410 can be executed by the server side (the server device 400).

In the distributing step S420, information regarding a video including a character object of the first user is transmitted to the second user terminal 200, thereby making the video viewable on the second user terminal.

This distributing step S420 can be executed by the distributor 420 described above.

The distributing step S420 can be executed by the server side (the server device 400).

In the generating step S430, object display data, which is data to be displayed in an object display frame displayed on the second user terminal 200 along with the video, is generated based on history information stored in association with the first user and/or the second user.

This generating step S430 can be executed by the generator 430 described above.

The generating step S430 can be executed by the server side (the server device 400). Alternatively, the generating step S430 can be executed by the client side (the first user terminal 100 or the second user terminal 200).

In the determining step S435, it is determined whether or not there has been a request from the second user terminal 200 to display the object display frame.

The determining step S435 can be executed by the server side (the server device 400). Alternatively, the determining step S435 can be executed by the client side (the second user terminal 200).

In the transmitting step S440, the object display data generated in the generating step S430 is transmitted to the second user terminal 200 in response to the request to display the object display frame.

This transmitting step S440 can be executed by the transmitter 440 described above.

The transmitting step S440 can be executed by the server side (the server device 400).

Additionally, when the above-described generating step S430 and determining step S435 are executed by the client side, the data transmission and reception in the receiving step S410 and the transmitting step S440 can be performed within each client.

Figure 50:
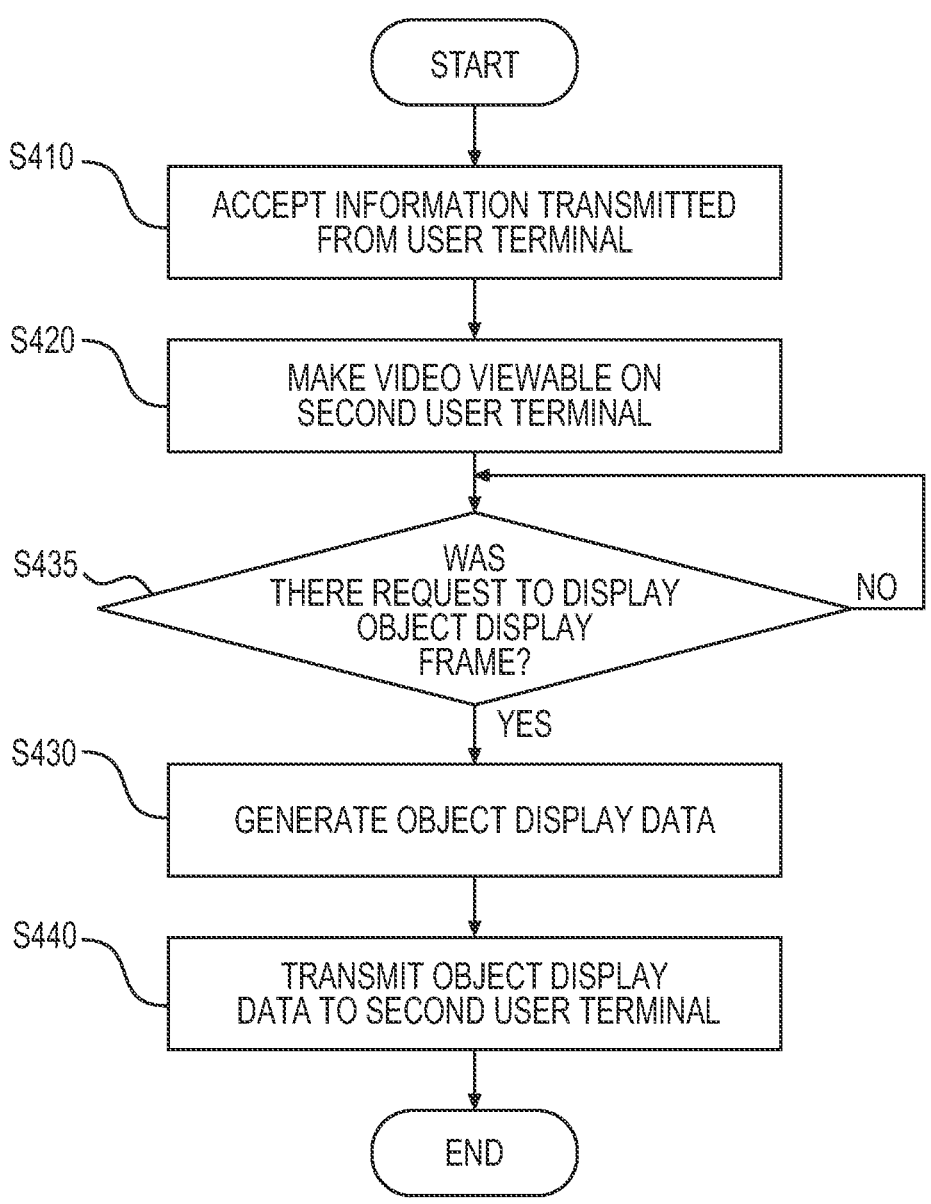
FIG. 50 is a flow diagram showing another example of a flow of an information processing method in this disclosure.

Furthermore, as shown in FIG. 50, the generating step S430 may be executed after the determining step S435.

The above-described configuration provides a technical improvement that solves or alleviates at least part of the problem of the conventional technology described above.

Next, a computer program in an embodiment of this disclosure will be explained.

A computer program according to an embodiment of this disclosure causes one or more computer processors to realize a receiving function, a distributing function, a generating function, and a transmitting function.

The receiving function receives information transmitted from the first user terminal 100 of the first user and/or the second user terminal 200 of the second user.

The distributing function makes a video viewable on the second user terminal 200 by transmitting information regarding the video including a character object of the first user to the second user terminal 200.

The generating function generates object display data that is data to be displayed in an object display frame displayed on the second user terminal 200 along with the video, based on history information stored in association with the first user and/or the second user.

The transmitting function transmits the object display data generated by the generating function to the second user terminal 200 in response to a request to display the object display frame from the second user terminal 200 received by the receiving function.

Figure 51:
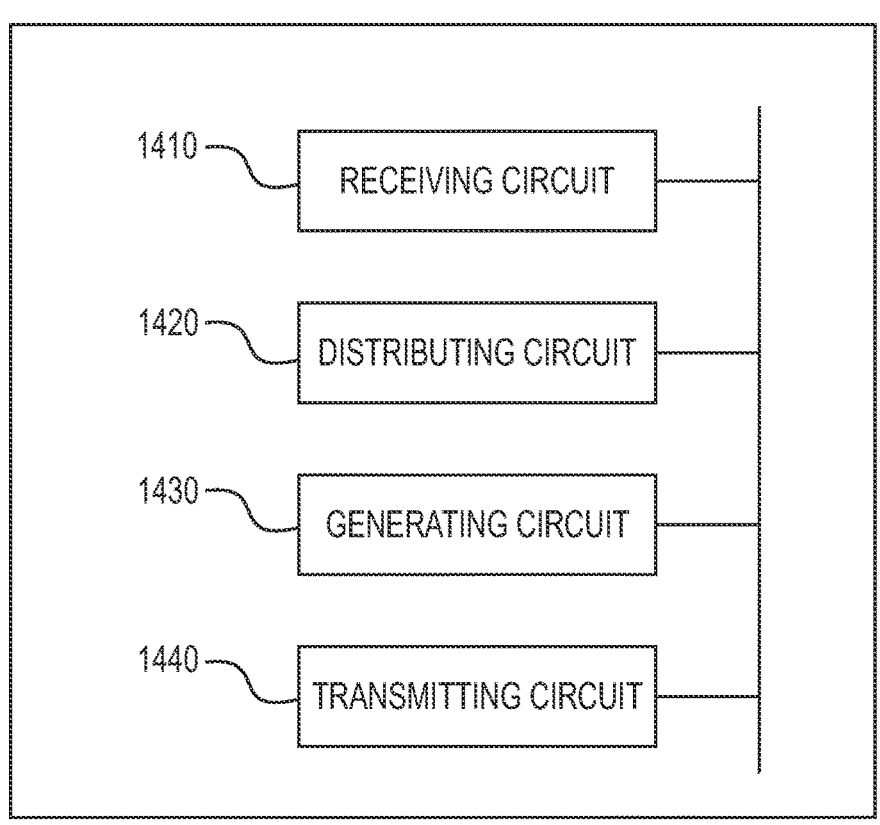
FIG. 51 is a circuit configuration diagram showing an example of a circuit configuration for realizing a computer program in this disclosure.

The above-described functions can be realized by a receiving circuit 1410, a distributing circuit 1420, a generating circuit 1430, and a transmitting circuit 1440 shown in FIG. 51. It is assumed that the receiving circuit 1410, the distributing circuit 1420, the generating circuit 1430, and the transmitting circuit 1440 are respectively realized by the receiver 410, the distributor 420, the generator 430, and the transmitter 440 described above. Details of each part are as described above.

The above-described configuration provides a technical improvement that solves or alleviates at least part of the problem of the conventional technology described above.

Next, an information processing device in an embodiment of this disclosure will be described. The information processing device corresponds to the second user terminal 200 in the information processing system 3000 described above.

Figure 52:
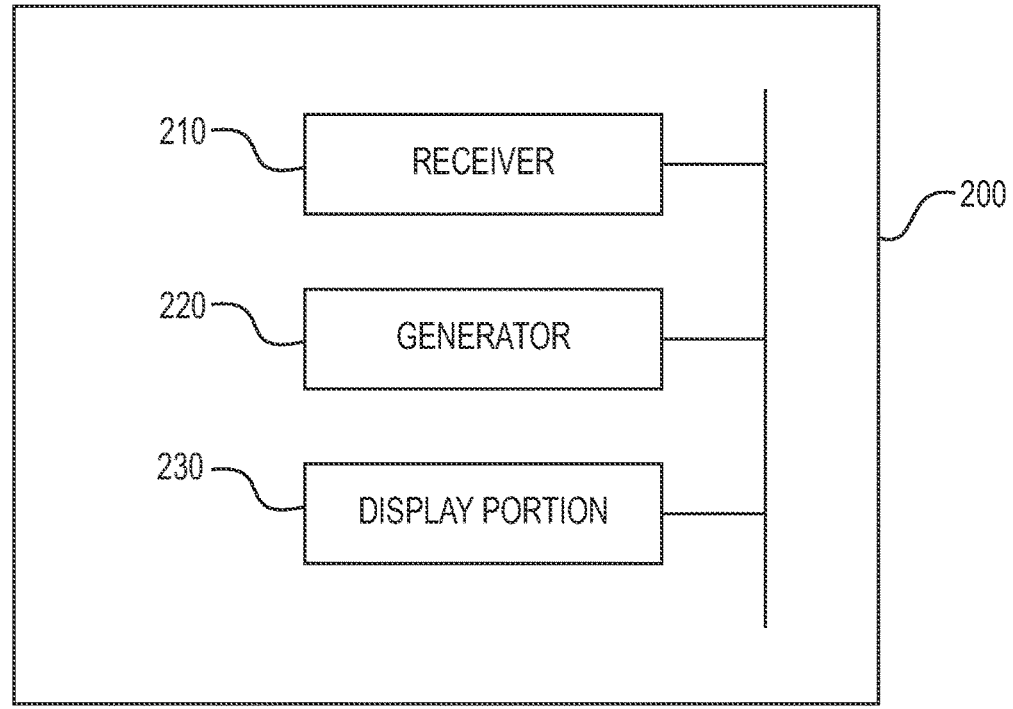
FIG. 52 is a configuration diagram showing an example of a functional configuration of a second user terminal in this disclosure.

One or more computer processors included in the information processing device include a receiver 210, a generator 220, and a display portion 230, as shown in FIG. 52.

The receiver 210 receives information regarding a video including a character object of a first user from the server device 400.

The generator 220 generates object display data that is data to be displayed in an object display frame displayed together with the video, based on history information stored in association with the first user terminal 100 and/or an information processing device of the first user.

The generator 220 can have the same configuration as the generator 430 described above.

In response to a request to display the object display frame, the display portion 230 displays the object display frame generated based on the object display data generated by the generator 220, together with the video.

The above-described configuration provides a technical improvement that solves or alleviates at least part of the problem of the conventional technology described above.

Next, an example of an information processing method according to an embodiment of this disclosure will be described. This information processing method is an information processing method executed in the information processing device (second user terminal 200) described above.

Figure 53:
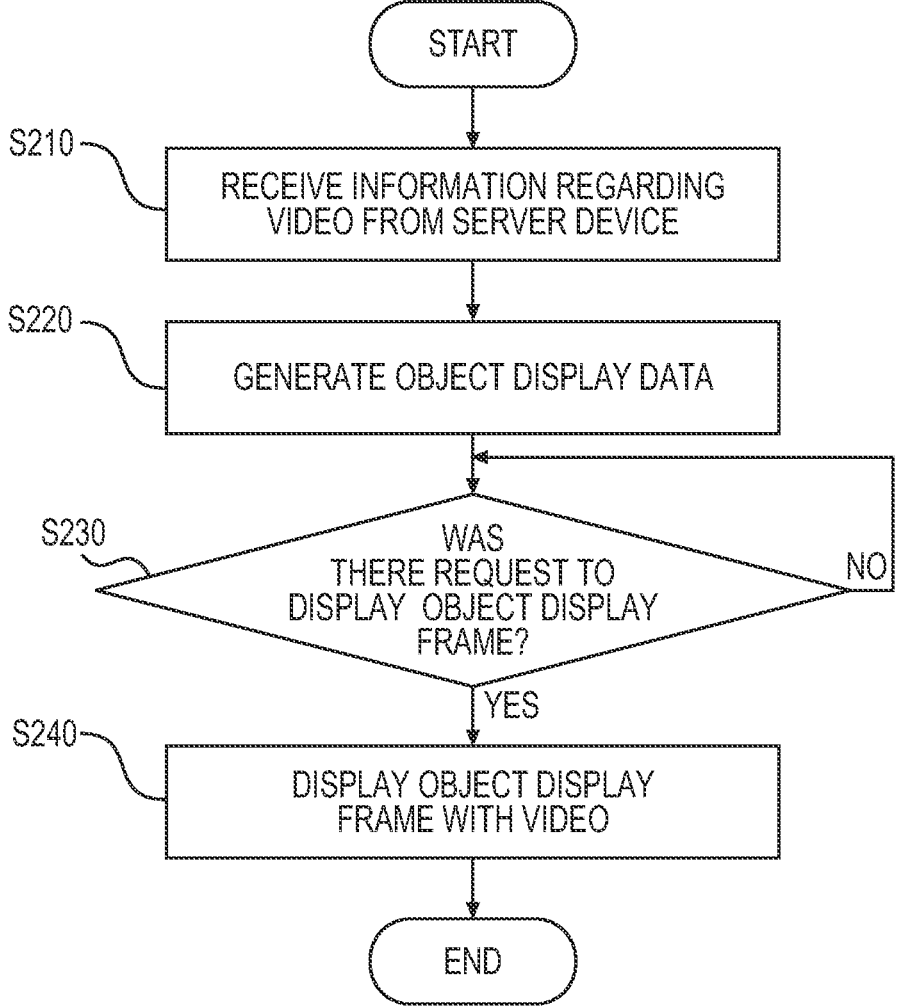
FIG. 53 is a flow diagram showing an example of the flow of an information processing method in the second user terminal in this disclosure.

As shown in FIG. 53 as an example, the information processing method is causes one or more computer processors to execute a receiving step S210, a generating step S220, a determining step S230, and a display step S240.

In the receiving step S210, information regarding a video including a character object of a first user is received from the server device 400.

This receiving step S210 can be executed by the receiver 210 described above.

In the generating step S220, object display data that is data to be displayed in an object display frame displayed together with the video is generated, based on history information stored in association with the first user terminal 100 and/or information processing device of the first user.

This generating step S220 can be executed by the generator 220 described above.

In the determining step S230, it is determined whether there has been a request to display an object display frame.

In the display step S240, the object display frame generated based on the object display data generated in the generating step is displayed together with the video, in response to the request to display the object display frame.

This display step S240 can be executed by the display portion 230 described above.

Furthermore, the generating step S220 can be executed after the determining step S230.

The above-described configuration provides a technical improvement that solves or alleviates at least part of the problem of the conventional technology described above.

Next, a computer program according to an embodiment of this disclosure will be described. This computer program is a computer program executed by the information processing device (second user terminal 200) described above.

A computer program according to this disclosure causes one or more processors included in an information processing device to realize a receiving function, a generating function, and a display function.

The receiving function receives information regarding a video including a character object of a first user from the server device 400.

The generating function generates object display data that is data to be displayed in an object display frame displayed along with the video, based on history information stored in association with the first user terminal 100 and/or information processing device of the first user.

The display function displays the object display frame generated based on the object display data generated by the generating function, together with the video, in response to a request to display the object display frame.

Figure 54:
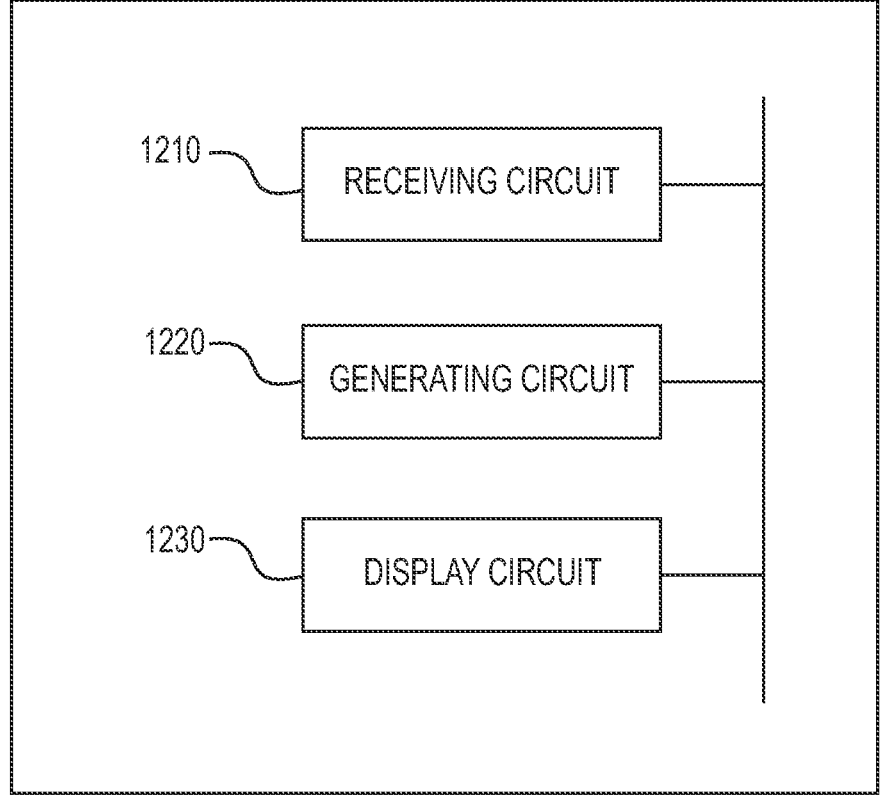
FIG. 54 is a circuit configuration diagram showing an example of a circuit configuration for realizing a computer program executed by the second user terminal in this disclosure.

The above-described functions can be realized by the receiving circuit 1210, the generating circuit 1220, and the display circuit 1230 shown in FIG. 54. It is assumed that the receiving circuit 1210, the generating circuit 1220, and the display circuit 1230 are realized by the above-described receiver 210, generator 220, and display portion 230, respectively. Details of each part are as described above.

The above-described configuration provides a technical improvement that solves or alleviates at least part of the problem of the conventional technology described above.

In order to function as the server device or the terminal device according to the above-described embodiments, an information processing device such as a computer or a mobile phone can be suitably used. Such an information processing device can be realized by storing in the memory of the information processing device a program that describes processing details for realizing each function of the server device or the terminal device according to the embodiment, and having the CPU of the information processing device read out and execute the program.

Figure 55:
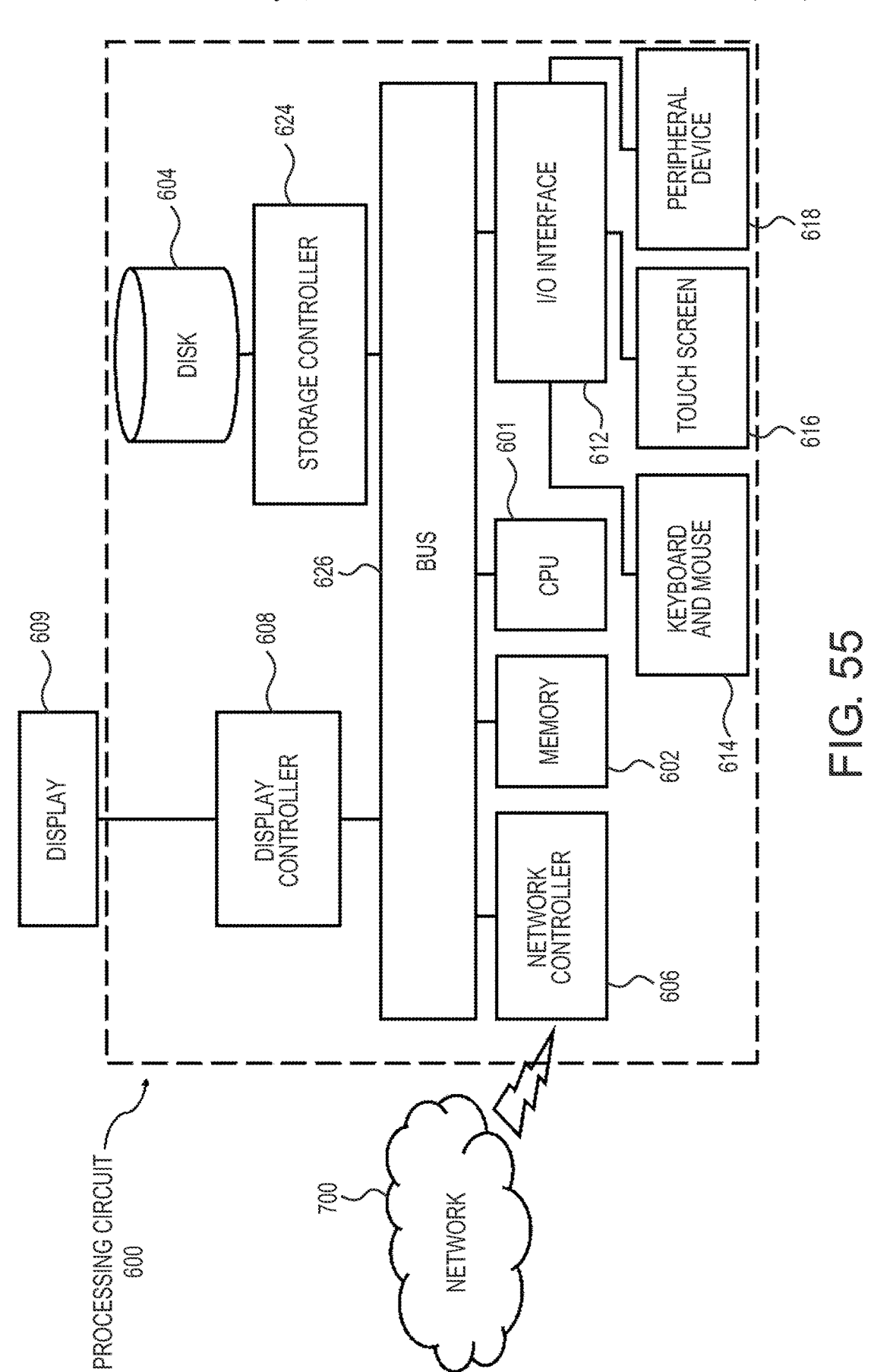
FIG. 55 is a block diagram of a processing circuit that executes computer-based operations in this disclosure.

FIG. 55 is a block diagram of processing circuitry for performing computer-based operations in accordance with this disclosure. FIG. 55 shows a processing circuit 600, which corresponds to a CPU of the terminal(s) and device(s) in this disclosure.

The processing circuit 600 can be used to control any computer-based or cloud-based control process, and the flowchart descriptions or blocks can be understood as expressing modules, segments or portions of one or more executable commands for implementing specific logical functions or steps within the process, and alternative implementations are included within the exemplary embodiments of this advancement in which the function may be executed. The order from that shown or discussed includes substantially the same or the reverse order depending on the functionality involved, as will be understood by one skilled in the art. The functionality of the elements disclosed herein can be implemented using processing circuits or circuits including general purpose processors, special purpose processors, integrated circuits, ASICs ("Application Specific Integrated Circuits"), conventional circuits configured or programmed to perform the disclosed functions, and/or combinations thereof. A processor processes circuits or circuits to include transistors and other circuits therewithin. The processor may be a processor programmed to execute programs stored in memory. In this disclosure, processing circuits, units, and means are hardware that performs or is programmed to perform the enumerated functions. The hardware can be any hardware disclosed herein or any commonly known hardware that is otherwise programmed or configured to perform the enumerated functions.

In FIG. 55, the processing circuit 600 includes a CPU 601 that executes one or more of the control processes discussed in this disclosure. Process data and instructions may be stored in a memory 602. These processes and instructions may also be stored on a storage medium disk 604, such as a hard drive (HDD) or portable storage medium, or may be stored remotely. Furthermore, the advancement(s) recited in the scope of the claims is not limited by the form of computer-readable media on which the instructions of the process are stored. For example, the instructions may be stored on a CD, DVD, flash memory RAM, ROM, PROM, EPROM, EEPROM, hard disk, or any other non-transitory computer-readable medium in an information processing device with which the processing circuit 600 communicates, such as a server or computer. The processes may also be stored in network-based storage, cloud-based storage, or other mobile-accessible storage and be executable by the processing circuit 600.

Further, the claimed advancement may be provided as a utility application, a background daemon, or an operating system component, or as a combination thereof, and can be executed along with the CPU 601 and an operating system such as Microsoft Windows, UNIX, Solaris, LINUX, Apple MAC-OS, Apple iOS and other systems known to those skilled in the art.

The hardware elements for realizing the processing circuit 600 may be realized by various circuit elements. In addition, each function of the above-described embodiment may be realized by a circuit including one or more processing circuits. The processing circuits include a specially programmed processor, such as the processor (CPU) 601 shown in FIG. 47. The processing circuits also include devices such as application specific integrated circuits (ASICs) and conventional circuit components arranged to perform the enumerated functions.

Alternatively, or additionally, the CPU 601 may be implemented on an FPGA, ASIC, or PLD, or using discrete logic circuits, as will be appreciated by those skilled in the art. Also, the CPU 601 may be realized as a plurality of processors operating in parallel and in cooperation to execute the above-described instructions of the processes of this disclosure.

The processing circuit 600 of FIG. 55 also includes a network controller 606 such as an Ethernet PRO network interface card for interfacing with the network 700. As can be appreciated, the network 700 can be a public network such as the Internet, or a private network such as a local area network (LAN) or wide area network (WAN), or any combination thereof, and may also include a public switched telephone network (PSTN) or integrated services digital network (ISDN) sub-networks. The network 700 can also be wired, such as an Ethernet network, a Universal Serial Bus (USB) cable, or the like, or wireless, such as a cellular network including EDGE, 3G and 4G wireless cellular systems. The wireless network can also be Wi-Fi, wireless LAN, Bluetooth, or any other form of wireless communication known. Additionally, the network controller 606 may comply with other direct communication standards such as Bluetooth, Near Field Communication (NFC), infrared or others.

The processing circuit 600 further includes a display controller 608, such as a graphics card or graphics adapter, for interfacing with a display 609, such as a monitor. An I/O interface 612 interfaces with a keyboard and/or a mouse 614 and a touch screen panel 616 on or separate from the display 609. The I/O interface 612 also connects to various peripheral devices 618.

A storage controller 624 connects the storage media disk 604 with a communication bus 626, which may be ISA, EISA, VESA, PCI or similar, and which interconnects all components of the processing circuit 600. A description of the general features and functionality of the display 609, the keyboard and/or mouse 614, the display controller 608, the storage controller 624, the network controller 606, and the I/O interface 612, is omitted here for brevity because these features are commonly known.

The exemplary circuit elements described in the context of this disclosure may be replaced with other elements or may be of different construction than the examples provided herein. Further, circuits configured to perform the functions described in this specification may be implemented in multiple circuit units (e.g., chips), or the features may be combined in circuits on a single chipset.

The functions and features described herein may also be performed by various distributed components of the system. For example, one or more processors may perform these system functions, where the processors are distributed among a plurality of components communicating within a network. Distributed components can include one or more client and server machines that can share processing, as well as various human interfaces and communication devices (e.g., display monitors, smartphones, tablets, or personal digital assistants (PDAs)). The network may be a private network such as LAN or WAN, or a public network such as the Internet. Input to the system is received through direct user input and can be received remotely in real time or as a batch process. Moreover, some implementations may be performed on modules or hardware that are not identical to those described. Accordingly, other implementations are within the scope of what is claimed.

While several embodiments have been described, these embodiments are provided by way of example and are not intended to limit the scope of the disclosure. These novel embodiments can be implemented in various other forms, and various omissions, replacements, and modifications can be made without departing from the spirit of the disclosure. These embodiments and their modifications are included in the scope and gist of the disclosure, and are included in the scope of the claims, and their equivalents.

Further, the methods described in the embodiments can be stored on a recording medium such as a magnetic disk (floppy (registered trademark) disk, hard disk, or the like), optical disc (CD-ROM, DVD, MO, or the like), semiconductor memory (ROM, RAM, flash memory, or the like), or the like, as programs that can be executed by a computer (computer), or can be sent and distributed via a communication medium. The programs stored on the medium include setting programs that configure, in the computer, software means (including not only executable programs but also tables and data structures) executed by the computer. A computer that realizes this device reads a program stored on a recording medium, and depending on the case, constructs software means by a setting program, and executes the above-described processes through operations controlled by the software means. The term "recording medium" as used herein is not limited to those for distribution, and includes storage media such as magnetic disks and semiconductor memory provided inside the computer or equipment connected via a network. A memory may function, for example, as a main memory device, an auxiliary memory device, or cache memory.

EXPLANATION OF SYMBOLS

100 First user terminal
200 Second user terminal
300 Network
400 Server device
410 Receiver
420 Distributor
430 Generator
440 Transmitter

The invention claimed is:

1. An information processing system comprising:
one or more computer processors programmed to:
 receive information transmitted from a first user terminal of a first user and/or a second user terminal of a second user;
 cause a video including a character object of the first user to be displayed on the second user terminal by transmitting information regarding the video to the second user terminal;
 generate object display data for display in an object display frame displayed on the second user terminal together with the video, based on history information stored in association with the first user and/or the second user; and
 transmit the generated object display data to the second user terminal in response to a request to display the object display frame from the second user terminal received by the one or more computer processors, wherein
the character object of the first user is displayed on the second user terminal outside the object display frame.

2. The information processing system according to claim 1, wherein
the history information stored in association with the first user includes information regarding a history in which the first user and a predetermined event are associated.

3. The information processing system according to claim 1, wherein
the history information stored in association with the first user includes information regarding a request, transmitted from the second user terminal, to display a predetermined object in the video.

4. The information processing system according to claim 1, wherein
the history information stored in association with the second user includes information regarding a request, transmitted from the second user terminal, to display a predetermined object in the video.

5. The information processing system according to claim 1, wherein
the history information stored in association with the second user includes information regarding a request, transmitted from the second user terminal, to display a predetermined object in another video including the video.

6. The information processing system according to claim 1, wherein,
based on the history information, the one or more computer processors generate the object display data so as to specify a target object to be subjected to specific display control from among objects displayed in the object display frame, and display the target object in a first position inside the object display frame, or display the target object in a manner different from other objects in the object display frame.

7. The information processing system according to claim 6, wherein the one or more computer processors specify as the target object a predetermined object for which a display request was previously transmitted from the second user terminal.

8. The information processing system according to claim 7, wherein the one or more computer processors generate the object display data having the number of times that display requests for the predetermined object have been transmitted at one time being associated with the target object, based on the history information.

9. The information processing system according to claim 1, wherein the one or more computer processors are further programmed to:

receive designation information for an object and/or an attribute of the object, transmitted from the first user terminal and/or the second user terminal, and specify the object as a designated object based on the designation information, and generate the object display data displaying the designated object in a second position inside the object display frame, or displaying the designated object in a manner different from other objects in the object display frame.

10. The information processing system according to claim 1, wherein the one or more computer processors are further programmed to determine whether a predetermined event is associated with the first user, when the predetermined event is determined to be associated with the first user, generate display information regarding a necessary value needed for a parameter value associated with the first user in connection with the predetermined event to attain a predetermined value, and transmit the display information to the second user terminal.

11. The information processing system according to claim 10, wherein the predetermined value is determined in advance for the predetermined event.

12. The information processing system according to claim 10, wherein the predetermined value varies in response to a parameter value associated with another user associated with the predetermined event.

13. The information processing system according to claim 10, wherein the one or more computer processors update the display information in real time in response to changes in the necessary value.

14. The information processing system according to claim 10, wherein the parameter value increases based on a number and/or a value of requests to display an object in the video, transmitted from the second user terminal.

15. The information processing system according to claim 10, wherein the one or more computer processors generate the display information such that the necessary value is displayed.

16. The information processing system according to claim 10, wherein the one or more computer processors determine a type of necessary object needed to make the necessary value become zero, calculate the number of the necessary objects needed to make the necessary value become zero, and generate the display information such that the number and type of the necessary object are displayed.

17. The information processing system according to claim 16, wherein the one or more computer processors determine the type of the necessary object needed to make the necessary value become zero based on the history information.

18. The information processing system according to claim 16, wherein the one or more computer processors determine the type of the necessary object needed to make the necessary value become zero based on a number of the second user terminals.

19. The information processing system according to claim 16, wherein the one or more computer processors further generate information for displaying, on the second user terminal, a batch object for transmitting display requests for the number of the necessary objects as a batch.

20. The information processing system according to claim 16, wherein the one or more computer processors receive temporary display requests for the necessary object from the second user terminal and, when the number of temporary display requests reaches the number of the necessary objects needed to make the necessary value become zero, treat the number of the display requests for the necessary object as having been received as a batch.

21. The information processing system according to claim 6, wherein the first position is an upper position in the object display frame or a position within a specific tab in the object display frame.

22. The information processing system according to claim 10, wherein the one or more computer processors calculate a necessary number of points needed for the necessary value to become zero, and generate the display information such that the necessary number of points is displayed.

23. The information processing system according to claim 22, wherein the one or more computer processors are further programmed to:

determine whether a number of points associated with the second user is sufficient with respect to the necessary number of points, and when the number of points associated with the second user is determined to be insufficient with respect to the necessary number of points, transmit to the second user terminal information for causing display of an object for transitioning to a screen that performs a process to increase the points.

24. An information processing method executed by one or more computer processors, the method comprising:

receiving information transmitted from a first user terminal of a first user and/or a second user terminal of a second user;

causing a video including a character object of the first user to be displayed on the second user terminal by transmitting information regarding the video to the second user terminal;

generating object display data for display in an object display frame displayed on the second user terminal together with the video, based on history information stored in association with the first user and/or the second user; and transmitting the generated object display data to the second user terminal in response to receiving a request to display the object display frame from the second user terminal, wherein the character object of the first user is displayed on the second user terminal outside the object display frame.

25. An information processing method executed by an information processing device comprising one or more computer processors, the method comprising:

receiving information regarding a video including a character object of a first user from a server device;

generating object display data for display in an object display frame displayed together with the video, based on history information stored in association with a first user terminal of the first user and/or the information processing device; and displaying the object display frame together with the video in response to a request to display the object display frame, wherein the character object of the first user is displayed outside the object display frame.

26. A non-transitory computer-readable medium storing thereon a program executed by an information processing device comprising one or more computer processors, wherein the program causes the one or more computer processors to execute:

receiving information regarding a video including a character object of a first user from a server device;

generating object display data for display in an object display frame displayed together with the video, based on history information stored in association with a first user terminal of the first user and/or the information processing device; and displaying the object display frame together with the video in response to a request to display the object display frame, wherein the character object of the first user is displayed outside the object display frame.

\* \* \* \* \*